(12) United States Patent
Murakami et al.

(10) Patent No.: US 12,028,152 B2
(45) Date of Patent: *Jul. 2, 2024

(54) TRANSMISSION DEVICE, TRANSMISSION METHOD, RECEPTION DEVICE, AND RECEPTION METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,085

(22) Filed: Feb. 6, 2023

(65) Prior Publication Data

US 2023/0188242 A1    Jun. 15, 2023

Related U.S. Application Data

(63) Continuation of application No. 16/665,597, filed on Oct. 28, 2019, now Pat. No. 11,606,159, which is a continuation of application No. PCT/JP2018/016231, filed on Apr. 20, 2018.

(60) Provisional application No. 62/529,819, filed on Jul. 7, 2017, provisional application No. 62/518,074, filed on Jun. 12, 2017, provisional application No. 62/491,306, filed on Apr. 28, 2017.

(51) Int. Cl.
*H04J 14/02* (2006.01)
*H04B 10/2575* (2013.01)

(52) U.S. Cl.
CPC .... *H04J 14/0213* (2013.01); *H04B 10/25753* (2013.01); *H04J 14/0226* (2013.01); *H04J 14/0234* (2013.01); *H04J 14/0257* (2013.01)

(58) Field of Classification Search
CPC .......................... H04J 14/0213; H04B 10/116
See application file for complete search history.

(56) References Cited

U.S. PATENT DOCUMENTS

| 6,590,996 B1 | 7/2003 | Reed |
| 8,942,571 B2 | 1/2015 | Chen et al. |
| 9,232,202 B2 | 1/2016 | Togashi |

(Continued)

FOREIGN PATENT DOCUMENTS

| JP | 2007-96548 A | 4/2007 |
| JP | 2010-130438 A | 6/2010 |

(Continued)

OTHER PUBLICATIONS

International Search Report (ISR) dated Jul. 24, 2018 in International (PCT) Application No. PCT/JP2018/016231.

(Continued)

*Primary Examiner* — Pranesh K Barua
(74) *Attorney, Agent, or Firm* — Wenderoth, Lind & Ponack, L.L.P.

(57) ABSTRACT

A transmission device includes a symbol generator that generates a modulation symbol by mapping transmission data to a signal point arranged in a two-dimensional or three-dimensional color space; and an outputter that outputs an optical signal modulated according to the modulation symbol.

4 Claims, 42 Drawing Sheets

(56) References Cited

U.S. PATENT DOCUMENTS

| | | | |
|---|---|---|---|
| 2009/0129781 A1 | 5/2009 | Irie et al. | |
| 2010/0034540 A1* | 2/2010 | Togashi | H04N 7/22 398/118 |
| 2010/0247112 A1* | 9/2010 | Chang | H04B 10/116 398/182 |
| 2011/0044701 A1 | 2/2011 | Schenk et al. | |
| 2012/0128366 A1 | 5/2012 | Lee | |
| 2012/0275796 A1 | 11/2012 | Yokoi | |
| 2014/0178080 A1 | 6/2014 | Chen | |
| 2014/0186026 A1 | 7/2014 | Oshima | |
| 2015/0155937 A1 | 6/2015 | Jeffrey | |
| 2016/0007027 A1 | 1/2016 | Sasai | |
| 2016/0248504 A1 | 8/2016 | Togashi | |
| 2017/0063458 A1 | 3/2017 | Miyaho et al. | |

FOREIGN PATENT DOCUMENTS

| | | |
|---|---|---|
| JP | 2011-521546 | 7/2011 |
| JP | 2012-114911 | 6/2012 |
| WO | 2009/136312 | 11/2009 |

OTHER PUBLICATIONS

Seigo Ito, et al., "Bayesian Based Location Estimation System Using Wireless LAN," Third IEEE Conference on Pervasive Computing and Communications Workshops, pp. 273-278, 2005.

Jyunichi Akita, "Advanced Image Sensor", The Journal of The Institute of Image Information and Television Engineers, vol. 66, No. 3, pp. 172-173, 2012, with partial English translation.

Shigetoshi Sugawa, "High Speed Technology Trends in CMOS Image Sensors", The Journal of The Institute of Image Information and Television Engineers, vol. 66, No. 3, pp. 174-177, 2012, with partial English translation.

Mikio Ihama, et al., "Proposal of New Organic CMOS Image Sensor for Reduction in Pixel Size", Fujifilm Research & Development, No. 55, pp. 14-17, 2010, with partial English translation.

IEC 61966-2-1, Multimedia systems and equipment—Colour measurement and management—Part 2-1: Colour management—Default RGB colour space—sRGB, Oct. 1999.

"Adobe RGB (1998) Color Image Encoding (Technical report)", Adobe Systems Incorporated, May 13, 2005.

"Specification ICC.1:2010 (Profile version 4.3.0.0) Image technology colour management—Architecture, profile format, and data structure", International Color Consortium, 2010.

Naoto Kawamura, "Image Processing in Digital Camera", The Institute of Image Electronics Engineers of Japan, No. 33 VMA Seminar-1, 2012, with partial English translation.

Yoshinori Maekawa, et al., "Computer Graphics," Ohmsha, Ltd., 2001, with partial English translation.

James D. Foley, et al., "Computer Graphics: Principles and Practice", Ohmsha, Ltd., 2001.

Extended European Search Report issued Mar. 17, 2020 in corresponding European Patent Application No. 18790364.6.

Office Action dated Mar. 3, 2021 issued in corresponding European Patent Application No. 18790364.6.

Jaesang Cha(Snust) et al: "PHY/MAC for Variable Transparent Amplitude-Shape Color (VTASC) modulation; 15-16-0278-00-007a-phy-mac-for-variable-transparent-amplitude-shape-color-vtasc-modulation", IEEE Draft; 15-16-0278-00-007A-PHY-MAC-FOR-VARIABLE-TRANSPARENT-AMPLITUDE-SHAPE-COLOR-VTASC-MODULATION, IEEE-SA Mentor, Piscataway, NJ USA, vol. 802.15.7r1, Mar. 16, 2016 (Mar. 16, 2016), pp. 1-21, XP068105838, [retrieved on Mar. 16, 2016].

Vinayagam Mariappan, "PHY/MAC for Variable Transparent Amplitude-Shape-Color (VTASC) modulation", Mar. 2016, IEEE P802.15-16-0278-00-007a, All Page (Year: 2016).

\* cited by examiner

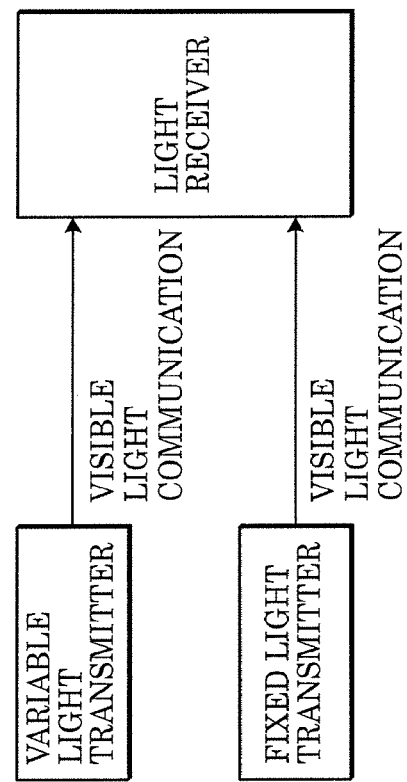

TRANSMISSION DEVICE, TRANSMISSION METHOD, RECEPTION DEVICE, AND RECEPTION METHOD

CROSS REFERENCE TO RELATED APPLICATIONS

This application is a U.S. continuation of U.S. application Ser. No. 16/665,597, filed Oct. 28, 2019, which is a U.S. continuation application of PCT International Patent Application Number PCT/JP2018/016231 filed on Apr. 20, 2018, claiming the benefit of priority of U.S. Provisional Patent Application No. 62/491,306 filed on Apr. 28, 2017, U.S. Provisional Patent Application No. 62/518,074 filed on Jun. 12, 2017, and U.S. Provisional Patent Application No. 62/529,819 filed on Jul. 7, 2017, the entire contents of which are hereby incorporated by reference.

BACKGROUND

1. Technical Field

The present disclosure relates to a transmission device, a transmission method, a reception device, and a reception method.

2. Description of the Related Art

One example of a communication method is light communication that utilizes, for example, visible light, which is light in a frequency band visible to the human eye.

One example of a light communication method includes estimating, by a terminal, information, such as the current location, using radio waves transmitted from an access point (AP) on a wireless LAN (Local Area Network), as is disclosed in, for example, Bayesian based location estimation system using wireless LAN, Third IEEE Conference on Pervasive Computing and Common. Workshops, pp. 273-278, 2005.

SUMMARY

In visible light communication, a transmission device modulates the strength of light emitted from a light-emitting element such as an LED (light emitting diode) based on transmission data, and transmits a signal by changing the brightness of the emitted light.

One aspect of the present disclosure is to facilitate an improvement in reception quality and/or transmission speeds in light communication that uses, for example, visible light.

A transmission device according to one aspect of the present disclosure includes: a symbol generator that generates a modulation symbol by mapping transmission data to a signal point arranged in a two-dimensional or three-dimensional color space; and an outputter that outputs an optical signal modulated according to the modulation symbol.

A transmission method according to one aspect of the present disclosure is implemented in a transmission device, and includes: generating a modulation symbol by mapping transmission data to a signal point arranged in a two-dimensional or three-dimensional color space; and outputting, from an outputter included in the transmission device, an optical signal modulated according to the modulation symbol.

A reception device according to one aspect of the present disclosure includes: a light receiver generates a reception signal by receiving an optical signal via a plurality of light receiving elements; and a demodulator that generates reception data by demapping and decoding the reception signal, symbol-by-symbol, as a signal in a two-dimensional or three-dimensional color space.

A reception method according to one aspect of the present disclosure is implemented in a reception device, and includes: generating a reception signal by receiving an optical signal via a plurality of light receiving elements; and generating reception data by demapping and decoding the reception signal, symbol-by-symbol, as a signal in a two-dimensional or three-dimensional color space.

General or specific aspects of these may be realized as a system, method, integrated circuit, computer program, storage medium, or any given combination thereof.

According to one aspect of the present disclosure, it is possible to facilitate an improvement in reception quality and/or transmission speeds in light communication that uses, for example, visible light.

Additional benefits and advantages in one aspect of the present disclosure will become apparent from the Specification and Drawings. The benefits and/or advantages may be individually obtained by the various embodiments and features of the Specification and Drawings, which need not all be provided in order to obtain one or more of such benefits and/or advantages.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates a configuration example of a visible light communication system;

DETAILED DESCRIPTION OF THE EMBODIMENTS

Hereinafter, embodiments of the present disclosure will be described in detail with reference to the drawings.

[Modulation and Demodulation scheme for Visible Light Communication]

First, a summary will be given of one example of a visible light communication method for transmission and reception using visible light which can be applied to each of the embodiments to be described hereinafter.

<Line Scan Sampling>

Smartphones and digital cameras, for example, are equipped with an image sensor such as a CMOS (Complementary Metal Oxide Semiconductor) sensor. For example, the entire scene in a single image captured by the CMOS sensor is not captured at a single instant, but rather, for example, captured line by line using a rolling shutter method, whereby the sensor reads out the amount of light received line by line, as shown in "Advanced Image Sensor", The Journal of The Institute of Image Information and Television Engineers, vol. 66, no. 3, pp. 172-173, 2012 and "High Speed Technology Trends in CMOS Image Sensors", The Journal of The Institute of Image Information and Television Engineers, vol. 66, no. 3, pp. 174-177, 2012. Accordingly, taking the readout time into account, the starting and stopping of the reception of light is controlled so that there is a temporal shift from line to line. In other words, an image captured with a CMOS sensor is configured of numerous lines captured with a slight time lag between each line.

Figure 1:
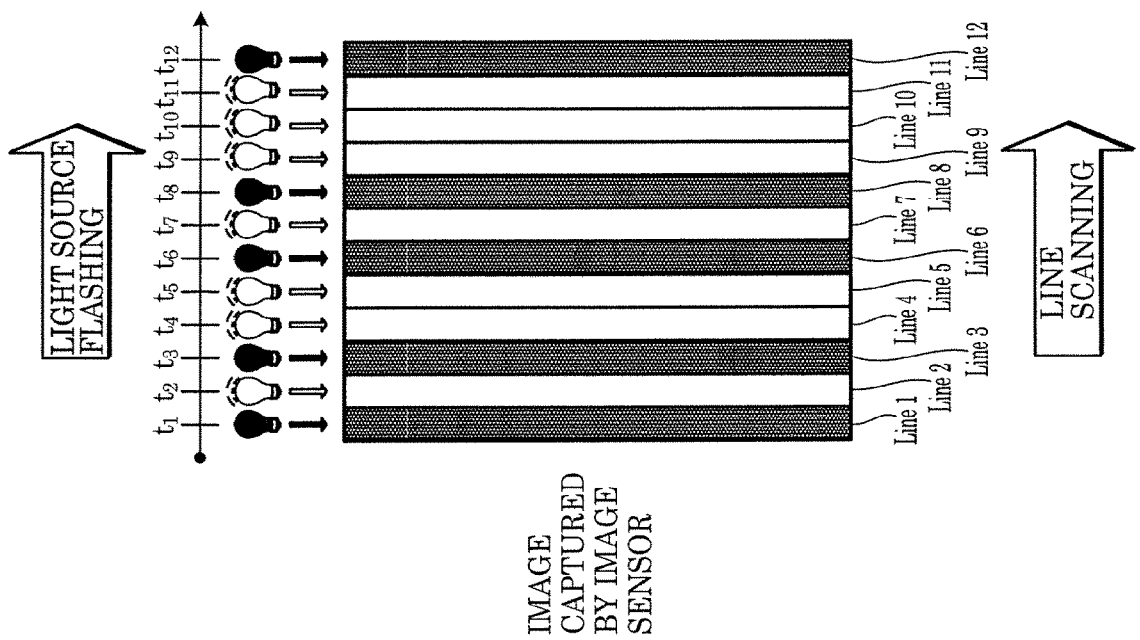
FIG. 1 is for describing line scan sampling principles.

In the visible light communication method exemplified in this embodiment, focus is placed on the characteristics of the CMOS sensor to achieve high-speed reception of visible light signals. In other words, in this visible light communication method, by utilizing the slight difference in exposure time between lines, the luminance and color of the light source at a plurality of points in time can be measured line by line, from a single image (image captured by the image sensor, i.e., "captured image"), making it possible to capture a modulated signal faster than the frame rate of the image sensor, as illustrated in FIG. 1. Note that this method can be achieved by implementing the rolling shutter method using a CMOS sensor, but this method can also be achieved even when the rolling shutter method is implemented using a sensor other than a CMOS sensor, such as a CCD (Charge-Coupled Device) sensor or an organic (CMOS) sensor, as exemplified in "Proposal of New Organic CMOS Image Sensor for Reduction in Pixel Size", FUJIFILM RESEARCH & DEVELOPMENT, no. 55, pp. 14-17, 2010.

Hereinafter, this sampling technique is referred to as "line scan sampling", and one line of pixels that are exposed at the same time is referred to as an "exposure line".

Figure 2:
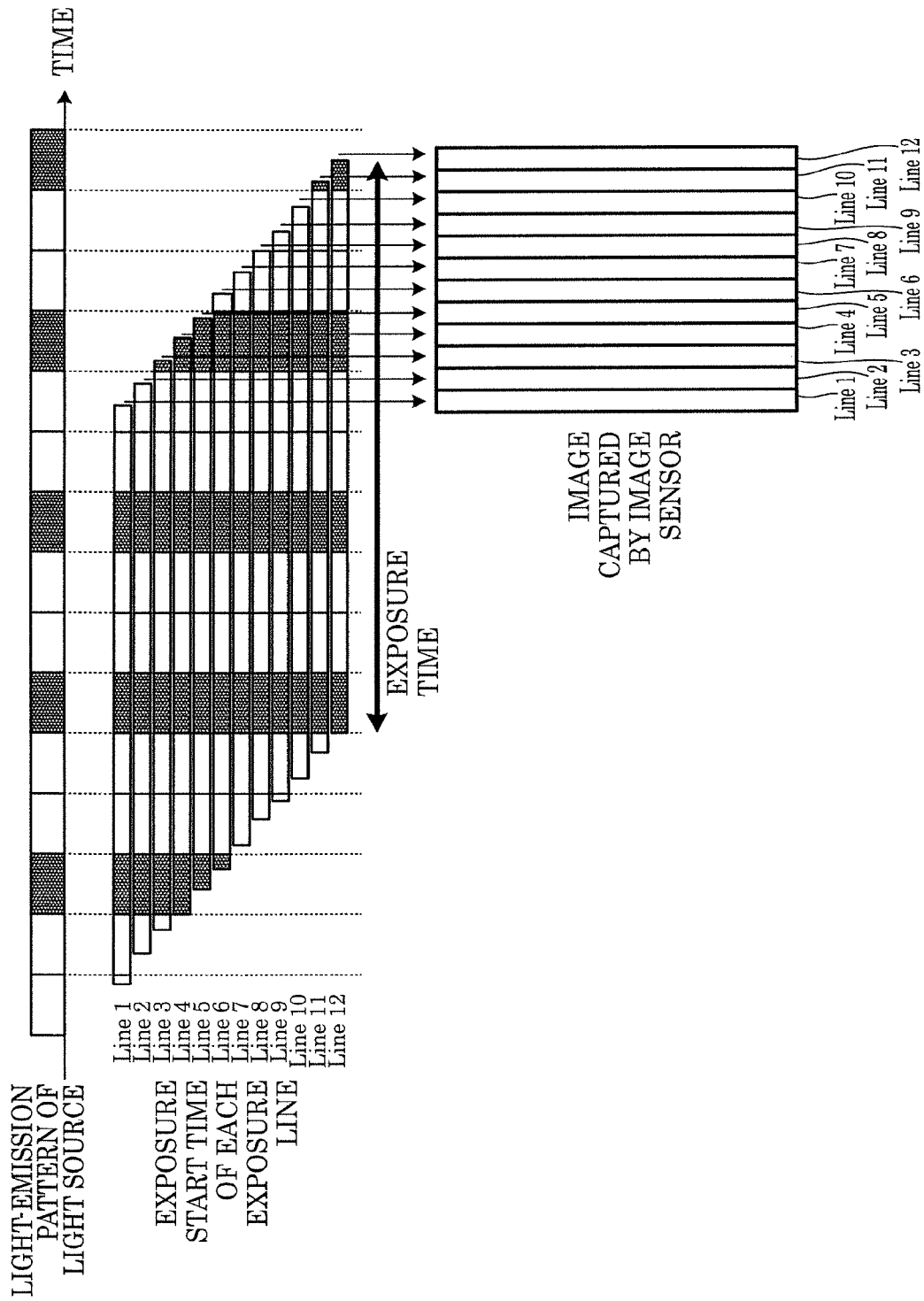
FIG. 2 illustrates one example of a captured image when exposure time is long.

However, when the photography setting for photographing an image using the camera function (the function for capturing a video or still image) is used, even if a rapidly flashing light source is captured, the flashing will not appear as a striped pattern extending along the exposure lines. This is because, with this setting, since the exposure time is sufficiently longer than the flash cycle, as illustrated in FIG. 2, the change in luminance resulting from the light source flashing (light-emission pattern) is uniform, whereby the variation in pixel values between exposure lines is small, resulting in a substantially uniform image.

Figure 3:
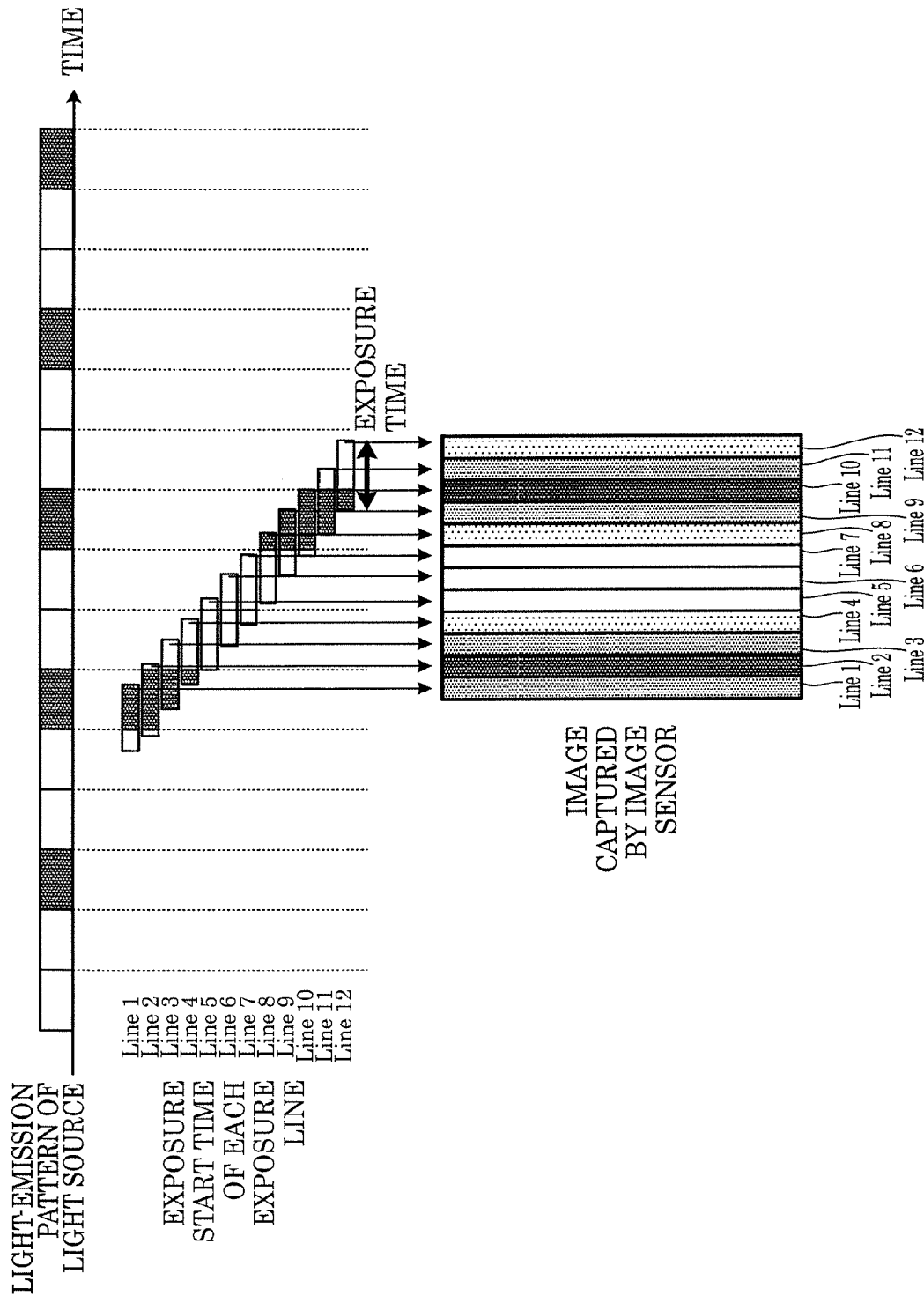
FIG. 3 illustrates one example of a captured image when exposure time is short.

In contrast, by setting the exposure time to the flash cycle of the light source as illustrated in FIG. 3, the state of the flashing of the light source (light-emission pattern) can be observed as a change in luminance between exposure lines.

For example, exposure lines are designed so as to be parallel to the lengthwise direction of the image sensor. In such cases, in one example, assuming the frame rate is 30 fps (frames per second), at a resolution of 1920×1080, 32400 or more samples are obtained each second, and at a resolution of 3840×2160, 64800 or more samples are obtained each second.

<Line Scan Sampling Application Example>

Note that in the above description, line scan sampling in which a signal that indicates an amount of light received per line is read out is described, but the method of sampling optical signals using an image sensor such as a CMOS sensor is not limited to this line scan sampling example. A variety of methods that can obtain signals sampled at a sampling rate higher than the frame rate used in typical video capturing can be implemented as a sampling method used for optical signal reception. For example, by employing the global shutter method that gives a shutter function to each pixel disclosed in "Advanced Image Sensor", The Journal of The Institute of Image Information and Television Engineers, vol. 66, no. 3, pp. 172-173, 2012 and "High Speed Technology Trends in CMOS Image Sensors", The Journal of The Institute of Image Information and Television Engineers, vol. 66, no. 3, pp. 174-177, 2012, a method of concurrently reading out line signals, or a method in which signals are read out in units of a plurality of pixels arranged in shapes other than a linear shape may be used. Moreover, a method may be used in which a signal is read out a plurality of times from the same pixel during a period corresponding to a single frame in the frame rate used in typical video capturing.

<Frame Sampling>

Furthermore, by employing the frame rate method that gives a shutter function to each pixel disclosed in "Advanced Image Sensor", The Journal of The Institute of Image Information and Television Engineers, vol. 66, no. 3, pp. 172-173, 2012 and "High Speed Technology Trends in CMOS Image Sensors", The Journal of The Institute of Image Information and Television Engineers, vol. 66, no. 3, pp. 174-177, 2012, it is possible to sample optical signals even in a method that speeds up the frame rate.

For example, the embodiments to be described hereinafter can be realized in any of the methods described above: "Line Scan Sampling", "Line Scan Sampling Application Example", and "Frame Sampling".

<Light Source and Modulation Scheme>

In visible light communication, for example, an LED (Light Emitting Diode) can be used as a transmitter. LEDs are commonly used as light sources in lamps or in display backlights, and are capable of rapidly flashing.

However, some light sources used as transmitters for visible light communication cannot be allowed to flash freely when performing visible light communication. If the changes in brightness made for visible light communication are perceptible to the human eye, the original functionality of the light source in, for example, a lamp, will be compromised. For this reason, when visible light communication is performed using the light source in, for example, a lamp, the light source that transmits the transmission signal needs to be able to do so without any perceptible flickering and needs to be able to emit light at a desired brightness.

Figure 4A:
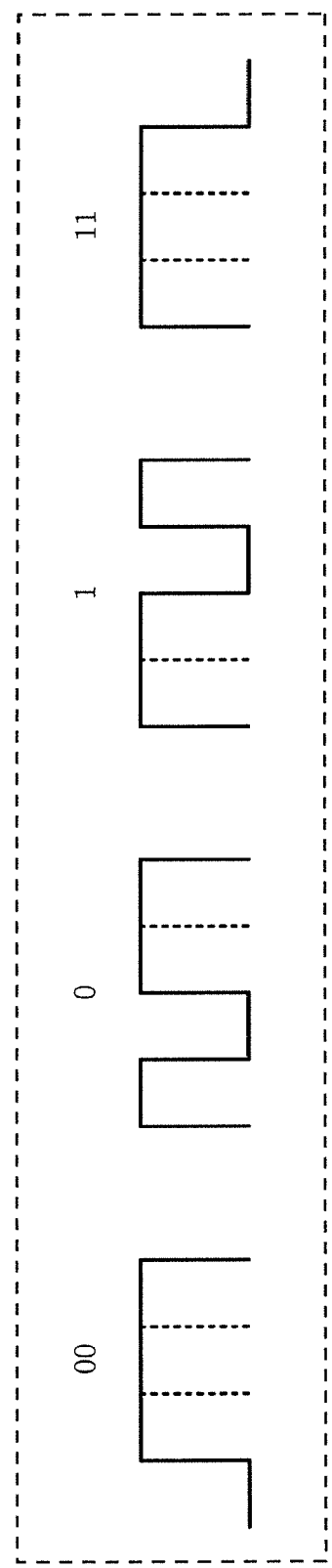
FIG. 4A is for describing 4PPM.

One example of a modulation scheme that satisfies these conditions is 4PPM (4-Pulse Position Modulation). As illustrated in FIG. 4A, 4PPM is a scheme in which two bits are expressed by a group of four time slots each indicating either bright or dark light emitted by a light source. Moreover, as illustrated in FIG. 4A, in 4PPM, three of the four slots are bright and one of the slots is dark. Accordingly, regardless of the content of the signal, the average brightness (average luminance) is $3/4=75\%$.

Figure 4B:
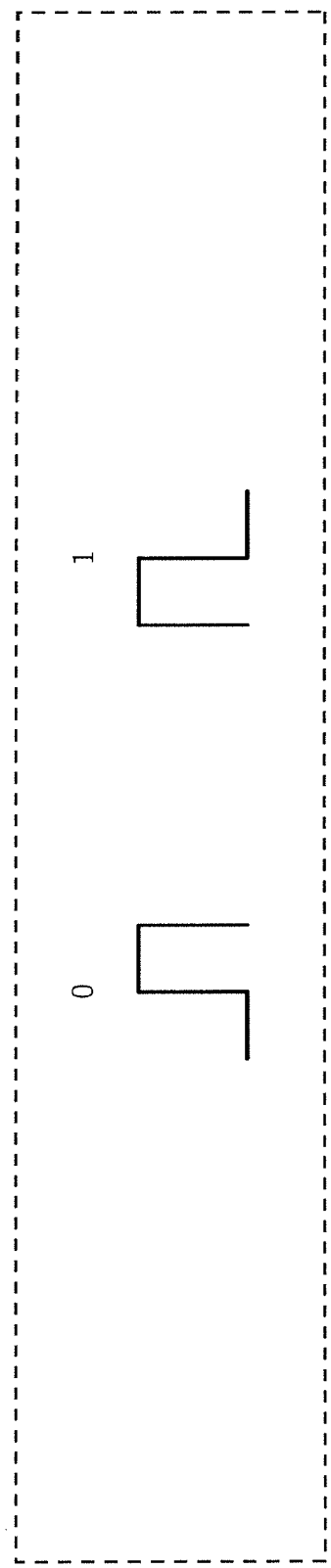
FIG. 4B is for describing Manchester encoding.

For comparison, one example of a similar scheme is Manchester encoding illustrated in FIG. 4B. Manchester encoding is a scheme in which one bit is expressed by two states. The modulation efficiency is 50%, which is the same as 4PPM, but since one of the two states is bright and the other is dark, the average luminance is $1/2=50\%$. In other words, 4PPM is more suitable than Manchester encoding as a modulation scheme for visible light communication. However, since communication capability is not adversely affected by changes in luminance from visible light communication that are perceptible to the human eye, depending on the application, there may be no problem in using a method in which the changes in luminance are perceptible to the human eye. Accordingly, the transmitter (light source) may use a modulation scheme such as ASK (Amplitude Shift Keying), PSK (Phase Shift Keying), or PAM (Pulse Amplitude Modulation) to generate the modulated signal and cause the light source to emit light.

<Example of Overall Configuration of Communication System>

As illustrated in FIG. 5, the communication system that performs visible light communication includes at least a transmitter that transmits (emits) optical signals and a receiver that receives optical signals. For example, there are two types of transmitters: a variable light transmitter that changes the transmission content depending on the image or content to be displayed; and a fixed light transmitter that continues transmitting fixed transmission content. However, even with a configuration including only either the variable light transmitter or the fixed light transmitter, a communication system that communicates via light can be realized.

The receiver can receive an optical signal from the transmitter, obtain, for example, relevant information associated with the optical signal, and provide it to the user.

This concludes the summary of the visible light communication method, but communication methods applicable to the light communication to be described in the following embodiments are not limited to this example. For example, the light emitter in the transmitter may transmit data using a plurality of light sources. Moreover, the light receiver in the reception device need not be an image sensor such as a CMOS sensor, and may employ a communication method that can use a device that is capable of converting an optical signal into an electrical signal, such as a photodiode. In such cases, since there is no need to perform sampling using the above-described line scan sampling, such a light receiver is applicable even to methods that require 32400 or more samples per second. Moreover, depending on the application, for example, a wireless communication method that uses light in frequencies outside of the visible light range, such as infrared light or ultraviolet light, may be used.

Embodiment 1

[Principal Aspect (First Aspect) of Present Disclosure]

Hereinafter, as the principal aspect of the present disclosure, one example of communication performed using constellation defined in a virtual space such as a color space will be given. Note that the virtual space according to this aspect is not limited to a color space, but the following description provides an example of visible light communication in which the transmitter presents an optical signal based on a constellation arranged in a color space (the transmitter presents an optical signal based on a constellation arranged in a color system used to express the color space), and the receiver demodulates the received optical signal based on the constellation arranged in the color space (the receiver demodulates the received optical signal based on the constellation arranged in the color system).

Figure 6:
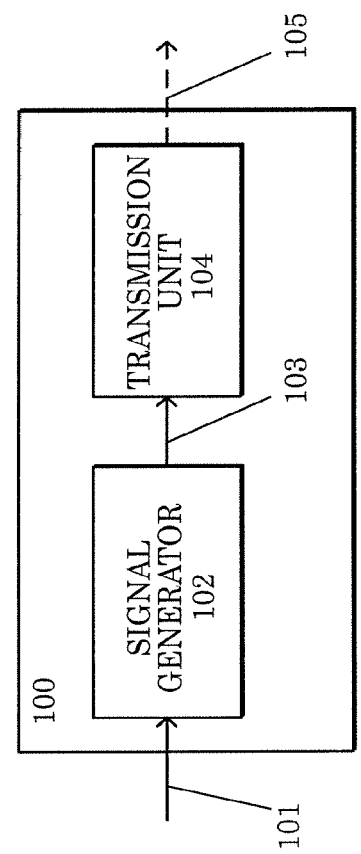
FIG. 6 illustrates a configuration example of a transmission device according to Embodiment 1.

FIG. 6 illustrates one example of a configuration of transmission device 100 including the transmitter according to this embodiment.

[Configuration of Transmission Device 100]

Transmission device 100 includes a visible-light light source, lamp, or light (hereinafter also expressed by the all-encompassing term "light source") such as an LED (Light Emitting Diode).

In transmission device 100 in FIG. 6, signal generator 102, for example, receives an input of transmission data 101 stored in a storage such as memory included in the transmitter, performs mapping based on a modulation scheme based on the arrangement of signal points in the color space specified in transmission data 101, generates a modulation symbol, and outputs the generated modulation symbol as transmission signal 103.

Stated differently, in transmission device 100 in FIG. 6, signal generator 102, for example, receives an input of transmission data 101 stored in a storage such as memory included in the transmitter, performs mapping based on a modulation scheme based on the arrangement of signal points in the color system specified in transmission data 101, generates a modulation symbol, and outputs the generated modulation symbol as transmission signal 103.

Here, conceivable examples of the modulation scheme based on the arrangement of signal points in the color space or the modulation scheme based on the arrangement of signal points in the color system include, when the color space or color system is two-dimensional, BPSK (Binary Phase Shift Keying), QPSK (Quadrature Phase Shift Keying), APSK (Amplitude Phase Shift Keying), 16QAM (Quadrature Amplitude Modulation), 64QAM, NU (Non-Uniform)-QAM, PAM, a modulation scheme having 4 signal points, a modulation scheme having 16 signal points, a modulation scheme having 64 signal points, and a modulation scheme having 256 signal points.

Note that description of the color space and the color system is given in "Computer Graphics", Ohmsha, Ltd., 2001 and "Computer Graphics: Principles and Practice", Ohmsha, Ltd., 2001, for example. A description of a method of arranging signal points in the color space and a description of a method of arranging signal points in the color system will be given later. Moreover, the color space may be selectable in transmission device 100.

Moreover, the color space may be handled in three dimensions. Taking this point into consideration, the signal points can be arranged three-dimensionally in "the arrangement of signal points in the color space" and "the arrangement of signal points in the color system". For example, modulation symbols corresponding to signal points arranged in a three-dimensional color space and modulation symbols corresponding to signal points arranged in a three-dimensional color system are expressed as vectors configured of three real number values.

Note that so long as the expression of modulation symbols indicates points in a two- or three-dimensional color space or points in a two- or three-dimensional color system, the modulation symbols may be expressed in any way.

As used herein, for the color space and the color system, for example, the Munsell color system, CIE (Commission Internationale de l'Eclairage) LAB, CIE XYZ, CIE LUV, sRGB (standard RGB) (see IEC 61966-2-1, Multimedia systems and equipment—Colour measurement and management—Part 2-1: Colour management—Default RGB colour space—sRGB), Adobe RGB (see "Adobe RGB(1998) Color Image Encoding (Technical report)", Adobe Systems Incorporated, 13 May 2005), HSV (hue, saturation, value), and HSB (hue, saturation, brightness) can be used (see "Specification ICC. 1:2010 (Profile version 4.3.0.0) Image technology colour management—Architecture, profile format, and data structure.", "Computer Graphics", Ohmsha, Ltd., 2001, and "Computer Graphics: Principles and Practice", Ohmsha, Ltd., 2001).

Transmission unit 104 includes the above-described light source, and emits or displays optical signal 105 modulated based on the modulation symbol included in transmission signal 103. Transmission unit 104 may control three, or three types of light sources, each of which corresponds to one of the RGB (R: red, G: green, B: blue) colors to generate optical signal 105, and may control a single light source and a liquid crystal panel to generate optical signal 105. Note that when transmission unit 104 uses a plurality of light sources, the number of types of light sources is not limited to the above example of three types; two types or four or more types of light sources may be used. For example, in addition to RGB light sources, white, black, cyan, magenta, yellow, etc., light sources may be used. In other words, the configuration method of the light source is not limited to RGB.

Note that when transmission unit 104 emits, to the receiver, light corresponding to a modulation symbol generated by mapping based on the (selected) color space and/or the (selected) color system, depending on the characteristics of each device used for the emission, processing may be performed for converting the modulation symbol expressed in the color space format or the color system format into a signal used to control the emission by each device. This conversion processing may be realized by any one of, or any combination of: conversion processing that uses a lookup table, conversion processing that uses a matrix operation, conversion processing that uses TCR (tone reproduction curve), and conversion processing that uses a mathematical function.

When transmission device 100 is a device in which the range of colors that can be reproduced by emitted light is limited, such as a lamp capable of color adjustment, signal generator 102 uses a constellation used in mapping for modulation symbols, that is to say, a constellation (signal point arrangement) in which signal points are arranged within a region of the selected color space or the selected color system that can be reproduced by transmission unit 104, as the signal point arrangement.

Moreover, when the format (color space or color system) of the input signals that transmission unit 104 of transmission device 100 handles differs from the format (color space or color system) of the modulation symbol generated using the modulation scheme used by signal generator 102, transmission unit 104 may include a function for converting the modulation symbol into the format (color space or color system) of the input signals that transmission unit 104 handles. In such cases, signal generator 102 outputs the converted modulation symbol as transmission signal 103. The conversion processing performed by signal generator 102 may be the same as the conversion processing that can be performed by transmission unit 104 as described above. More specifically, the conversion processing performed by signal generator 102 is realized by, for example, any one of, or any combination of: conversion processing that uses a lookup table, conversion processing that uses a matrix operation, conversion processing that uses TCR, and conversion processing that uses a mathematical function.

[Configuration of Reception Device 200]

Figure 7:
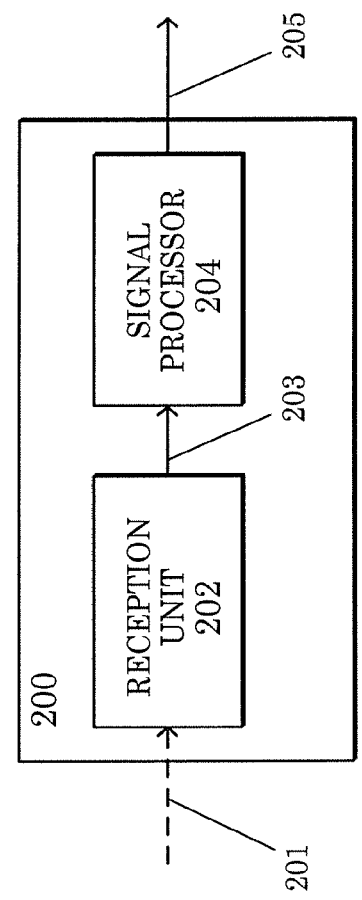
FIG. 7 illustrates a configuration example of a reception device according to Embodiment 1.

FIG. 7 illustrates one example of a configuration of reception device 200 including the receiver according to this aspect.

Reception unit 202 (corresponding to the receiver for visible light communication) in reception device 200 includes, for example, a light receiving element, such as an image sensor, that receives light and converts the light into an electrical signal. Reception unit 202 receives, via the light receiving element, optical signal 201 transmitted from transmission device 100, and outputs reception signal 203. Here, reception signal 203 includes a reception symbol corresponding to the modulation symbol generated by signal generator 102 in transmission device 100.

Figure 8:
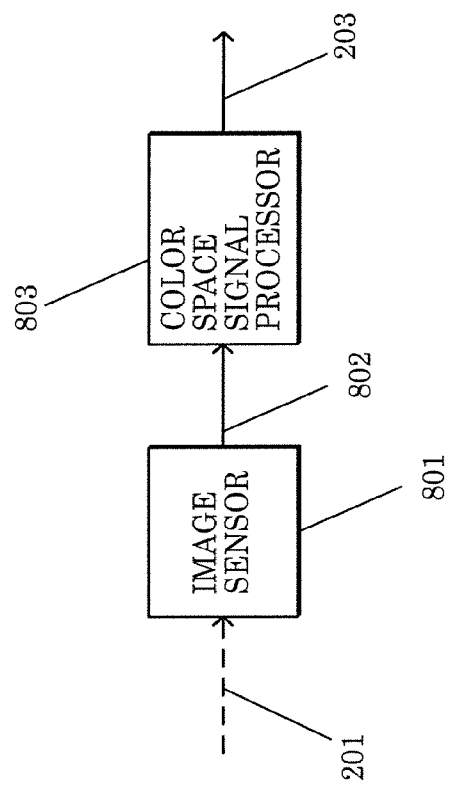
FIG. 8 illustrates a configuration example of a reception unit according to Embodiment 1.

A configuration example of reception unit 202 is illustrated in FIG. 8. Reception unit 202 includes image sensor (light receiving element) 801 and color space signal processor (or color system signal processor) 803.

Image sensor (light receiving element) 801 obtains, for example, three signals corresponding to the RGB colors (hereinafter referred to as signal group 802) received by the light receiving element. Note that here, signal group 802 is configured as three signals of RGB, but this example is not limiting. In other words, signal group 802 may include one or more signals. For example, when a signal other than RGB is received from light receiving element 801, signal group 802 may include this signal.

Color space signal processor (or color system signal processor) 803 receives an input of signal group 802, and obtains, from signal group 802, a signal group in accordance with the format of the color space used by transmission device 100 or the format of the color system used by transmission device 100. Note that this signal group is referred to as a color space signal-processed signal or a color system signal-processed signal. For example, when transmission device 100 uses the sRGB color space, the color space signal-processed signal (or color system signal-processed signal) is a signal in the sRGB format, and thus the color space signal-processed signal (or color system signal-processed signal) is a reception symbol corresponding to the modulation symbol generated by signal generator 102 in transmission device 100, whereby the color space signal-processed signal (or color system signal-processed signal) corresponds to reception signal 203 in FIG. 7.

Note that a detailed example of the color space signal processing and the color system signal processing is given in, for example, "Image Processing in Digital Camera", The Institute of Image Electronics Engineers of Japan, no. 33 VMA Seminar-1, 2012. In color space signal processor (or color system signal processor) 803, when transmission device 100 uses a color space or color system other than sRGB, processing is performed for converting the format of the color space or color system. In other words, when transmission device 100 uses the Adobe RGB color space or color system, color space signal processor (or color system signal processor) 803 generates, via color space signal processing (color system signal processing), a color space signal-processed signal (color system signal-processed signal) in the Adobe RGB format, and outputs it as reception signal 203.

In the color space signal processing and color system signal processing, for example, any one of, or any combination of: conversion processing that uses a lookup table, conversion processing that uses a matrix operation, conversion processing that uses TCR, and conversion processing that uses a mathematical function may be employed.

Signal processor 204 in reception device 200 in FIG. 7 demaps reception signal 203 based on the color space and/or color system used to generate the modulation symbol by signal generator 102 in transmission device 100 to obtain a baseband signal, and thereafter the log-likelihood or log-likelihood ratio of each reception bit is generated. For example, when error correction encoding is performed by transmission device 100, error correction decoding is performed using the log-likelihood or log-likelihood ratio of each reception bit, and reception data 205 corresponding to transmission data 101 is obtained and output.

[Second Aspect]

Hereinafter, a second aspect of the present disclosure that can be implemented in combination with the above-described principal aspect will be described.

Figure 9:
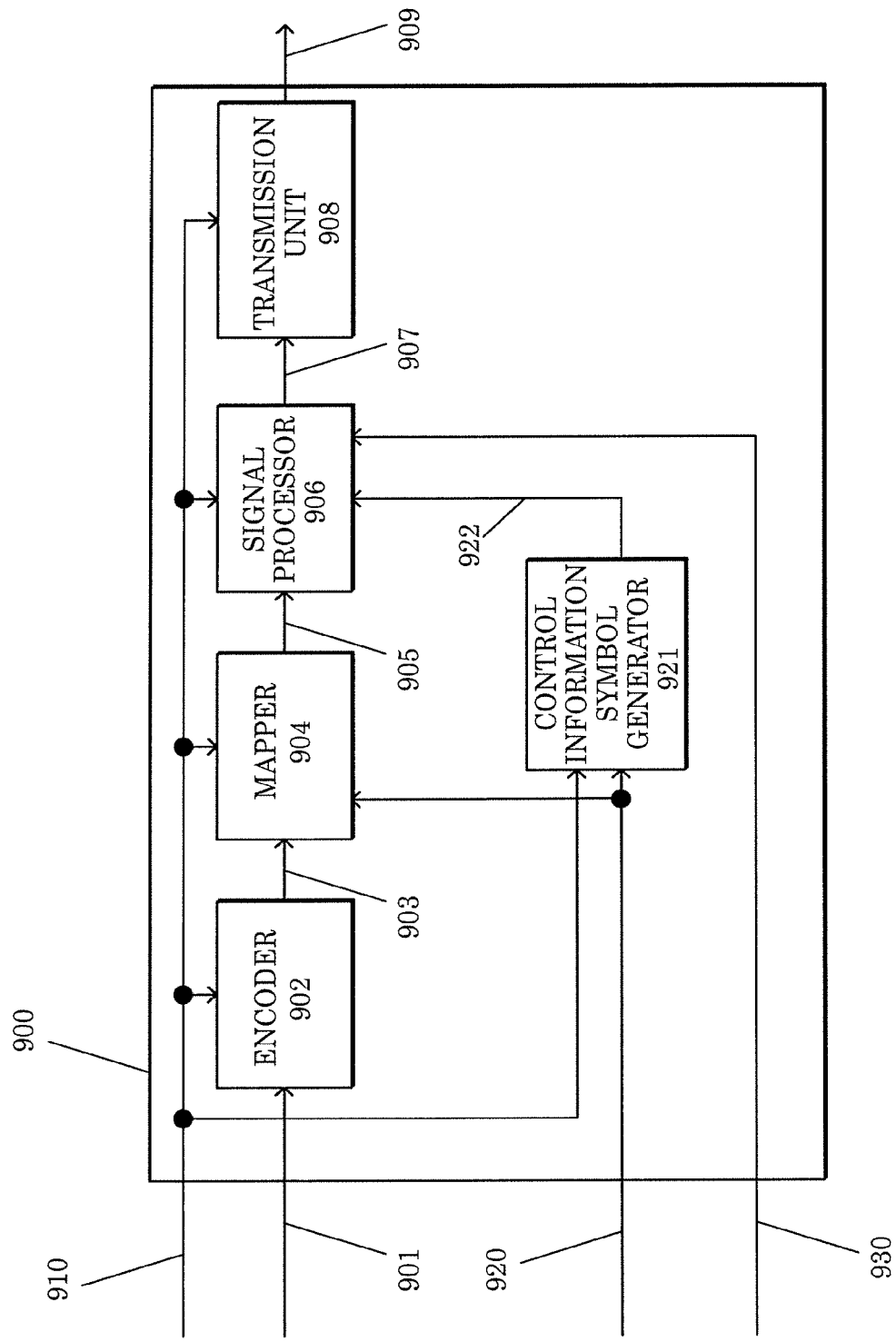
FIG. 9 illustrates a detailed configuration example of the transmission device according to Embodiment 1.

Transmission device 900 in FIG. 9 illustrates one example of a detailed configuration of transmission device 100 in FIG. 6 described above.

Encoder 902 receives inputs of transmission data 901 and control signal 910, and performs error correction encoding processing on transmission data 901 based on information related to the error correction encoding scheme (for example, error correction code, code length, encode rate, etc.) included in control signal 910, and generates and outputs encoded data 903. The encoding processing performed on transmission data 901 by encoder 902 is, for example, error correction encoding that uses an error correction encoding scheme such as LDPC (Low Density Parity Check) code, Turbo code, Polar code, block code, or convolutional code. Note that the encoding processing performed on transmission data 901 by encoder 902 is not limited to error correction code, and may be processing involving 4PPM or Manchester encoding described above.

Moreover, the error encoding processing performed on transmission data 101 by encoder 902 is not limited to the above-described error correction code.

Mapper 904 receives inputs of encoded data 903, control signal 910, and information 920 related to the color space method (or information 920 related to the color system method), and based on information related to the mapping method used in the color space (or information related to the mapping method used in the color system) included in information 920 related to the color space method (or information 920 related to the color system method) and information related to the modulation scheme included in control signal 910, maps encoded data 903 bit-by-bit or in groups of two or more bits to any one of the signal points defined in the color space, performs demodulation, and generates and outputs modulation symbol (baseband signal) 905. The mapping processing performed by mapper 904 will be described later.

Control information symbol generator 921 receives inputs of control signal 910 and information 920 related to the color space method (or information 920 related to the color system method), and, in order to notify the reception device that is the communication partner of the error correction encoding scheme information, the modulation scheme information, and the information related to the mapping method in the color space used by transmission device 900 upon generation of a modulation symbol (baseband signal), generates and outputs control information symbol 922 including the error correction encoding scheme information, the modulation scheme information, and the information related to the mapping method in the color space (or the information related to the mapping method for the color system).

Signal processor 906 receives inputs of modulation symbol (baseband signal) 905, control information symbol 922, preamble (and/or reference symbol (reference signal), pilot symbol (pilot signal)) 930, and control signal 910, and based on information on the frame configuration included in control signal 910, generates and outputs transmission signal 907 conforming to the frame configuration, from modulation symbol (baseband signal) 905, control information symbol 922, and preamble (and/or reference symbol (reference signal), pilot symbol (pilot signal)) 930.

Transmission unit 908 receives inputs of transmission signal 907 conforming to the frame configuration, and control signal 910, and emits, to the receiver, optical signal 909 corresponding to transmission signal 907 conforming to the frame configuration. Note that when the color space to be used (the color system to be used) differs depending on the symbol, the light emission method is controlled based on information on the color space (or information on the color system) included in control signal 910.

Figure 10:
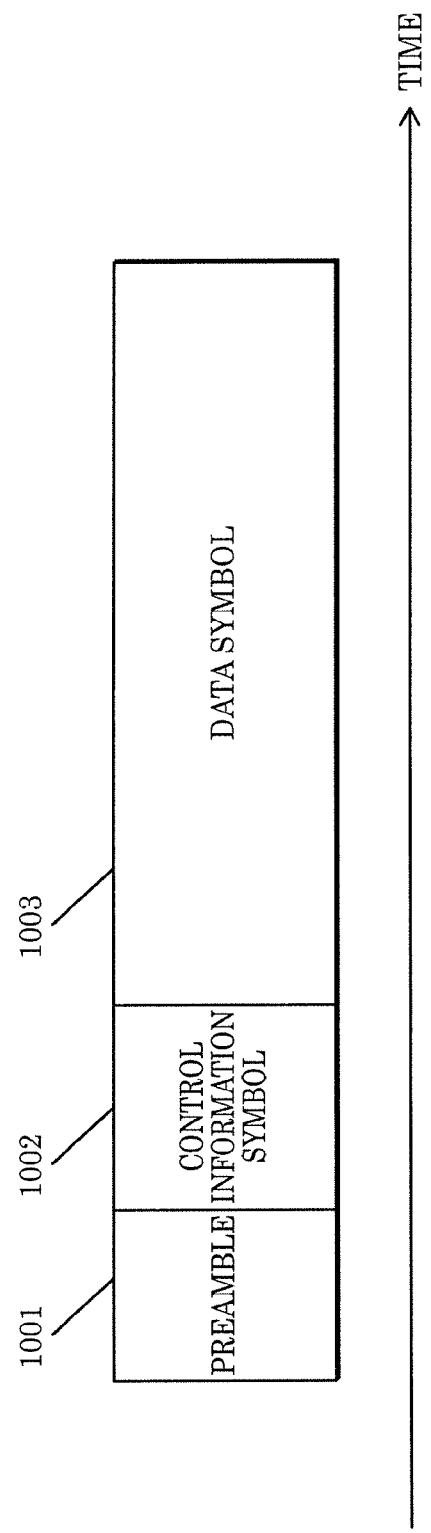
FIG. 10 illustrates a configuration example of a frame according to Embodiment 1.

FIG. 10 illustrates an example of a frame configuration of transmission signal 907 transmitted by transmission device 900 in FIG. 9. Time is represented on the horizontal axis.

In the frame configuration illustrated in FIG. 10, symbols are transmitted in the following order: preamble 1001, control information symbol 1002, and data symbol 1003.

Here, preamble 1001 is a symbol for the reception device that is the communication partner of transmission device 900 to perform signal detection and/or time synchronization.

Here, control information symbol 1002 is a symbol for notifying the reception device that is the communication partner of transmission device 900 of, for example, the error correction encoding scheme information, the modulation scheme information, and the information related to the color space (or the information related to the color system) used to generate data symbol 1003. However, the information included in control information symbol 1002 is not limited to the error correction encoding scheme information, the modulation scheme information, and the information related to the color space (or the information related to the color system). Moreover, control information symbol 1002 includes at least the information related to the color space (or the information related to the color system), and need not include the error correction encoding scheme information or the modulation scheme information.

Note that the modulation scheme information may be modulation scheme information based on the color space or modulation scheme information based on the color system.

Here, the information related to the color space (or the information related to the color system) is, for example, information for notifying the color space that data symbol 1003 transmitted by transmission device 900 is based on (the color system that symbol 1003 transmitted by transmission device 900 is based on).

For example, if data symbol 1003 is a symbol based on the sRGB color space (color system), the information related to the color space (or the information related to the color system) includes information indicating that data symbol 1003 is a (modulated) symbol based on the sRGB color space.

Similarly, for example, if data symbol 1003 is a symbol based on the Adobe RGB color space (color system), the information related to the color space (or the information related to the color system) includes information indicating that data symbol 1003 is a (modulated) symbol based on the Adobe RGB color space.

For example, if data symbol 1003 is a symbol based on a three-dimensional color space (color system), the information related to the color space (or the information related to the color system) includes information indicating that data symbol 1003 is a (modulated) symbol based on a three-dimensional color space.

For example, if data symbol 1003 is a symbol that can be demodulated by the reception device of the communication partner via a luminance signal (brightness signal, signal amplitude) included in the reception signal, the information related to the color space (or the information related to the color system) includes information indicating that data symbol 1003 is a symbol that can be demodulated via a luminance signal (brightness signal, signal amplitude). Note that examples of schemes for the symbol that can be demodulated via a luminance signal (brightness signal, signal amplitude) include a PPM scheme such as 4PPM, a scheme that applies Manchester encoding, an ASK scheme, a BPSK scheme, and a PAM scheme, which have already been described.

Data symbol 1003 is a symbol for transmitting data, and corresponds to, for example, modulation symbol (baseband signal) 905 in FIG. 9.

The significant points in this embodiment are as follows.

<1> Preamble 1001 enables the reception device that is the communication partner of transmission device 900 to be capable of signal detection and/or time synchronization via a luminance signal (brightness signal, signal amplitude) included in a reception signal. Accordingly, preamble 1001 is a symbol based on any one of a PPM scheme such as 4PPM, a scheme that applies Manchester encoding, an ASK scheme, a BPSK scheme, and a PAM scheme, as described above.

This configuration achieves the advantageous effect that preamble 1001 can be identified regardless of the color space that the reception device that is the communication partner of transmission device 900 supports. That is to say, this configuration achieves the advantageous effect that, regardless of the supported color space, the reception device that is the communication partner of transmission device 900 can perform signal detection and/or time synchronization based on preamble 1001.

<2> Control information symbol 1002 is a symbol which can be demodulated by the reception device that is the communication partner of transmission device 900, via a luminance signal (brightness signal, signal amplitude) included in a reception signal. Accordingly, control information symbol 1002 is a symbol based on any one of a PPM scheme such as PPM, a scheme that applies Manchester encoding, an ASK scheme, a BPSK scheme, and a PAM scheme, as described above.

This configuration achieves the advantageous effect that control information symbol 1002 can be identified regardless of the color space that the reception device that is the communication partner of transmission device 900 supports. That is to say, this configuration achieves the advantageous effect that, regardless of the supported color space, the reception device that is the communication partner of transmission device 900 can obtain control information included in the control information symbol.

Here, control information symbol 1002 includes information related to the color space (or information related to the color system) used in the generation of data symbol 1003. This enables the reception device that is the communication partner of transmission device 900 to determine whether data symbol 1003 can be demodulated or not, as a result of obtaining control information symbol 1002. Accordingly, by obtaining control information symbol 1002, the reception device can accurately determine whether to perform operations for demodulating data symbol 1003 or not. Controlling this prevents reception device from unnecessarily consuming power.

<3> data symbol 1003 achieves data transmission via a symbol based on a transmission method that enables demodulation via a luminance signal (brightness signal, signal amplitude) whose scheme is any one of a PPM scheme such as PPM, a scheme that applies Manchester encoding, an ASK scheme, a BPSK scheme, and a PAM scheme, as described above, or a modulation scheme based on the arrangement of signal points in the color space (color system).

This makes it possible to achieve the advantageous effect that both improvement in data transmission speeds and data reception quality can be achieved, by switching the transmission method and modulation method used for data symbol 1003 based on the demodulation capability of the reception device that is the communication partner of transmission device 900.

Figure 11:
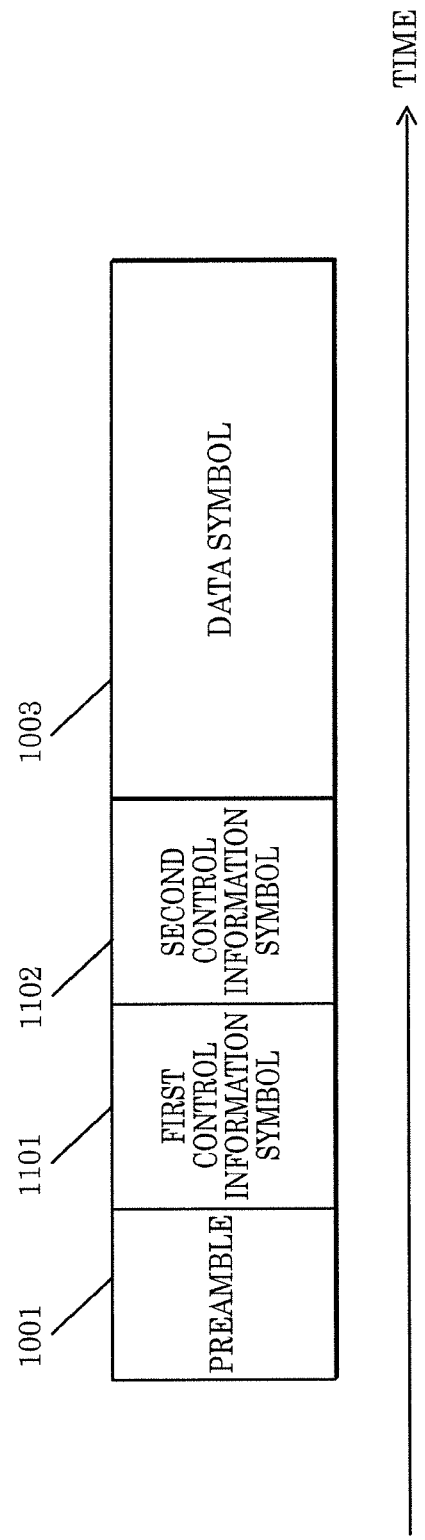
FIG. 11 illustrates another configuration example of a frame according to Embodiment 1.

FIG. 11 illustrates an example, which differs from the example in FIG. 10, of a frame configuration of a transmission signal transmitted by transmission device 900 in FIG. 9. Time is represented on the horizontal axis. Note that in FIG. 11, objects that operate the same as in FIG. 10 share like reference marks. Accordingly, repeated description thereof will be omitted.

In FIG. 11, first control information symbol 1101 is a symbol that can be demodulated by the reception device of the communication partner via a luminance signal (brightness signal, signal amplitude) included in a reception signal, and includes at least information related to the color space (or information related to the color system).

Second control information symbol 1102 is a symbol having the same scheme as data symbol 1003, that is to say, is a symbol based on a transmission method that enables demodulation via a luminance signal (brightness signal, signal amplitude) whose scheme is any one of a PPM scheme such as PPM, a scheme that applies Manchester encoding, an ASK scheme, a BPSK scheme, and a PAM scheme, as described above, or a modulation scheme based on the arrangement of signal points in the color space (color system). For example, second control information symbol 1102 may include information on the error correction encoding method used to generate data symbol 1003 and information on the modulation scheme used to generate data symbol 1003.

Even with the frame configuration illustrated in FIG. 11, the same advantageous effects as those described when the frame configuration illustrated in FIG. 10 is employed can be achieved.

Note that although the frame configuration illustrated in FIG. 10 is exemplified as including preamble 1001, control information symbol 1002, and data symbol 1003, the frame configuration illustrated in FIG. 10 may include other symbols as well. Moreover, other symbols may be included between data symbols 1003. In other words, symbols may be arranged in the order of: data symbol, other symbol, data symbol. Note that examples of "other symbols" include, but are not limited to, a pilot symbol, a reference symbol, and a control information symbol.

Moreover, although the frame configuration illustrated in FIG. 11 is exemplified as including preamble 1001, first control information symbol 1101, second control information symbol 1102, and data symbol 1003, the frame configuration illustrated in FIG. 11 may include other symbols as well. Moreover, other symbols may be included between data symbols 1003. In other words, symbols may be arranged in the order of: data symbol, other symbol, data symbol. Note that examples of "other symbols" include, but are not limited to, a pilot symbol, a reference symbol, and a control information symbol.

Moreover, control information symbol 1002, first control information symbol 1101, and second control information symbol 1102 may include other control information required for performing communication, such as address information indicating the address of transmission device 900 or the transmitter included in transmission device 900, or the address of the reception device that is the communication partner or the receiver included in the reception device.

Moreover, the modulated signal transmitted by transmission device 900 is not limited to the frame configurations illustrated in FIG. 10 and FIG. 11; the modulated signal may include symbols other than those illustrated in FIG. 10 and FIG. 11, and the order in which the symbols are transmitted is not limited to the orders illustrated in FIG. 10 and FIG. 11.

Figure 12:
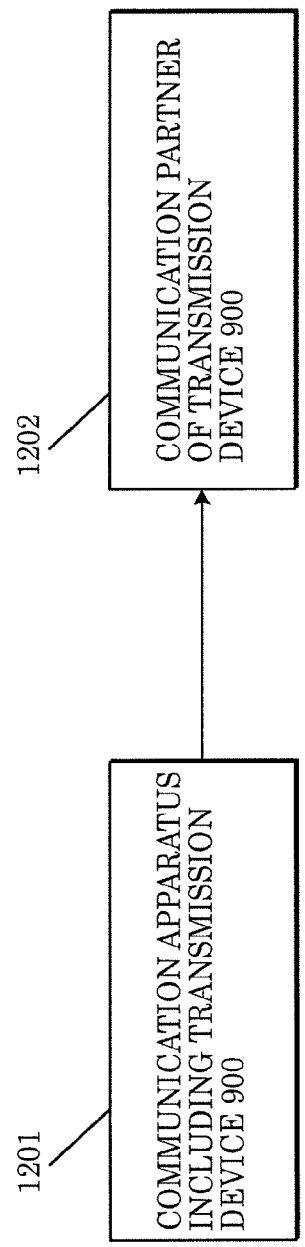
FIG. 12 illustrates an example of the relationship between a communication apparatus and a communication partner according to Embodiment 1.

FIG. 12 illustrates a relationship between communication apparatus 1201 including transmission device 900 and communication partner 1202 of transmission device 900.

Communication apparatus 1201 including transmission device 900 transmits (emits) a modulated signal to communication partner 1202 of transmission device 900. Here, communication apparatus 1201 including transmission device 900 does not receive feedback from communication partner 1202 of transmission device 900. Here, the transmission method used for data symbol 1003 in FIG. 10 or FIG. 11 is determined by communication apparatus 1201 including transmission device 900. Here, for example, the transmission method is either one of a transmission method that enables demodulation via a luminance signal (brightness signal, signal amplitude) included in a reception signal or a modulation scheme based on the arrangement of signal points in the color space (color system). Note that when communication apparatus 1201 including transmission device 900 selects a modulation scheme based on the arrangement of signal points in the color space (color system), a color space (color system) can be selected.

Figure 13:
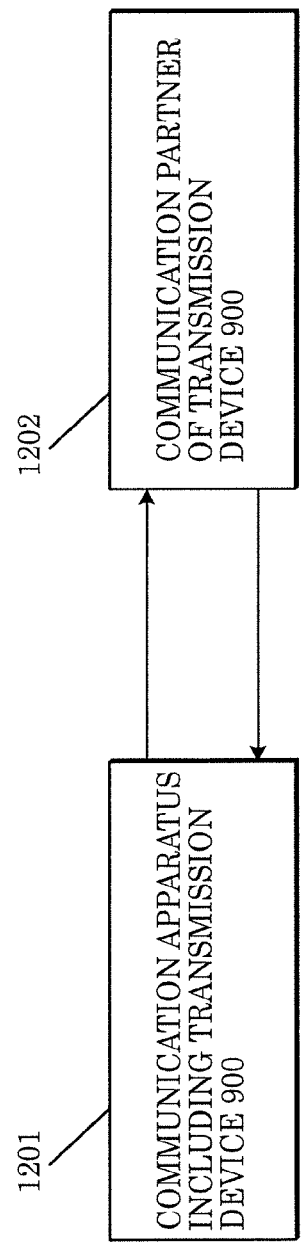
FIG. 13 illustrates another example of the relationship between a communication apparatus and a communication partner according to Embodiment 1.

FIG. 13 illustrates a relationship between communication apparatus 1201 including transmission device 900 and communication partner 1202 of transmission device 900, which differs from the relationship illustrated in FIG. 12.

Communication apparatus 1201 including transmission device 900 transmits (emits) a modulated signal to communication partner 1202 of transmission device 900. Moreover, communication partner 1202 of transmission device 900 includes a transmission device, and the transmission device included in communication partner 1202 of transmission device 900 can transmit a modulated signal to communication apparatus 1201 including transmission device 900.

Here, communication apparatus 1201 including transmission device 900 may determine the transmission method to be used by data symbol 1003 in FIG. 10 and FIG. 11 based on the modulated signal transmitted by communication partner 1202 of transmission device 900 and/or information included in the modulated signal.

For example, when communication partner 1202 of transmission device 900 transmits information on transmission methods that can be demodulated to communication apparatus 1201 including transmission device 900, communication apparatus 1201 including transmission device 900 can determine the transmission method of data symbol 1003 to be transmitted based on the information on transmission methods that can be demodulated.

Figure 14:
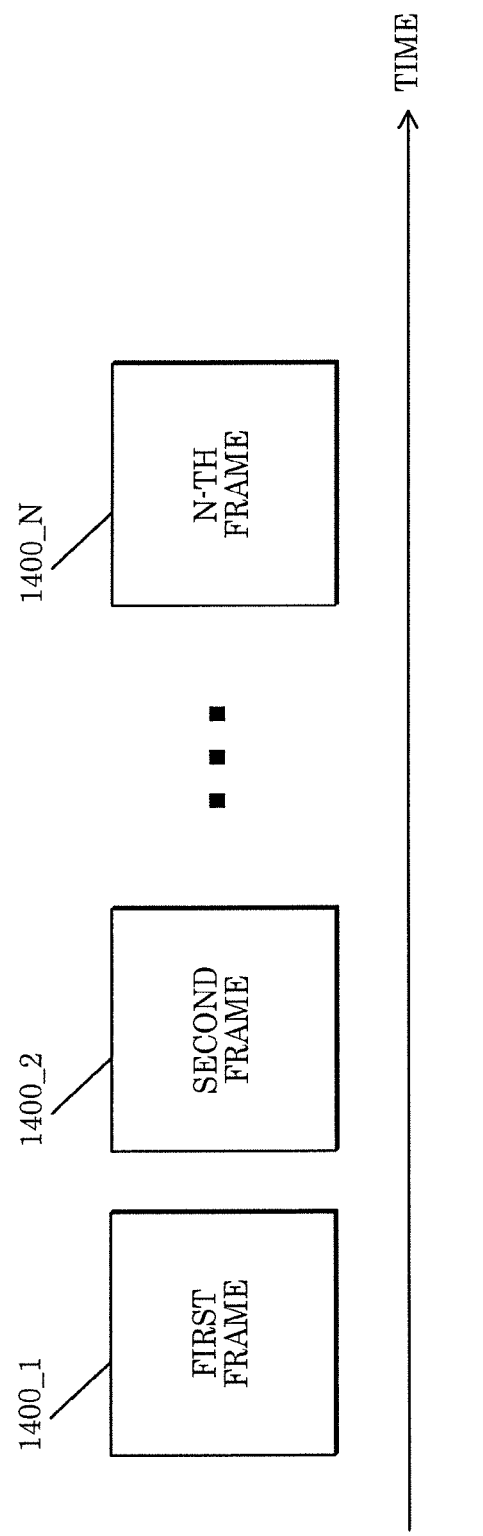
FIG. 14 illustrates one example of frame transmission according to Embodiment 1.

FIG. 14 illustrates an example of a frame of a transmission signal on the time axis when, for example, communication apparatus 1201 that is illustrated in FIG. 12 and FIG. 13 and includes transmission device 900 transmits the transmission signal. In FIG. 14, time is represented on the horizontal axis.

As illustrated in FIG. 14, consider a case in which communication apparatus 1201 that is illustrated in FIG. 12 and FIG. 13 and includes transmission device 900 transmits first frame 1400_1, and thereafter transmits second frame 1400_2, . . . , and N-th frame 1400_N. Here, each of first frame 1400_1, second frame 1400_2, . . . , and N-th frame 1400_N has the frame configuration illustrated in FIG. 10 or FIG. 11.

When each of first frame 1400_1, second frame 1400_2, . . . , and N-th frame 1400_N has the frame configuration illustrated in FIG. 10, for example, the transmission method of data symbol 1003 such as settings related to color space (color system) is determined on a per-frame basis or on the basis of a plurality of frames, for example. Here, control information symbol 1002 includes information on the transmission method such as settings related to color space (color system).

With this, the communication partner of transmission device 900 can know information on the settings for the color space (color system) of data symbol 1003 transmitted by communication apparatus 1201 including transmission device 900, by demodulating control information symbol 1002. Here, there is the advantage that control information symbol 1002 can be demodulated, regardless of what type of color space (color system) the communication partner of transmission device 900 supports.

When each of first frame 1400_1, second frame 1400_2, . . . , and N-th frame 1400_N has the frame configuration illustrated in FIG. 11, for example, the transmission method of data symbol 1003 such as settings related to color space (color system) is determined on a per-frame basis or on the basis of a plurality of frames, for example. Here, first control information symbol 1101 includes information on the transmission method such as settings related to color space (color system).

With this, the communication partner of transmission device 900 can know information on the settings for the color space (color system) of data symbol 1003 transmitted by communication apparatus 1201 including transmission device 900, by demodulating first control information symbol 1101. Here, there is the advantage that first control information symbol 1101 can be demodulated, regardless of what type of color space (color system) the communication partner of transmission device 900 supports.

Figure 15:
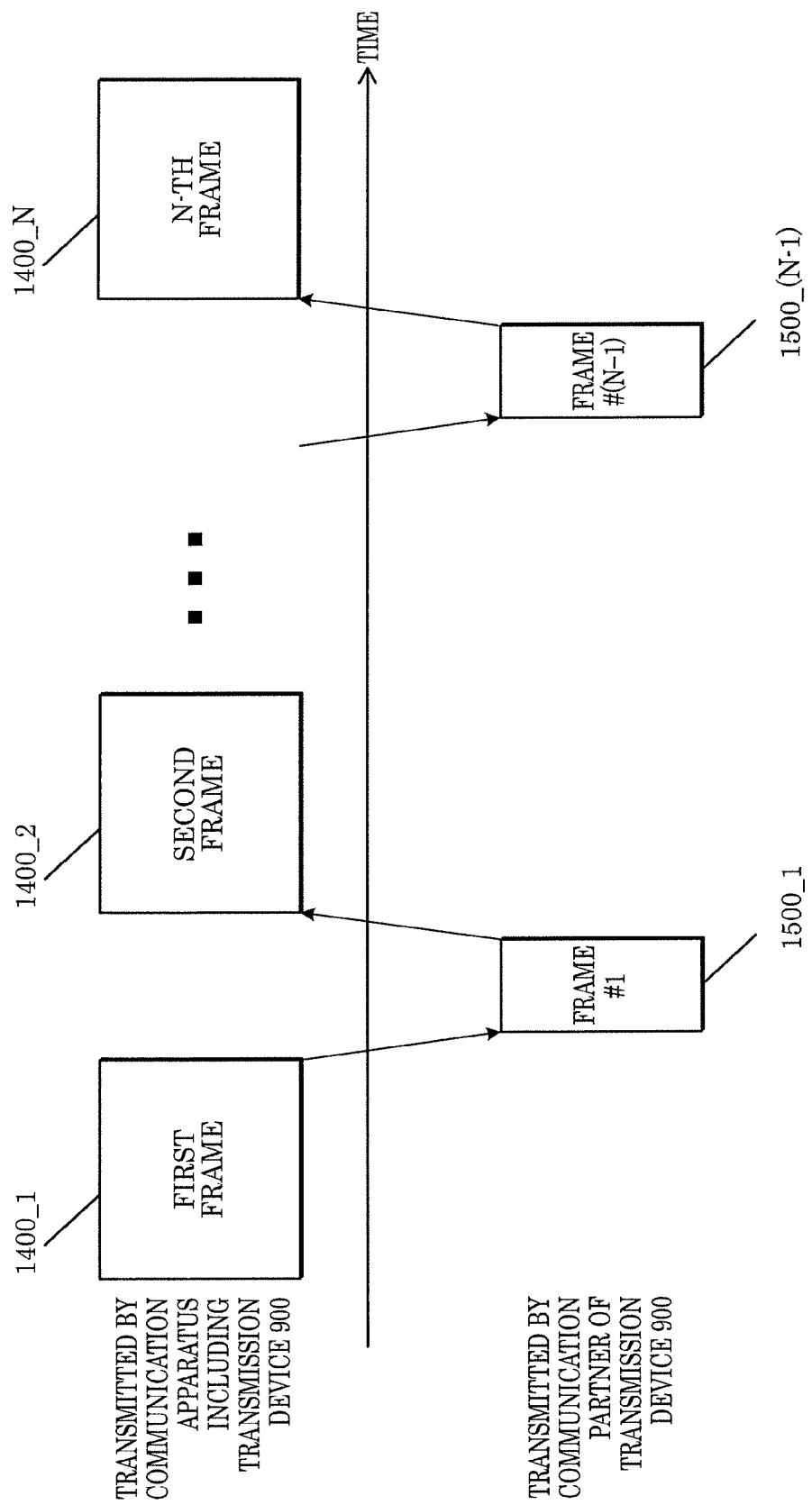
FIG. 15 illustrates another example of frame transmission according to Embodiment 1.

The top half of FIG. 15 illustrates an example of a frame of a transmission signal on the time axis when, for example, communication apparatus 1201 illustrated in FIG. 12 or FIG. 13 and including transmission device 900 transmits the transmission signal, and the bottom half of FIG. 15 illustrates an example of a frame configuration of a transmission signal on the time axis when, for example, the communication partner of transmission device 900 illustrated in FIG. 12 or FIG. 13 transmits the transmission signal.

In FIG. 15, just like in FIG. 14, consider a case in which communication apparatus 1201 that is illustrated in FIG. 12 and FIG. 13 and includes transmission device 900 transmits first frame 1400_1, and thereafter transmits second frame 1400_2, . . . , and N-th frame 1400_N. Here, each of first frame 1400_1, second frame 1400_2, . . . , and N-th frame 1400_N has the frame configuration illustrated in FIG. 10 or FIG. 11.

FIG. 15 differs from FIG. 14 in that, for example, the communication partner of transmission device 900 transmits frame #1 (1500_1) between the transmissions of first frame 1400_1 and second frame 1400_2 by communication apparatus 1201 including transmission device 900.

As already described, communication apparatus 1201 including transmission device 900 receives frame #1 (1500_1) transmitted by the communication partner of transmission device 900, and communication apparatus 1201 including transmission device 900 switches the transmission method of data symbol 1003 in second frame 1400_2, such as the color space (color system) settings, modulation scheme, and signal point arrangement, based on, for example, the information in frame #1 (1500_1).

Note that the transmission method of first frame 1400_1, second frame 1400_2, . . . , and N-th frame 1400_N has already been described in the description of FIG. 14, so repeated description will be omitted.

As already described, data symbol 1003 in FIG. 10 and FIG. 11 is a region in which, for example, modulation symbol generated by mapper 904 in FIG. 9 is arranged.

Here, cases in which data symbol 1003 may possibly include a modulation symbol mapped to any given one of a plurality of signal points included in a constellation defined in a first color space (first color system) or a modulation symbol mapped to any given one of a plurality of signal points included in a constellation defined in a second color space (second color system) different from the first color space (first color system). In such cases, since reception device 200 in FIG. 7 performs demapping on a reception symbol, information on the color space (color system) used in the generation of the modulation symbol needs to be obtained. Accordingly, transmission device 900 in FIG. 9 transmits, in a control information symbol, information indicating the color space (color system) of the modulation scheme used to generate the modulation symbol to be transmitted by data symbol 1003. Note that when, for example, a first modulation scheme is a scheme that uses four signal points arranged in the first color space (first color system), and a second modulation scheme is a scheme that uses four signal points arranged in the second color space (second color system), transmission device 900 in FIG. 9 may notify reception device 200 in FIG. 7 of the color space (color system) to be used to demodulate the reception signal by transmitting, in a control information symbol, information indicating which of the first modulation scheme and the second modulation scheme was used to generate data symbol 1003.

Next, cases in which transmission device 900 in FIG. 9 makes the modulation scheme to be used to generate preamble 1001 in FIG. 10 and/or control information symbol 1002 (alternatively, preamble 1001 in FIG. 11 and/or first control information symbol 1101) and the modulation scheme to be used to generate data symbol 1003 different. Here, for example, transmission device 900 in FIG. 9 transmits, as a preamble and a control information symbol, a signal modulated using a modulation scheme that varies the brightness (luminance or amplitude), and transmits, as data symbol 1003, a signal modulated using a modulation scheme that varies the color difference. With this configuration, reception device 200 in FIG. 7 can detect preamble 1001 and determine it to be the head of the frame, by detecting the changes in brightness of the reception signal. Accordingly, processing can be simplified compared to, for example, cases in which reception device 200 in FIG. 7 performs processes for detecting preamble 1001 by consistently converting the reception signal into a signal of one or more color spaces (color systems) in order to detect preamble 1001. Regarding the simplification of such processes, the same advantageous effects as those achieved when reception device 200 in FIG. 7 receives control information symbol 1002 can be achieved.

Next, an example of a detailed configuration of reception device 1600, which is the communication partner of transmission device 900 in FIG. 9, will be given with reference to FIG. 16.

Figure 16:
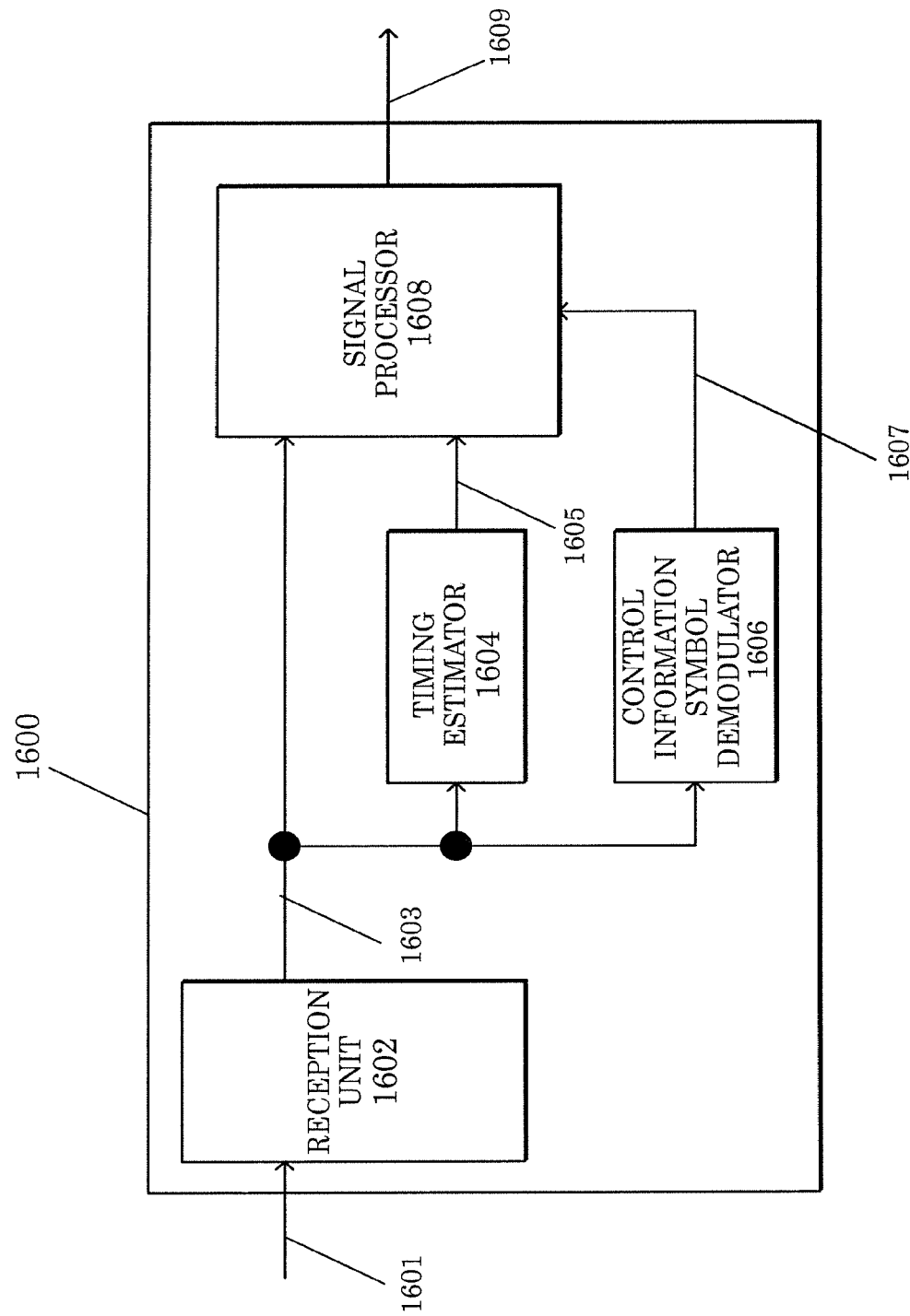
FIG. 16 illustrates a detailed configuration example of the reception device according to Embodiment 1.

FIG. 16 illustrates one example of a detailed configuration of reception device 1600, which is the communication partner of transmission device 900 in FIG. 9. Reception unit 1602 included in reception device 1600 in FIG. 16 is, for example, an image sensor, and receives an input of optical signal 1601.

Reception unit 1602 outputs, for example, three signals corresponding to RGB, that is, outputs signal group 1603.

Timing estimator 1604 receives an input of signal group 1603, and when, for example, the transmission device that is the communication partner of reception device 1600 transmits a modulated signal having the frame configuration illustrated in FIG. 10, timing estimator 1604 detects preamble 1001 to perform signal detection and time synchronization, and outputs timing estimation signal 1605.

When the transmission device that is the communication partner of reception device 1600 transmits a modulated signal having the frame configuration illustrated in FIG. 11, timing estimator 1604 detects preamble 1001 to perform signal detection and time synchronization, and outputs timing estimation signal 1605.

Control information symbol demodulator 1606 receives an input of signal group 1603, and when, for example, the transmission device that is the communication partner of reception device 1600 transmits a modulated signal having the frame configuration illustrated in FIG. 10, demodulates control information symbol 1002, and outputs control information 1607.

When the transmission device that is the communication partner of reception device 1600 transmits a modulated signal having the frame configuration illustrated in FIG. 11, control information symbol demodulator 1606 receives an input of signal group 1603, demodulates first control information symbol 1101, and outputs control information 1607.

Here, control information 1607 includes information on the color space (information on the color system) of data symbol 1003.

When the transmission device that is the communication partner of reception device 1600 transmits a modulated signal having the frame configuration illustrated in FIG. 10, signal processor 1608 receives inputs of signal group 1603, timing estimation signal 1605, and control information 1607, extracts data symbol 1003 from signal group 1603 using timing estimation signal 1605, recognizes the color space or color system of data symbol 1003 from the information on the color space (information on the color system) included in control information 1607, recognizes the symbol configuration of data symbol 1003 from control information 1607, demodulates data symbol 1003, and outputs reception data 1609.

When the transmission device that is the communication partner of reception device 1600 transmits a modulated signal having the frame configuration illustrated in FIG. 11, signal processor 1608 receives inputs of signal group 1603, timing estimation signal 1605, and control information 1607, extracts second control information symbol 1102 and data symbol 1003 from signal group 1603 using timing estimation signal 1605, recognizes the color space or color system of second control information symbol 1102 and data symbol 1003 from the information on the color space (information on the color system) included in control information 1607, first demodulates second control information symbol 1102, then recognizes the symbol configuration of data symbol 1003 from information included in control information 1607 and second control information symbol 1102, demodulates data symbol 1003, and outputs reception data 1609.

By performing the above operations, the reception device can demodulate data included in a data symbol. Here, the reception device can achieve an advantageous effect in that demodulation operations can be accurately controlled, based on the information on the color space (information on the color system) included in the control information symbol. For example, when the communication partner transmits a data symbol in a color space (color system) not supported by the reception device, the reception device can obtain information on the color space (information on the color system) and decide not to demodulate the data symbol. This achieves the advantageous effect that it is possible to reduce power consumption by the reception device.

Next, a modulation scheme based on a color space, for example a modulation scheme based on signal points arranged in a color system will be described. A color system is a systemization of expressions of colors (a system in which colors are expressed as symbols or values). Color systems are broadly categorized into color appearance systems and color mixing systems. Examples of color appearance systems include the Munsell color system and PCCS (Practical Color Co-ordinate System), and examples of color mixing systems include CIE (Commission Internationale de l'Eclairage) XYZ, CIE LUV, CIE LAB, and sRGB.

Hereinafter, an example of a modulation scheme based on signal points arranged in a color space or color system will be given.

First, the CIE XYZ color system will be described.

Tristimulus values X, Y, and Z are calculated from an R (Red) signal, a G (Green) signal, and a B (Blue) signal. Here, the X, Y, and Z tristimulus values are characterized in that they do not become negative over all wavelengths. The CIE XYZ color system is characterized by the expression of colors using X, Y, and Z.

Normalized values of the tristimulus values X, Y, and Z obtained via the following equations are referred to as chromaticity, and are expressed as x, y, and z.

[MATH. 1]
$$x = \frac{X}{X+Y+Z} \qquad \text{Equation (1)}$$

[MATH. 2]
$$y = \frac{Y}{X+Y+Z} \qquad \text{Equation (2)}$$

[MATH. 3]
$$z = \frac{Z}{X+Y+Z} \qquad \text{Equation (3)}$$

Figure 17:
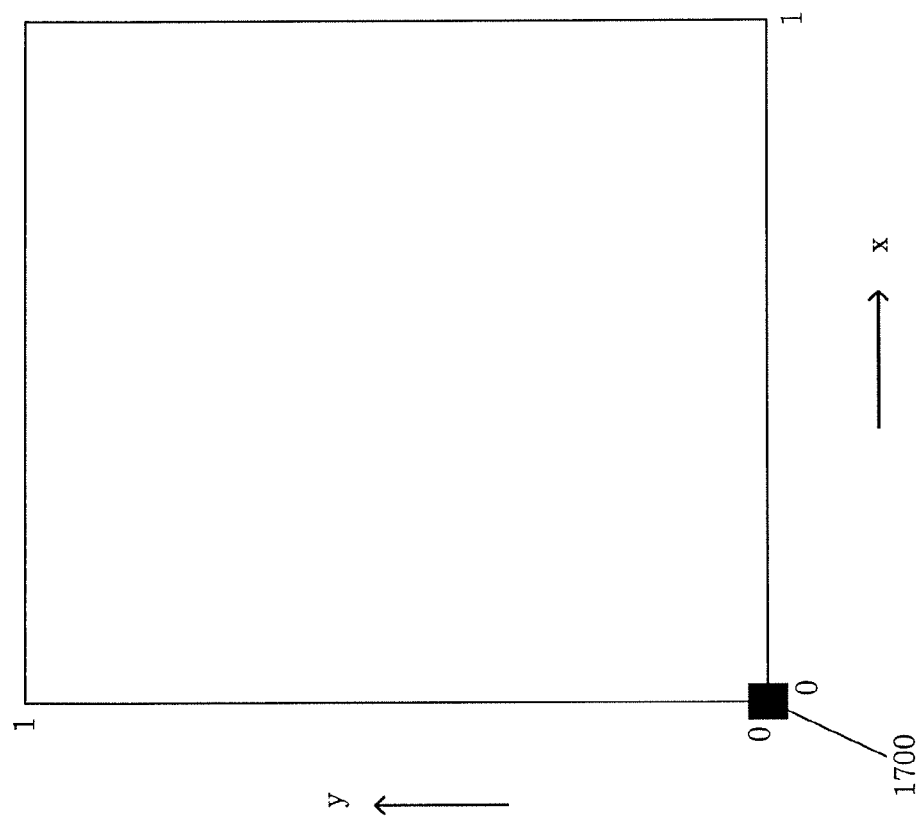
FIG. 17 illustrates one example of a color space (color system) in which signal points in a modulation scheme according to Embodiment 1 are arranged.

Chromaticities x, y, and z are expressed as ratios of the values of X, Y, and Z, and are advantageous in that they consider hue without taking brightness into account. Moreover, since the equation x+y+z=1 holds true, if x and y are known, z can be solved for. FIG. 17 illustrates colors perceptible to the human eye expressed in a two-dimensional plane having a horizontal axis x and a vertical axis y.

In FIG. 17, the horizontal axis is x and the vertical axis is y. The origin (0, 0) is 1700. What is shown in FIG. 17 is referred to as an xy chromaticity diagram, and the coordinates in the xy chromaticity diagram are referred to as the xy chromaticity coordinates.

An example of a modulation scheme based on signal points using the xy chromaticity diagram will be given.

Figure 18:
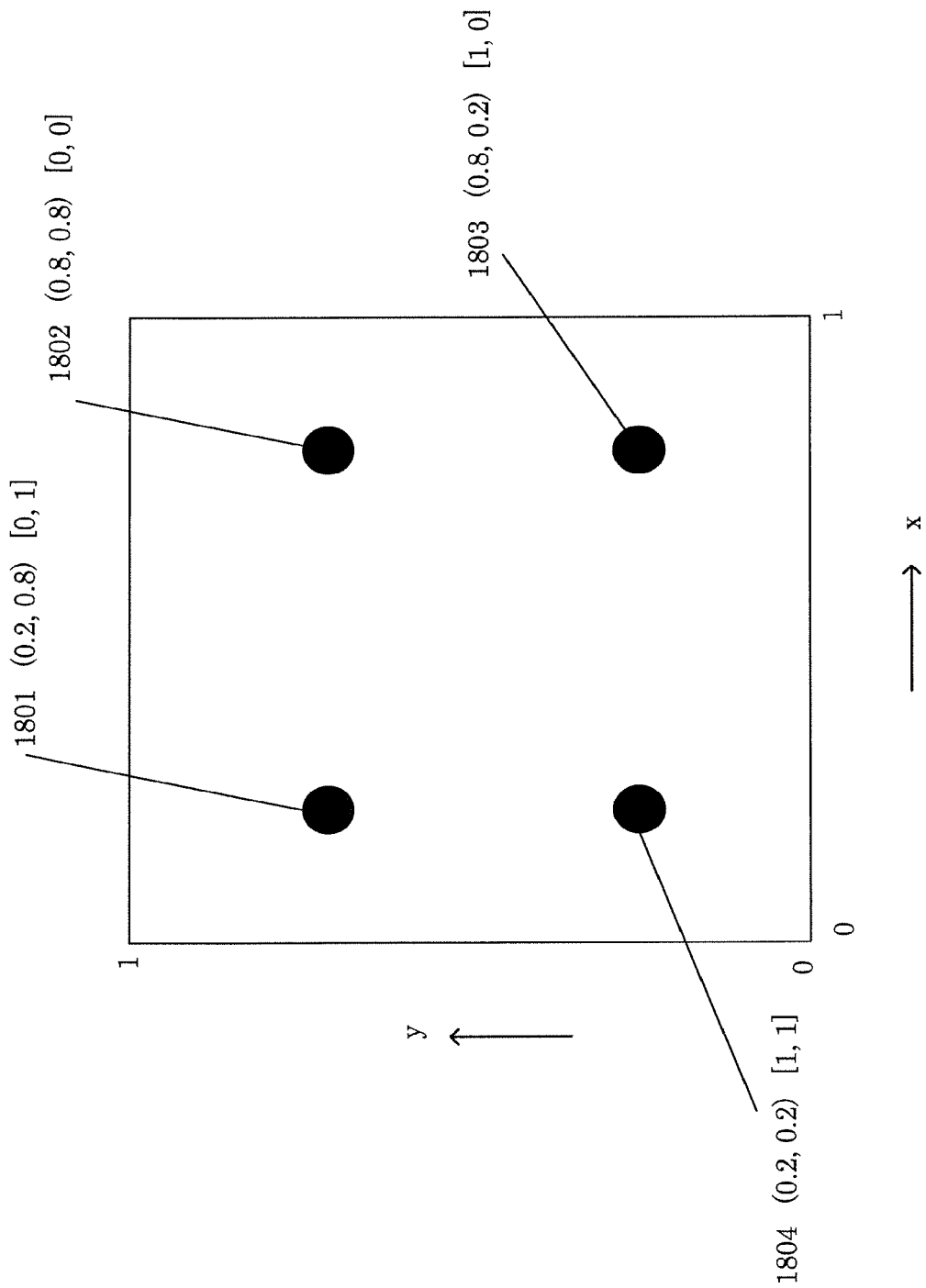
FIG. 18 illustrates one example of an arrangement of signal points in a modulation scheme according to Embodiment 1.

FIG. 18 illustrates a modulation scheme having four signal points in an xy chromaticity diagram. Just like in FIG. 17, the horizontal axis is x and the vertical axis is y. The four black dots in FIG. 18 represent the signal points.

Signal point 1801 has an x value of 0.2 and a y value of 0.8, which are expressed as (x, y)=(0.2, 0.8).

Signal point 1802 has an x value of 0.8 and a y value of 0.8, which are expressed as (x, y)=(0.8, 0.8).

Signal point 1803 has an x value of 0.8 and a y value of 0.2, which are expressed as (x, y)=(0.8, 0.2).

Signal point 1804 has an x value of 0.2 and a y value of 0.2, which are expressed as (x, y)=(0.2, 0.2).

When the input bits are expressed as bit b0 and bit b1, when b0=0 and b1=1, that is to say, [b0, b1]=[0, 1], this is mapped to signal point 1801, resulting in a mapping output of (x, y)=(0.2, 0.8).

Similarly, when the input bits are expressed as bit b0 and bit b1, when b0=0 and b1=0, that is to say, [b0, b1]=[0, 0], this is mapped to signal point 1802, resulting in a mapping output of (x, y)=(0.8, 0.8).

When the input bits are expressed as bit b0 and bit b1, when b0=1 and b1=0, that is to say, [b0, b1]=[1, 0], this is mapped to signal point 1803, resulting in a mapping output of (x, y)=(0.8, 0.2).

When the input bits are expressed as bit b0 and bit b1, when b0=1 and b1=1, that is to say, [b0, b1]=[1, 1], this is mapped to signal point 1804, resulting in a mapping output of (x, y)=(0.2, 0.2).

The above operations will be described with reference to FIG. 9. In symbol number i, mapper 904 receives bit bi0 and bit bi1 as inputs. Mapper 904 then maps bit bi0 and bit bi1 to a modulation scheme having the four signal points illustrated in FIG. 18.

For example, assume a bit bi0 value of 0 and a bit bi1 value of 1, that is to say, [bi0, bi1]=[0, 1] are input into mapper 904. Mapper 904 maps these by way of the above-described mapping. Here, the x value of symbol number i is expressed as xi and the y value of symbol number i is expressed as yi. Here, as described above, when the input bits are expressed as bit b0 and bit b1, when b0=0 and b1=1, that is to say, [b0, b1]=[0, 1], this is mapped to signal point 1801, resulting in a mapping output of (x, y)=(0.2, 0.8). Accordingly, when [bi0, bi1]=[0, 1], mapper 904 outputs, as modulation symbol (baseband signal) 905 of the symbol number i, an xi value of 0.2 and a yi value of 0.8, that is to say, (xi, yi)=(0.2, 0.8).

Similarly, assume a bit bi0 value of 0 and a bit bi1 value of 0, that is to say, [bi0, bi1]=[0, 0] are input into mapper 904. Mapper 904 maps these by way of the above-described mapping. Here, as described above, when the input bits are expressed as bit b0 and bit b1, when b0=0 and b1=0, that is to say, [b0, b1]=[0, 0], this is mapped to signal point 1802, resulting in a mapping output of (x, y)=(0.8, 0.8). Accordingly, when [bi0, bi1]=[0, 0], mapper 904 outputs, as modulation symbol (baseband signal) 905 of the symbol number i, an xi value of 0.8 and a yi value of 0.8, that is to say, (xi, yi)=(0.8, 0.8).

Assume a bit bi0 value of 1 and a bit bi1 value of 0, that is to say, [bi0, bi1]=[1, 0] are input into mapper 904. Mapper 904 maps these by way of the above-described mapping. Here, as described above, when the input bits are expressed as bit b0 and bit b1, when b0=1 and b1=0, that is to say, [b0, b1]=[1, 0], this is mapped to signal point 1803, resulting in a mapping output of (x, y)=(0.8, 0.2). Accordingly, when [bi0, bi1]=[1, 0], mapper 904 outputs, as modulation symbol (baseband signal) 905 of the symbol number i, an xi value of 0.8 and a yi value of 0.2, that is to say, (xi, yi)=(0.8, 0.2).

Assume a bit bi0 value of 1 and a bit bi1 value of 1, that is to say, [bi0, bi1]=[1, 1] are input into mapper 904. Mapper 904 maps these by way of the above-described mapping. Here, as described above, when the input bits are expressed as bit b0 and bit b1, when b0=1 and b1=1, that is to say, [b0, b1]=[1, 1], this is mapped to signal point 1804, resulting in a mapping output of (x, y)=(0.2, 0.2). Accordingly, when [bi0, bi1]=[1, 1], mapper 904 outputs, as modulation symbol (baseband signal) 905 of the symbol number i, an xi value of 0.2 and a yi value of 0.2, that is to say, (xi, yi)=(0.2, 0.2).

Then, an optical signal of symbol number i is generated from xi and yi, which are the x and y values of symbol number i, respectively. This processing may be performed by either one of signal processor 906 or transmission unit 908.

An example of operations performed by the reception device when an optical signal of symbol number i as described above is emitted by the transmission device will be given with reference to FIG. 16.

As already described, information indicating that mapping has been performed based on a modulation scheme based on FIG. 18 is transmitted in a control symbol. Accordingly, control information 1607 that is output by control information symbol demodulator 1606 in FIG. 16 includes information indicating that mapping has been performed based on a modulation scheme based on FIG. 18.

Then, by signal processor 1608 obtaining the information indicating that mapping has been performed based on a modulation scheme based on FIG. 18, signal processor 1608 begins operations for demapping (demodulating) based on a modulation scheme based on FIG. 18.

When reception unit 1602 outputs an R signal, a G signal, and a B signal as signal group 1603, signal processor 1608 calculates estimated value x' of x and estimated value y' of y based on the R signal, the G signal, and the B signal (signal processor 1608 may calculate estimated value z' of z).

When reception unit 1602 outputs an X signal, a Y signal, and a Z signal as signal group 1603, signal processor 1608 calculates estimated value x' of x and estimated value y' of y based on the X signal, the Y signal, and the Z signal (signal processor 1608 may calculate estimated value z' of z).

Moreover, the three signals in the sRGB format are expressed as an R[sRGB] signal, a G[sRGB] signal, and a B[sRGB] signal. When reception unit 1602 outputs an R[sRGB] signal, a G[sRGB] signal, and a B[sRGB] signal as signal group 1603, signal processor 1608 calculates estimated value x' of x and estimated value y' of y based on the R[sRGB] signal, the G[sRGB] signal, and the B[sRGB] signal (signal processor 1608 may calculate estimated value z' of z).

The three signals in the AdobeRGB format are expressed as an R[A-RGB] signal, a G[A-RGB] signal, and a B[A-RGB] signal. When reception unit 1602 outputs an R[A-RGB] signal, a G[A-RGB] signal, and a B[A-RGB] signal as signal group 1603, signal processor 1608 calculates estimated value x' of x and estimated value y' of y based on the R[A-RGB] signal, the G[A-RGB] signal, and the B[A-RGB] signal (signal processor 1608 may calculate estimated value z' of z).

Figure 19:
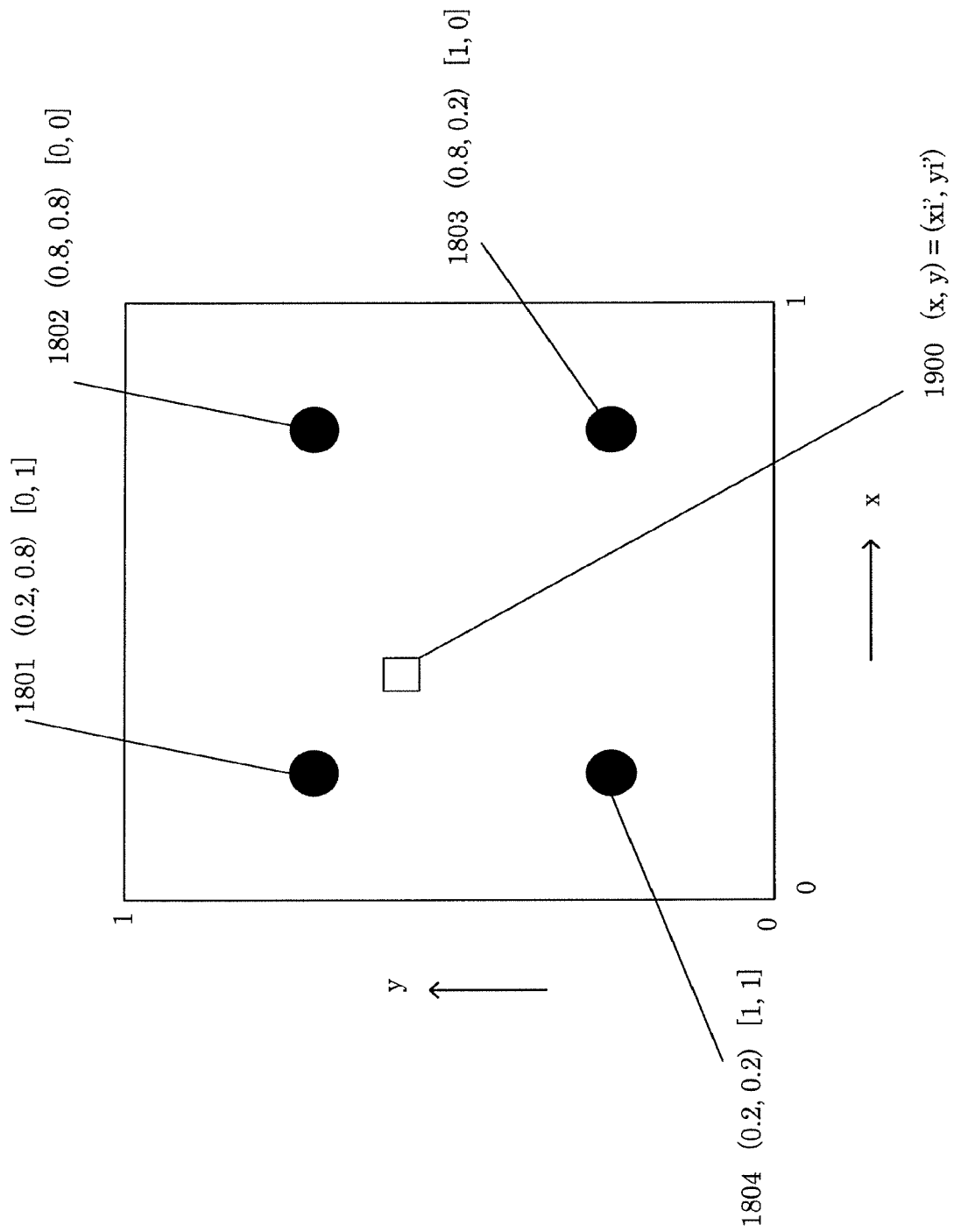
FIG. 19 illustrates one example of an arrangement of signal points and the position of a reception signal in a modulation scheme according to Embodiment 1.

As a result of performing the above operations, signal processor 1608 obtains estimated values xi' and yi' of the x and y values of symbol number i, respectively. FIG. 19 illustrates the relationship between the four signal points 1801, 1802, 1803, and 1804, and the (xi', yi') coordinates in the xy chromaticity diagram. In FIG. 19, 1900 indicates the reception point of symbol number i having the coordinates (xi', yi') in the xy chromaticity diagram. Based on the relationship between reception point 1900 and signal point 1801, the log-likelihood ratio (or log-likelihood) of each bit (bi0 and bi1) may be calculated, and the estimated values bi0' and bi1' of bi0 and bi1, respectively, may be calculated. In other words, a hard decision may be made, and a soft decision may be made.

For example, in the case of a hard decision, since the Euclidean distance between reception point 1900 and signal point 1801 is the shortest from among the Euclidean distance between reception point 1900 and signal point 1801, the Euclidean distance between reception point 1900 and signal point 1802, the Euclidean distance between reception point 1900 and signal point 1803, and the Euclidean distance between reception point 1900 and signal point 1804, bi0'=0 and bi1'=1.

This concludes the example of modulation and demodulation in a modulation scheme in which signal points are arranged in an xy chromaticity diagram. Note that in the example illustrated in FIG. 18, the modulation scheme is exemplified as including four signal points, but the number of signal points need not be four. For example, a modulation scheme having two signal points is acceptable, a modulation scheme having eight signal points is acceptable, a modulation scheme having 16 signal points is acceptable, a modulation scheme having 64 signal points is acceptable, and a modulation scheme having 256 signal points is acceptable. Accordingly, the number of signal points is not limited to four.

In the above example, an arrangement of signal points based on an xy chromaticity diagram is described, but a modulation scheme in which signal points are arranged in two dimensions that differ from the xy chromaticity diagram is acceptable. For example, a modulation scheme in which signal points are arranged in a u'v' uniform chromaticity diagram defined by CIE is acceptable.

Moreover, the signal points may be arranged three-dimensionally instead of two-dimensionally. For example, the tristimulus values X, Y, and Z may form three dimensions, and a modulation scheme in which the signal points are arranged in these three dimensions may be used.

Figure 20:
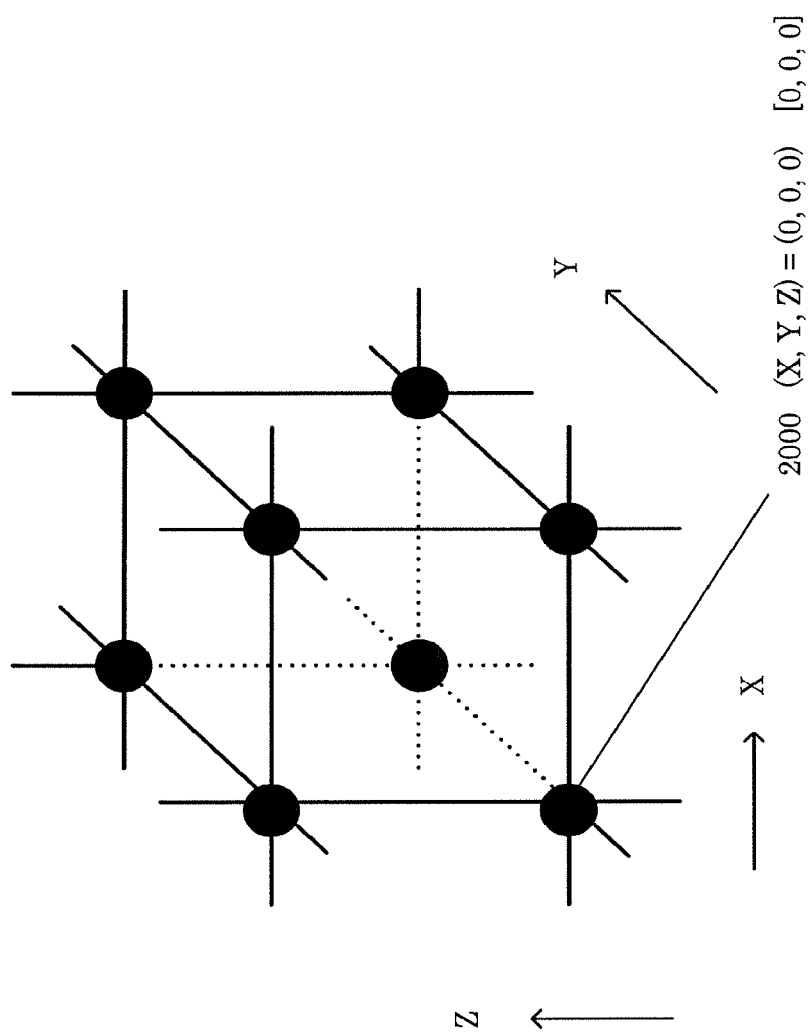
FIG. 20 illustrates one example of an arrangement of signal points in a three-dimensional space in a modulation scheme according to Embodiment 1.

FIG. 20 illustrates an example of an arrangement of signal points in three dimensions defined by the stimulus values X, Y, and Z. As illustrated in FIG. 20, there are the three axes of the X axis, the Y axis, and the Z axis, and, for example, signal points are arranged to the 8 vertices of a cuboid or a rectangular parallelepiped formed on the X axis, the Y axis, and the Z axis. Note that in FIG. 20, the signal points are represented as black dots. When the X value, the Y value, and the Z value of signal point #k (k is an integer that is greater than or equal to 0 and less than or equal to 7) are expressed as Xk, Yk, and Zk, respectively, the coordinates are expressed as (X, Y, Z)=(Xk, Yk, Zk). Since there are eight signal points in the example in FIG. 20, three bits can be transmitted per symbol. For example, just like FIG. 18, assume the input bits are b0, b1, and b2.

Here, description will be given using signal point 2000 in FIG. 20 as an example. Assume signal point 2000 is signal point #0.

Assume the X value of signal point 2000, i.e., signal point #0, that is to say, the value of X0 is 0, the Y value of signal point #0, that is to say, the value of Y0 is 0, and the Z value of signal point #0, that is to say, the value of Z0 is 0. Assume signal point #0 is a signal point corresponding to the input bits of b0=0, b1=0, and b2=0.

Accordingly, when the input bits are b0=0, b1=0, and b2=0, that is to say, when [b0, b1, b2]=[0, 0, 0], these are mapped to signal point 2000, i.e., signal point #0, resulting in a mapping output of (X, Y, Z)=(X0, Y0, Z0)=(0, 0, 0).

The above example is an example of when the signal point is signal point #0, but when the signal point is any one of signal point #1 through signal point #7, each is assigned with (X, Y, Z) coordinates and [b0, b1, b2]. Then, signal point mapping is performed based on input bits b0, b1, and b2, and output signals X, Y, and Z are obtained.

Just like when there are two dimensions, mapper 904 in FIG. 9 performs three-dimensional mapping, and in signal processor 1608 in FIG. 16 performs three-dimensional demapping (soft decision, hard decision).

In the example illustrated in FIG. 20, the modulation scheme is exemplified as including eight signal points, but the number of signal points need not be eight. For example, a modulation scheme having two signal points is acceptable, a modulation scheme having four signal points is acceptable, a modulation scheme having 16 signal points is acceptable, a modulation scheme having 64 signal points is acceptable, and a modulation scheme having 256 signal points is acceptable. Accordingly, the number of signal points is not limited to eight. Furthermore, the arrangement method of the signal points may arrange the signal points in any manner in the three-dimensional space.

Moreover, although the above example described a modulation scheme in which signal points are arranged in three dimensions defined by the stimulus values X, Y, and Z, the three dimensions may be defined by other signals. In other words, the following methods are also acceptable.

When there are a R signal, G signal, and B signal, the three dimensions may be defined by the R signal, the G signal, and the B signal, and a modulation scheme in which signal points are arranged in this three-dimensional space is acceptable.

When the three signals in the sRGB format are expressed as an R[sRGB] signal, a G[sRGB] signal, and a B[sRGB] signal, the three dimensions may be defined by the R[sRGB] signal, the G[sRGB] signal, and the B[sRGB] signal, and a modulation scheme in which signal points are arranged in this three-dimensional space is acceptable.

When the three signals in the AdobeRGB format are expressed as an R[A-RGB] signal, a G[A-RGB] signal, and a B[A-RGB] signal, the three dimensions may be defined by the R[A-RGB] signal, the G[A-RGB] signal, and the B[A-RGB] signal, and a modulation scheme in which signal points are arranged in this three-dimensional space is acceptable.

Note that in FIG. 16, when the format of the signal output by reception unit 1602 differs from the format of the color space or color system used by the transmission device, signal processor 1608 needs to perform processing for converting the format. Details regarding this point are as already described above.

With this, by performing data transmission using a modulation scheme in which signal points are arranged in a two- or three-dimensional space, it is possible to obtain an advantageous effect whereby data transmission speeds can be improved.

Embodiment 2

In this embodiment, additional information pertaining to the arrangement of signal points in three dimensions defined by the stimulus values X, Y, and Z described in Embodiment 1 will be presented.

In FIG. 20, the eight black dots represent the signal points.

For example, the signal point having an X value of 0.2, a Y value of 0.2, and a Z value of 0.2 is referred to as signal point 2010, and the coordinates in the X, Y, and Z coordinate system are expressed as (X, Y, Z) (0.2, 0.2, 0.2).

Similarly, other signal points are expressed as follows.

The signal point having an X value of 0.2, a Y value of 0.8, and a Z value of 0.2 is referred to as signal point 2011, and the coordinates in the X, Y, and Z coordinate system are expressed as (X, Y, Z) (0.2, 0.8, 0.2).

The signal point having an X value of 0.8, a Y value of 0.8, and a Z value of 0.2 is referred to as signal point 2012, and the coordinates in the X, Y, and Z coordinate system are expressed as (X, Y, Z) (0.8, 0.8, 0.2).

The signal point having an X value of 0.8, a Y value of 0.2, and a Z value of 0.2 is referred to as signal point 2013, and the coordinates in the X, Y, and Z coordinate system are expressed as (X, Y, Z) (0.8, 0.2, 0.2).

The signal point having an X value of 0.2, a Y value of 0.2, and a Z value of 0.8 is referred to as signal point 2020, and the coordinates in the X, Y, and Z coordinate system are expressed as (X, Y, Z) (0.2, 0.2, 0.8).

Similarly, other signal points are expressed as follows.

The signal point having an X value of 0.2, a Y value of 0.8, and a Z value of 0.8 is referred to as signal point 2021, and the coordinates in the X, Y, and Z coordinate system are expressed as (X, Y, Z)=(0.2, 0.8, 0.8).

The signal point having an X value of 0.8, a Y value of 0.8, and a Z value of 0.8 is referred to as signal point 2022, and the coordinates in the X, Y, and Z coordinate system are expressed as (X, Y, Z)=(0.8, 0.8, 0.8).

The signal point having an X value of 0.8, a Y value of 0.2, and a Z value of 0.8 is referred to as signal point 2023, and the coordinates in the X, Y, and Z coordinate system are expressed as (X, Y, Z)=(0.8, 0.2, 0.8).

When the input bits are expressed as bit b0, bit b, and bit b2, when b0=0, b1=0, and b2=0, that is to say, [b0, b1, b2]=[0, 0, 0], this is mapped to signal point 2010, resulting in a mapping output of (X, Y, Z)=(0.2, 0.2, 0.2).

Similarly, when the input bits are expressed as bit b0, bit b1, and bit b2, when b0=0, b1=1, and b2=0, that is to say, [b0, b1, b2]=[0, 1, 0], this is mapped to signal point 2011, resulting in a mapping output of (X, Y, Z)=(0.2, 0.8, 0.2).

When the input bits are expressed as bit b0, bit b, and bit b2, when b0=1, b1=1, and b2=0, that is to say, [b0, b1, b2]=[1, 1, 0], this is mapped to signal point 2012, resulting in a mapping output of (X, Y, Z)=(0.8, 0.8, 0.2).

When the input bits are expressed as bit b0, bit b, and bit b2, when b0=1, b1=0, and b2=0, that is to say, [b0, b1, b2]=[1, 0, 0], this is mapped to signal point 2013, resulting in a mapping output of (X, Y, Z)=(0.8, 0.2, 0.2).

When the input bits are expressed as bit b0, bit b, and bit b2, when b0=0, b1=0, and b2=1, that is to say, [b0, b1, b2]=[0, 0, 1], this is mapped to signal point 2020, resulting in a mapping output of (X, Y, Z)=(0.2, 0.2, 0.8).

Similarly, when the input bits are expressed as bit b0, bit b1, and bit b2, when b0=0, b1=1, and b2=1, that is to say, [b0, b1, b2]=[0, 1, 1], this is mapped to signal point 2021, resulting in a mapping output of (X, Y, Z)=(0.2, 0.8, 0.8).

When the input bits are expressed as bit b0, bit b, and bit b2, when b0=1, b1=1, and b2=1, that is to say, [b0, b1, b2]=[1, 1, 1], this is mapped to signal point 2022, resulting in a mapping output of (X, Y, Z)=(0.8, 0.8, 0.8).

When the input bits are expressed as bit b0, bit b1, and bit b2, when b0=1, b1=0, and b2=1, that is to say, [b0, b1, b2]=[1, 0, 1], this is mapped to signal point 2023, resulting in a mapping output of (X, Y, Z)=(0.8, 0.2, 0.8).

The above operations will be described with reference to FIG. 9. In symbol number i, mapper 904 receives bit bi0, bit bi1, and bit bi2 as inputs. Mapper 904 then maps bit bi0, bit bi1, and bit bi2 to a modulation scheme having the eight signal points illustrated in FIG. 20.

For example, assume a bit bi0 value of 0, a bit bi1 value of 0, and a bit bi2 value of 0, that is to say, [bi0, bi1, bi2]=[0, 0, 0] are input into mapper 904. Mapper 904 maps these by way of the above-described mapping. Here, the X value of symbol number i is expressed as Xi, the Y value of symbol number i is expressed as Yi, and the Z value of symbol number i is expressed as Zi. Here, just like described above, since "when the input bits are expressed as bit b0, bit b1, and bit b2, when b0=0, b1=0, and b2=0, that is to say, [b0, b1, b2]=[0, 0, 0], this is mapped to signal point 2010, resulting in a mapping output of (X, Y, Z)=(0.2, 0.2, 0.2)" applies, when [bi0, bi1, bi2]=[0, 0, 0], the value of Xi is 0.2, the value of Yi is 0.2, and the value of Zi is 0.2, that is to say, (Xi, Yi, Zi)=(0.2, 0.2, 0.2) is output by mapper 904 as modulation symbol (baseband signal) 905 of the symbol number i.

Examples of the configuration of the reception device and examples of the operations pertaining to the reception when the transmission device transmits a light modulated signal using the method described above, are as described in Embodiment 1.

Embodiment 3

In this embodiment, an example of a modulation scheme based on signal points arranged in a color space or color system will be given, and in particular, an embodiment in three dimensions will be described.

One example of a modulation scheme in which signal points are arranged in the three dimensions of the three signals in the sRGB format expressed as the R[sRGB] signal, the G[sRGB] signal, and the B[sRGB] signal will be described.

The relationship between (i) the tristimulus values X, Y, and Z and (ii) R[sRGB], G[sRGB], and B[sRGB] can be expressed with the following equation.

[MATH. 4]

$$\begin{bmatrix} R[sRGB] \\ G[sRGB] \\ B[sRGB] \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix} \quad \text{Equation (4)}$$

Then, signal point arrangement is performed based on R[sRGB], G[sRGB], and B[sRGB].

For example, a three-dimensional signal point arrangement in which, in FIG. 20, the stimulus value X is rewritten as R[sRGB], the stimulus value Y is rewritten as G[sRGB], and the stimulus value Z is rewritten as B[sRGB] is acceptable.

The eight black dots in FIG. 20 represent the signal points.

For example, a signal point having an R[sRGB] value of 0.2, a G[sRGB] value of 0.2, and a B[sRGB] value of 0.2 is referred to as signal point 2050, and the coordinates in the R[sRGB], G[sRGB], and B[sRGB] coordinate system are expressed as (R[sRGB], G[sRGB], B[sRGB])=(0.2, 0.2, 0.2).

Similarly, other signal points are expressed as follows.

A signal point having an R[sRGB] value of 0.2, a G[sRGB] value of 0.8, and a B[sRGB] value of 0.2 is referred to as signal point 2051, and the coordinates in the R[sRGB], G[sRGB], and B[sRGB] coordinate system are expressed as (R[sRGB], G[sRGB], B[sRGB])=(0.2, 0.8, 0.2).

A signal point having an R[sRGB] value of 0.8, a G[sRGB] value of 0.8, and a B[sRGB] value of 0.2 is referred to as signal point 2052, and the coordinates in the R[sRGB], G[sRGB], and B[sRGB] coordinate system are expressed as (R[sRGB], G[sRGB], B[sRGB])=(0.8, 0.8, 0.2).

A signal point having an R[sRGB] value of 0.8, a G[sRGB] value of 0.2, and a B[sRGB] value of 0.2 is referred to as signal point 2053, and the coordinates in the R[sRGB], G[sRGB], and B[sRGB] coordinate system are expressed as (R[sRGB], G[sRGB], B[sRGB])=(0.8, 0.2, 0.2).

A signal point having an R[sRGB] value of 0.2, a G[sRGB] value of 0.2, and a B[sRGB] value of 0.8 is referred to as signal point 2060, and the coordinates in the R[sRGB], G[sRGB], and B[sRGB] coordinate system are expressed as (R[sRGB], G[sRGB], B[sRGB])=(0.2, 0.2, 0.8).

Similarly, other signal points are expressed as follows.

A signal point having an R[sRGB] value of 0.2, a G[sRGB] value of 0.8, and a B[sRGB] value of 0.8 is referred to as signal point 2061, and the coordinates in the R[sRGB], G[sRGB], and B[sRGB] coordinate system are expressed as (R[sRGB], G[sRGB], B[sRGB])=(0.2, 0.8, 0.8).

A signal point having an R[sRGB] value of 0.8, a G[sRGB] value of 0.8, and a B[sRGB] value of 0.8 is referred to as signal point 2062, and the coordinates in the R[sRGB], G[sRGB], and B[sRGB] coordinate system are expressed as (R[sRGB], G[sRGB], B[sRGB])=(0.8, 0.8, 0.8).

A signal point having an R[sRGB] value of 0.8, a G[sRGB] value of 0.2, and a B[sRGB] value of 0.8 is referred to as signal point 2063, and the coordinates in the R[sRGB], G[sRGB], and B[sRGB] coordinate system are expressed as (R[sRGB], G[sRGB], B[sRGB])=(0.8, 0.2, 0.8).

When the input bits are expressed as bit b0, bit b, and bit b2, when b0=0, b1=0, and b2=0, that is to say, [b0, b1, b2]=[0, 0, 0], this is mapped to signal point 2050, resulting in a mapping output of (R[sRGB], G[sRGB], B[sRGB])=(0.2, 0.2, 0.2).

Similarly, when the input bits are expressed as bit b0, bit b1, and bit b2, when b0=0, b1=1, and b2=0, that is to say, [b0, b1, b2]=[0, 1, 0], this is mapped to signal point 2051, resulting in a mapping output of (R[sRGB], G[sRGB], B[sRGB])=(0.2, 0.8, 0.2).

When the input bits are expressed as bit b0, bit b1, and bit b2, when b0=1, b1=1, and b2=0, that is to say, [b0, b1, b2]=[1, 1, 0], this is mapped to signal point 2052, resulting in a mapping output of (R[sRGB], G[sRGB], B[sRGB])=(0.8, 0.8, 0.2).

When the input bits are expressed as bit b0, bit b, and bit b2, when b0=1, b1=0, and b2=0, that is to say, [b0, b1, b2]=[1, 0, 0], this is mapped to signal point 2053, resulting in a mapping output of (R[sRGB], G[sRGB], B[sRGB])=(0.8, 0.2, 0.2).

When the input bits are expressed as bit b0, bit b, and bit b2, when b0=0, b1=0, and b2=1, that is to say, [b0, b1, b2]=[0, 0, 1], this is mapped to signal point 2060, resulting in a mapping output of (R[sRGB], G[sRGB], B[sRGB])=(0.2, 0.2, 0.8).

Similarly, when the input bits are expressed as bit b0, bit b, and bit b2, when b0=0, b1=1, and b2=1, that is to say, [b0, b1, b2]=[0, 1, 1], this is mapped to signal point 2061, resulting in a mapping output of (R[sRGB], G[sRGB], B[sRGB])=(0.2, 0.8, 0.8).

When the input bits are expressed as bit b0, bit b1, and bit b2, when b0=1, b1=1, and b2=1, that is to say, [b0, b1, b2]=[1, 1, 1], this is mapped to signal point 2062, resulting in a mapping output of (R[sRGB], G[sRGB], B[sRGB])=(0.8, 0.8, 0.8).

When the input bits are expressed as bit b0, bit b1, and bit b2, when b0=1, b1=0, and b2=1, that is to say, [b0, b1, b2]=[1, 0, 1], this is mapped to signal point 2063, resulting in a mapping output of (R[sRGB], G[sRGB], B[sRGB])=(0.8, 0.2, 0.8).

The above operations will be described with reference to FIG. 9. In symbol number i, mapper 904 receives bit bi0, bit bi1, and bit bi2 as inputs. Mapper 904 then maps bit bi0, bit bi1, and bit bi2 to a modulation scheme having the eight signal points illustrated in FIG. 20.

For example, assume a bit bi0 value of 0, a bit bi1 value of 0, and a bit bi2 value of 0, that is to say, [bi0, bi1, bi2]=[0, 0, 0] are input into mapper 904. Mapper 904 maps these by way of the above-described mapping. Here, the R[sRGB] value of symbol number i is expressed as R[sRGB]i, the G[sRGB] value of symbol number i is expressed as G[sRGB]i, and the B[sRGB] value of symbol number i is expressed as B[sRGB]i. Here, just like described above, since "when the input bits are expressed as bit b0, bit b1, and bit b2, when b0=0, b1=0, and b2=0, that is to say, [b0, b1, b2]=[0, 0, 0], this is mapped to signal point 2050, resulting in a mapping output of (R[sRGB], G[sRGB], B[sRGB])=(0.2, 0.2, 0.2)" applies, when [bi0, bi1, bi2]=[0, 0, 0], the value of R[sRGB]i is 0.2, the value of G[sRGB]i is 0.2, and the value of B[sRGB]i is 0.2, that is to say, (R[sRGB]i, G[sRGB]i, B[sRGB]i)=(0.2, 0.2, 0.2) is output by mapper 904 as modulation symbol (baseband signal) 905 of the symbol number i.

Examples of the configuration of the reception device and examples of the operations pertaining to the reception when the transmission device transmits a light modulated signal using the method described above, are as described in Embodiment 1.

Embodiment 4

In this embodiment, an example of a modulation scheme based on signal points arranged in a color space or color system will be given, and in particular, an embodiment in three dimensions will be described.

One example of a modulation scheme in which signal points are arranged in three dimensions of the three signals in the AdobeRGB format of R[A-RGB] signal, G[A-RGB] signal, and B[A-RGB] signal will be given.

The relationship between (i) the tristimulus values X, Y, and Z and (ii) R[A-RGB], G[A-RGB], and B[A-RGB] can be expressed with the following equation.

[MATH. 5]

$$\begin{bmatrix} R[A-RGB] \\ G[A-RGB] \\ B[A-RGB] \end{bmatrix} = \begin{bmatrix} 2.04159 & -0.56501 & -0.34473 \\ -0.96924 & 1.87597 & 0.04156 \\ 0.01344 & -0.11836 & 1.01517 \end{bmatrix} \begin{bmatrix} X \\ Y \\ Z \end{bmatrix} \quad \text{Equation (5)}$$

Then, signal point arrangement is performed based on R[A-RGB], G[A-RGB], and B[A-RGB].

For example, a three-dimensional signal point arrangement in which, in FIG. 20, the stimulus value X is rewritten as R[A-RGB], the stimulus value Y is rewritten as G[A-RGB], and the stimulus value Z is rewritten as B[A-RGB] is acceptable.

The eight black dots in FIG. 20 represent the signal points.

For example, a signal point having an R[A-RGB] value of 0.2, a G[A-RGB] value of 0.2, and a B[A-RGB] value of 0.2 is referred to as signal point 2070, and the coordinates in the R[A-RGB], G[A-RGB], and B[A-RGB]coordinate system are expressed as (R[A-RGB], G[A-RGB], B[A-RGB])=(0.2, 0.2, 0.2).

Similarly, other signal points are expressed as follows.

For example, a signal point having an R[A-RGB] value of 0.2, a G[A-RGB] value of 0.8, and a B[A-RGB] value of 0.2 is referred to as signal point 2071, and the coordinates in the R[A-RGB], G[A-RGB], and B[A-RGB]coordinate system are expressed as (R[A-RGB], G[A-RGB], B[A-RGB])=(0.2, 0.8, 0.2).

A signal point having an R[A-RGB] value of 0.8, a G[A-RGB] value of 0.8, and a B[A-RGB] value of 0.2 is referred to as signal point 2072, and the coordinates in the R[A-RGB], G[A-RGB], and B[A-RGB] coordinate system are expressed as (R[A-RGB], G[A-RGB], B[A-RGB])=(0.8, 0.8, 0.2).

A signal point having an R[A-RGB] value of 0.8, a G[A-RGB] value of 0.2, and a B[A-RGB] value of 0.2 is referred to as signal point 2073, and the coordinates in the R[A-RGB], G[A-RGB], and B[A-RGB] coordinate system are expressed as (R[A-RGB], G[A-RGB], B[A-RGB])=(0.8, 0.2, 0.2).

A signal point having an R[A-RGB] value of 0.2, a G[A-RGB] value of 0.2, and a B[A-RGB] value of 0.8 is referred to as signal point 2080, and the coordinates in the R[A-RGB], G[A-RGB], and B[A-RGB] coordinate system are expressed as (R[A-RGB], G[A-RGB], B[A-RGB])=(0.2, 0.2, 0.8).

Similarly, other signal points are expressed as follows.

A signal point having an R[A-RGB] value of 0.2, a G[A-RGB] value of 0.8, and a B[A-RGB] value of 0.8 is referred to as signal point 2081, and the coordinates in the R[A-RGB], G[A-RGB], and B[A-RGB] coordinate system are expressed as (R[A-RGB], G[A-RGB], B[A-RGB])=(0.2, 0.8, 0.8).

A signal point having an R[A-RGB] value of 0.8, a G[A-RGB] value of 0.8, and a B[A-RGB] value of 0.8 is referred to as signal point 2082, and the coordinates in the R[A-RGB], G[A-RGB], and B[A-RGB] coordinate system are expressed as (R[A-RGB], G[A-RGB], B[A-RGB])=(0.8, 0.8, 0.8).

A signal point having an R[A-RGB] value of 0.8, a G[A-RGB] value of 0.2, and a B[A-RGB] value of 0.8 is referred to as signal point 2083, and the coordinates in the R[A-RGB], G[A-RGB], and B[A-RGB] coordinate system are expressed as (R[A-RGB], G[A-RGB], B[A-RGB])=(0.8, 0.2, 0.8).

When the input bits are expressed as bit b0, bit b, and bit b2, when b0=0, b1=0, and b2=0, that is to say, [b0, b1, b2]=[0, 0, 0], this is mapped to signal point 2070, resulting in a mapping output of (R[A-RGB], G[A-RGB], B[A-RGB])=(0.2, 0.2, 0.2).

Similarly, when the input bits are expressed as bit b0, bit b1, and bit b2, when b0=0, b1=1, and b2=0, that is to say, [b0, b1, b2]=[0, 1, 0], this is mapped to signal point 2071, resulting in a mapping output of (R[A-RGB], G[A-RGB], B[A-RGB])=(0.2, 0.8, 0.2).

When the input bits are expressed as bit b0, bit b, and bit b2, when b0=1, b1=1, and b2=0, that is to say, [b0, b1, b2]=[1, 1, 0], this is mapped to signal point 2072, resulting in a mapping output of (R[A-RGB], G[A-RGB], B[A-RGB])=(0.8, 0.8, 0.2).

When the input bits are expressed as bit b0, bit b, and bit b2, when b0=1, b1=0, and b2=0, that is to say, [b0, b1, b2]=[1, 0, 0], this is mapped to signal point 2073, resulting in a mapping output of (R[A-RGB], G[A-RGB], B[A-RGB])=(0.8, 0.2, 0.2).

When the input bits are expressed as bit b0, bit b, and bit b2, when b0=0, b1=0, and b2=1, that is to say, [b0, b1, b2]=[0, 0, 1], this is mapped to signal point 2080, resulting in a mapping output of (R[A-RGB], G[A-RGB], B[A-RGB])=(0.2, 0.2, 0.8).

When the input bits are expressed as bit b0, bit b1, and bit b2, when b0=0, b1=1, and b2=1, that is to say, [b0, b1, b2]=[0, 1, 1], this is mapped to signal point 2081, resulting in a mapping output of (R[A-RGB], G[A-RGB], B[A-RGB])=(0.2, 0.8, 0.8).

When the input bits are expressed as bit b0, bit b1, and bit b2, when b0=1, b1=1, and b2=1, that is to say, [b0, b1, b2]=[1, 1, 1], this is mapped to signal point 2082, resulting in a mapping output of (R[A-RGB], G[A-RGB], B[A-RGB])=(0.8, 0.8, 0.8).

When the input bits are expressed as bit b0, bit b1, and bit b2, when b0=1, b1=0, and b2=1, that is to say, [b0, b1, b2]=[1, 0, 1], this is mapped to signal point 2083, resulting in a mapping output of (R[A-RGB], G[A-RGB], B[A-RGB])=(0.8, 0.2, 0.8).

The above operations will be described with reference to FIG. 9. In symbol number i, mapper 904 receives bit bi0, bit bi1, and bit bi2 as inputs. Mapper 904 then maps bit bi0, bit bi1, and bit bi2 to a modulation scheme having the eight signal points illustrated in FIG. 20.

For example, assume a bit bi0 value of 0, a bit bi1 value of 0, and a bit bi2 value of 0, that is to say, [bi0, bi1, bi2]=[0, 0, 0] are input into mapper 904. Mapper 904 maps these by way of the above-described mapping. Here, the R[A-RGB] value of symbol number i is expressed as R[A-RGB]i, the G[A-RGB]value of symbol number i is expressed as G[A-RGB]i, and the B[A-RGB] value of symbol number i is expressed as B[A-RGB]i. Here, just like described above, since "when the input bits are expressed as bit b0, bit b1, and bit b2, when b0=0, b1=0, and b2=0, that is to say, [b0, b1, b2]=[0, 0, 0], this is mapped to signal point 2070, resulting in a mapping output of (R[A-RGB], G[A-RGB], B[A-RGB])=(0.2, 0.2, 0.2)" applies, when [bi0, bi1, bi2]=[0, 0, 0], the value of R[A-RGB]i is 0.2, the value of G[A-RGB]i is 0.2, and the value of B[A-RGB]i is 0.2, that is to say, (R[A-RGB]i, G[A-RGB]i, B[A-RGB]i)=(0.2, 0.2, 0.2) is output by mapper 904 as modulation symbol (baseband signal) 905 of the symbol number i.

Examples of the configuration of the reception device and examples of the operations pertaining to the reception when the transmission device transmits a light modulated signal using the method described above, are as described in Embodiment 1.

In Embodiment 3 and Embodiment 4, a mapping method for when the format is sRGB and a mapping method for when the format is AdobeRGB are described, but three-dimensional mapping can be performed just as in this embodiment with other color system or color space formats as well.

Embodiment 5

In this embodiment, the configuration of a reception device different from the reception device described in Embodiment 1 will be described.

Figure 21:
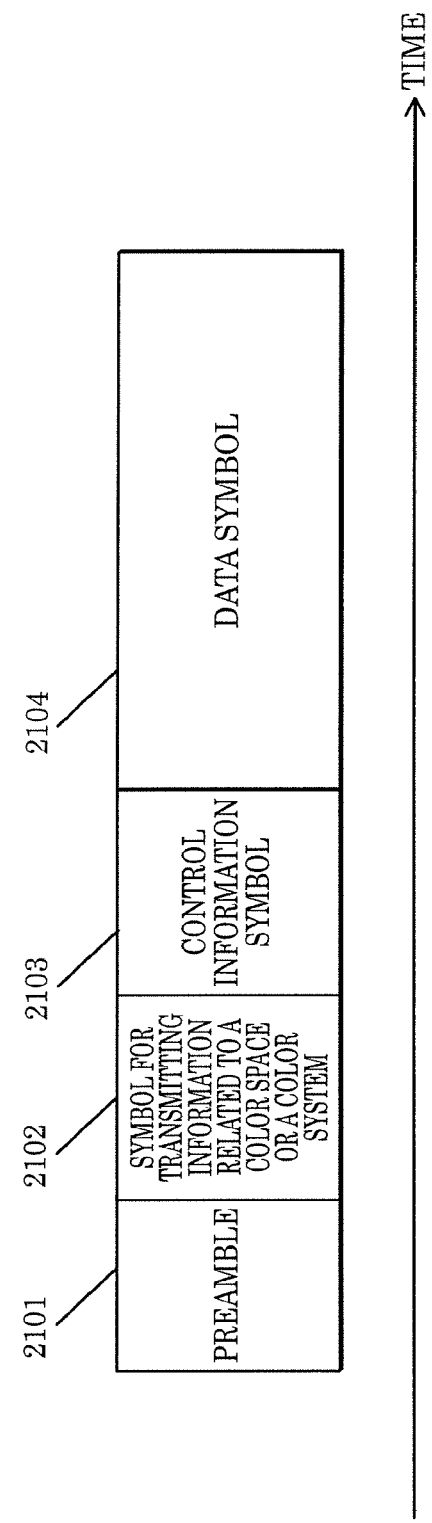
FIG. 21 illustrates a configuration example of a frame according to Embodiment 5.

FIG. 21 illustrates an example of a frame configuration of a light modulated signal transmitted by, for example, the transmission device in FIG. 6 or FIG. 9. Time is represented on the horizontal axis.

In FIG. 21, preamble 2101 is a symbol for the reception device that is the communication partner of the transmission device to perform signal detection and/or time synchronization.

Symbol 2102 for transmitting information related to a color space or a color system is, for example, a symbol for transmitting information on a color space or color system used in the transmission of control information symbol 2103 and/or data symbol 2104 in FIG. 21.

Control information symbol 2103 is, for example, a symbol including control information for, for example, the error correction encoding scheme and/or modulation scheme used in the generation of data symbol 2104.

Data symbol 2104 is a symbol for transmitting data.

Figure 22:
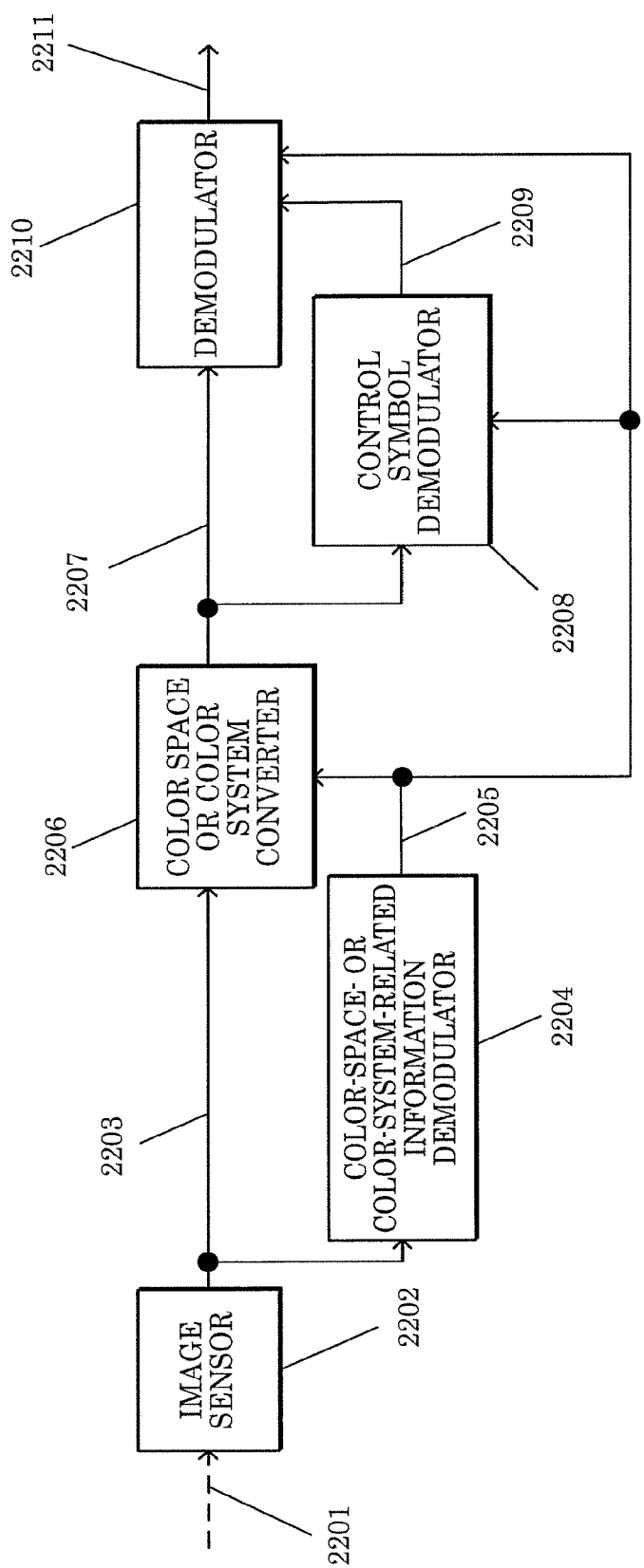
FIG. 22 illustrates a detailed configuration example of a reception device according to Embodiment 5.

FIG. 22 illustrates one example of a configuration of the reception device which is the communication partner of the transmission device in FIG. 6 or FIG. 9. The characterizing point of FIG. 22 is that the color space or color system of reception signal 2203 output by image sensor 2202 is static. Note that reception signal 2203 may include one or more signals. For example, reception signal 2203 may be configured of a signal based on the color red, a signal based on the color green, and a signal based on the color blue, may be configured of a signal based on the color cyan, a signal based on the color yellow, and a signal based on the color magenta, and may be configured of a signal based on the color red, a signal based on the color green, a signal based on the color blue, a signal based on the color cyan, a signal based on the color yellow, and a signal based on the color magenta (the output signal of the image sensor including one or more signals may also apply to the other embodiments as well; for example, the output signal may be configured of a signal based on the color red, a signal based on the color green, and a signal based on the color blue, may be configured of a signal based on the color cyan, a signal based on the color yellow, and a signal based on the color magenta, and may be configured of a signal based on the color red, a signal based on the color green, a signal based on the color blue, a signal based on the color cyan, a signal based on the color yellow, and a signal based on the color magenta).

As a first example, assume the color system of reception signal 2203, which is the output signal of image sensor 2202, is statically set to sRGB.

Color-space- or color-system-related information demodulator 2204 receives an input of reception signal 2203, detects and demodulates symbol 2102 for transmitting information related to a color space or a color system illustrated in FIG. 21, and outputs information 2205 related to a color space or a color system.

Color space or color system converter 2206 receives inputs of reception signal 2203 and information 2205 related to a color space or a color system, converts the color space or color system of control information symbol 2103 and/or data symbol 2104 included in reception signal 2203, based on information 2205 related to a color space or a color system, and outputs color space or color system converted symbol 2207.

For example, when information 2205 related to a color space or a color system indicates "sRGB", color space or color system converter 2206 does not perform color space or color system conversion, and thus color space or color system converted symbol 2207 is configured of control information symbol 2103 and/or data symbol 2104 based on sRGB.

For example, when information 2205 related to a color space or a color system indicates "Adobe RGB", color space or color system converter 2206 converts control information symbol 2103, data symbol 2104, and color system from sRGB to Adobe RGB. Accordingly, color space or color system converted symbol 2207 is configured of control information symbol 2103 and/or data symbol 2104 based on Adobe RGB.

Control symbol demodulator 2208 receives inputs of information 2205 related to a color space or a color system, and color space or color system converted symbol 2207, demodulates control information symbol 2103 illustrated in FIG. 21 based on information 2205 related to a color space or a color system, and outputs control information 2209.

Demodulator 2210 receives inputs of information 2205 related to a color space or a color system, color space or color system converted symbol 2207, and control information 2209, demodulates data symbol 2104 included in color space or color system converted symbol 2207 based on information 2205 related to a color space or a color system and control information 2209, and outputs reception data 2211.

As a second example, assume the color system of reception signal 2203, which is the output signal of image sensor 2202, can be set to either sRGB or Adobe RGB.

Image sensor 2202 includes an input signal other than optical signal 2201 (however, this is not illustrated in FIG. 22), and this input signal makes it possible to set the color system to either sRGB or Adobe RGB.

Accordingly, image sensor 2202 outputs reception signal 2203 set to either sRGB or Adobe RGB.

Color-space- or color-system-related information demodulator 2204 receives an input of reception signal 2203, detects and demodulates symbol 2102 for transmitting information related to a color space or a color system illustrated in FIG. 21, and outputs information 2205 related to a color space or a color system.

Color space or color system converter 2206 receives inputs of reception signal 2203 and information 2205 related to a color space or a color system, converts the color space or color system of control information symbol 2103 and/or data symbol 2104 included in reception signal 2203, based on information 2205 related to a color space or a color system, and outputs color space or color system converted symbol 2207.

For example, although not illustrated in FIG. 22, image sensor 2202 receives an input of information 2205 related to a color space or a color system, and when information 2205 related to a color space or a color system indicates sRGB or Adobe RGB, image sensor 2202 outputs reception signal 2203 in the color system indicated by information 2205 related to a color space or a color system.

When information 2205 related to a color space or a color system indicates a color system or color space other than sRGB or Adobe RGB, image sensor 2202 outputs reception signal 2203 in either the sRGB color system or the Adobe RGB color system.

Color space or color system converter 2206 receives inputs of reception signal 2203 and information 2205 related to a color space or a color system, converts the color space or color system of control information symbol 2103 and/or data symbol 2104 included in reception signal 2203, based on information 2205 related to a color space or a color system, and outputs color space or color system converted symbol 2207. Note that depending on the color space and/or color system indicated by information 2205 related to a color space or a color system, the conversion of the color space or color system of control information symbol 2103 and/or data symbol 2104 included in reception signal 2203 may not be performed.

Control symbol demodulator 2208 receives inputs of information 2205 related to a color space or a color system, and color space or color system converted symbol 2207, demodulates control information symbol 2103 illustrated in FIG. 21 based on information 2205 related to a color space or a color system, and outputs control information 2209.

Demodulator 2210 receives inputs of information 2205 related to a color space or a color system, color space or color system converted symbol 2207, and control information 2209, demodulates data symbol 2104 included in color space or color system converted symbol 2207 based on information 2205 related to a color space or a color system and control information 2209, and outputs reception data 2211.

Next, a transmission method such as the modulation scheme for preamble 2101 and symbol 2102 for transmitting information related to a color space or a color system illustrated in FIG. 21. Note that this has already been covered in Embodiment 1.

Preamble 2101 enables the reception device that is the communication partner of the transmission device to be capable of signal detection and/or time synchronization via a luminance signal (brightness signal, signal amplitude) included in a reception signal. Accordingly, preamble 2101 is a symbol based on any one of a PPM scheme such as 4PPM, a scheme that applies Manchester encoding, an ASK scheme, a BPSK scheme, and a PAM scheme, as described above.

This configuration achieves the advantageous effect that preamble 2101 can be identified regardless of the color space and/or color system that the reception device that is the communication partner of the transmission device supports. That is to say, this configuration achieves the advantageous effect that, regardless of the supported color space and/or color system, the reception device that is the communication partner of the transmission device can perform signal detection and/or time synchronization based on preamble 2101.

Symbol 2102 for transmitting information related to a color space or a color system is a symbol which can be demodulated by the reception device that is the communication partner of the transmission device, via a luminance signal (brightness signal, signal amplitude) included in a reception signal. Accordingly, symbol 2102 for transmitting information related to a color space or a color system is a symbol based on any one of a PPM scheme such as PPM, a scheme that applies Manchester encoding, an ASK scheme, a BPSK scheme, and a PAM scheme, as described above.

This configuration achieves the advantageous effect that symbol 2102 for transmitting information related to a color space or a color system can be identified regardless of the color space that the reception device that is the communication partner of the transmission device supports. That is to say, this configuration achieves the advantageous effect that, regardless of the supported color space, the reception device that is the communication partner of the transmission device can obtain information included in symbol 2102 for transmitting information related to a color space or a color system.

This enables the reception device that is the communication partner of the transmission device to determine whether data symbol 2104 can be demodulated or not, as a result of obtaining symbol 2102 for transmitting information related to a color space or a color system. Accordingly, by obtaining symbol 2102 for transmitting information related to a color space or a color system, the reception device can accurately determine whether to perform operations for demodulating data symbol 2104 or not. Controlling this prevents reception device from unnecessarily consuming power.

In this embodiment, additional information pertaining to image sensor 2202 in FIG. 22 will be given.

Operational examples of image sensor 2202 in FIG. 22 will be given with reference to FIG. 23 and FIG. 24.

Figure 23:
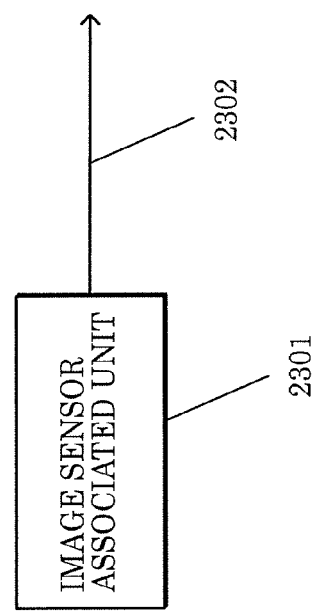
FIG. 23 is for describing an operational example of an image sensor according to Embodiment 5.

Image sensor associated unit 2301 in FIG. 23 corresponds to image sensor 2202 in FIG. 22.

Image sensor associated unit 2301 outputs reception signal 2302 in a specific color space and/or color system (here, the color space and/or color system of reception signal 2302 cannot be changed). Accordingly, as illustrated in FIG. 22, a configuration in which color space or color system converter 2206 is provided is conceivable.

Figure 24:
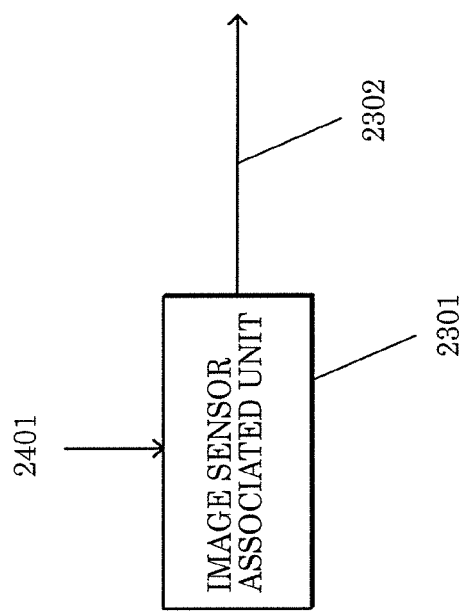
FIG. 24 is for describing another operational example of the image sensor according to Embodiment 5.

Image sensor associated unit 2301 in FIG. 24 corresponds to image sensor 2202 in FIG. 22.

Image sensor associated unit 2301 outputs reception signal 2302 in a color space and/or a color system selected via control signal 2401. However, here, the color space and/or color system of reception signal 2302 corresponds only to the color space and/or color system supported by image sensor associated unit 2301 in advance. Accordingly, as illustrated in FIG. 22, a configuration in which color space or color system converter 2206 is provided is conceivable.

On the other hand, for example, as described with reference to FIG. 8 in Embodiment 1, image sensor associated unit 2301 in FIG. 24 is capable of setting the color space and/or color system. In such cases, image sensor associated unit 2301 in FIG. 24 is capable of supporting a desired color space and/or color system. In such cases, as described in Embodiment 1, image sensor associated unit 2301 in FIG. 24 outputs reception signal 2302 in accordance with the desired color space and/or color system indicated by control signal 2401.

Embodiment 6

In this embodiment, a method for improving the data reception quality of the reception device will be described.

As described in Embodiment 1, for example, the transmission device in FIG. 6 transmits a light modulated signal based on four signal points in the xy chromaticity diagram in FIG. 18. Note that since a detailed description of FIG. 18 has already been given in Embodiment 1, repeated description will be omitted.

Figure 25:
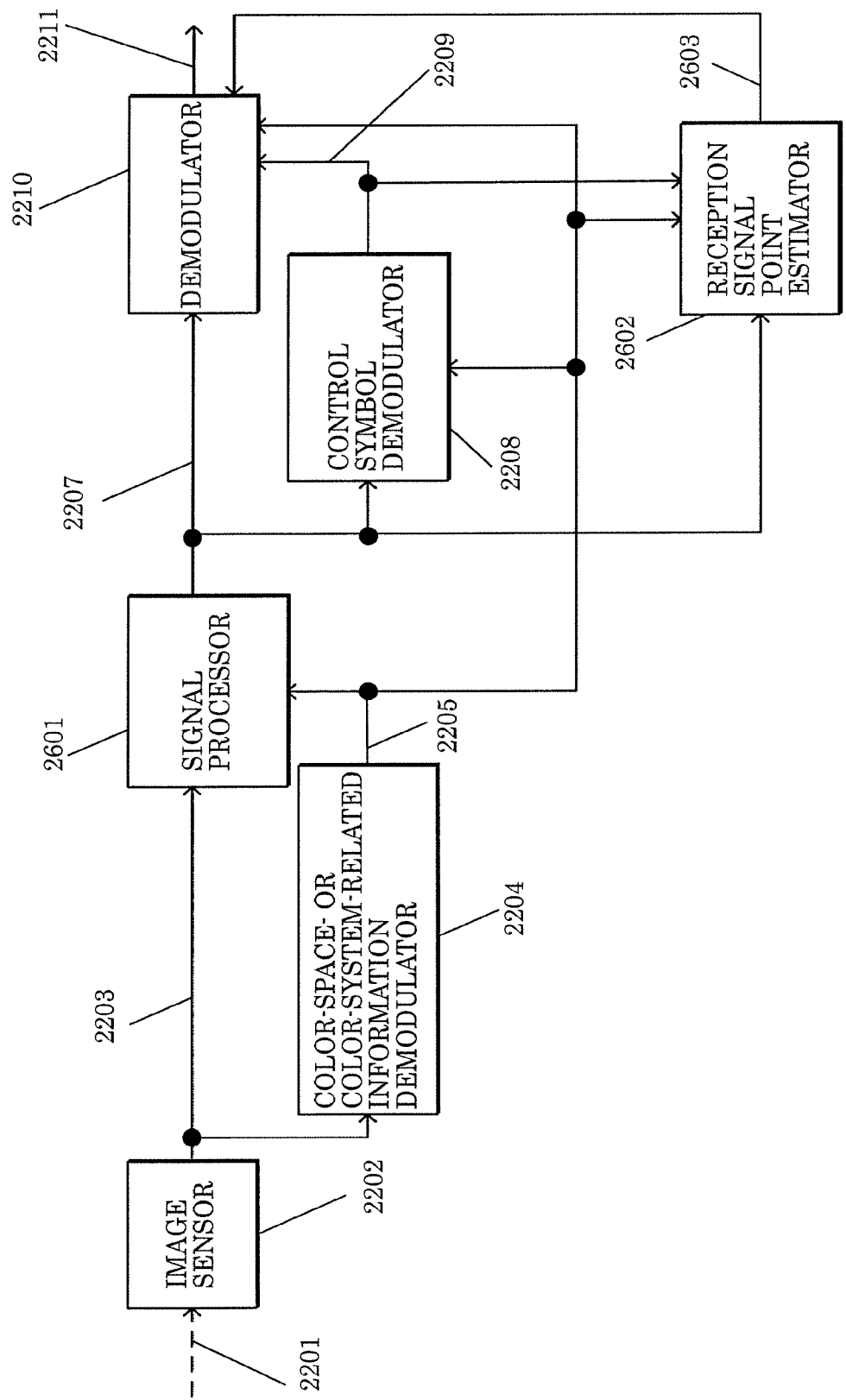
FIG. 25 illustrates a detailed configuration example of a reception device according to Embodiment 6.

FIG. 25 illustrates one example of a configuration of the reception device that receives the light modulated signal transmitted by the transmission device in FIG. 6. Note that in FIG. 25, objects that operate the same as in FIG. 22 share like reference marks. Accordingly, repeated description thereof will be omitted.

In FIG. 25, signal processor 2601 includes a function for converting the color space or color system, which is the function of color space or color system converter 2206 in FIG. 22, and also includes an exposure adjustment function and a white balance adjustment function. Note that in the configuration of the reception device in FIG. 25, signal processor 2601 is configured so as to include an exposure adjustment function and a white balance adjustment function, but a configuration in which the image sensor includes the exposure adjustment function and the white balance adjustment function is acceptable. Moreover, exposure adjustment may be performed automatically by signal processor 2601 or image sensor, and the user of the reception device may configure the settings. Moreover, white balance adjustment may be performed automatically by signal processor 2601 or image sensor as well, and the user of the reception device may configure the settings as well.

Figure 26:
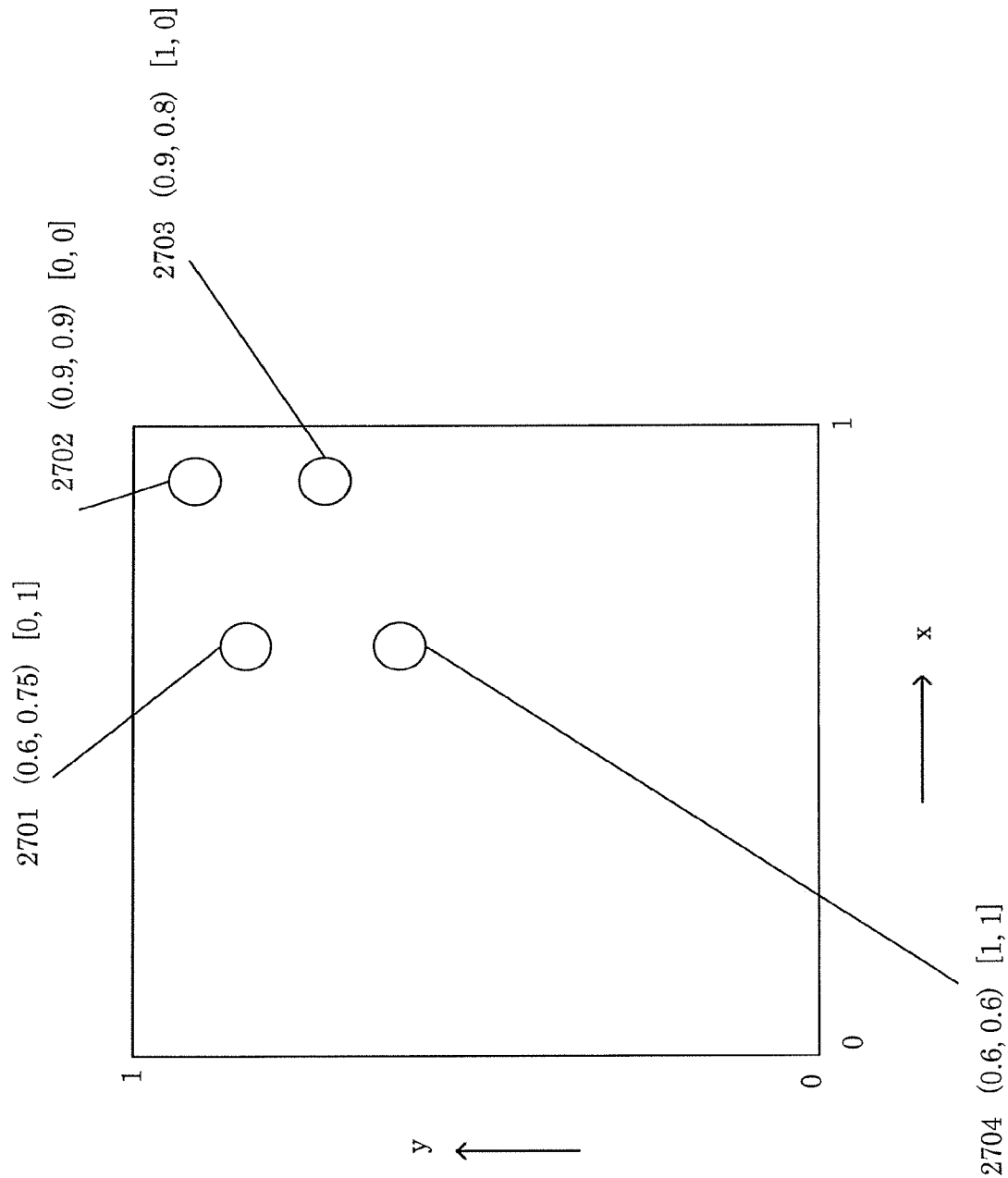
FIG. 26 illustrates one example of an arrangement of signal points in a modulation scheme according to Embodiment 6.

For example, in signal processor 2601 in FIG. 25, an example of the locations of reception signal points in the xy chromaticity diagram in demodulator 2210 after exposure adjustment and white balance adjustment is shown in FIG. 26. Note that in FIG. 26, the horizontal axis is x and the vertical axis is y.

In FIGS. 26, 2701, 2702, 2703, and 2704 indicate reception signal points.

For example, assuming the transmission device transmits the signal corresponding to signal point 1801, and in signal processor 2601, the signal point that is obtained after exposure adjustment and white balance adjustment are performed, under the assumption that there are no noise components (here, this will be referred to as the "true reception signal point") is 2701. Note that the x and y values of reception signal point 2701 are 0.65 and 0.75, respectively, whereby b0=0 and b1=1 is transmitted.

Similarly, assuming the transmission device transmits the signal corresponding to signal point 1802, in signal processor 2601, the true reception signal point that is obtained after exposure adjustment and white balance adjustment are performed is 2702. Note that the x and y values of reception signal point 2702 are 0.9 and 0.9, respectively, whereby b0=0 and b1=0 is transmitted.

Assuming the transmission device transmits the signal corresponding to signal point 1803, in signal processor 2601, the true reception signal point that is obtained after exposure adjustment and white balance adjustment are performed is 2703. Note that the x and y values of reception signal point 2703 are 0.9 and 0.8, respectively, whereby b0=1 and b1=0 is transmitted.

Assuming the transmission device transmits the signal corresponding to signal point 1804, in signal processor 2601, the true reception signal point that is obtained after exposure adjustment and white balance adjustment are performed is 2704. Note that the x and y values of reception signal point 2704 are 0.6 and 0.6, respectively, whereby b0=1 and b1=1 is transmitted.

In this way, in the reception device, it is possible to use a reception signal point arrangement different from the signal point arrangement used by the transmission device (as in FIG. 26, there is a change in the positions of the four reception signal points). This arises due to the reception device receiving light from the surrounding environment.

In reception signal point estimator 2602 included in the reception device in FIG. 25, the positions of the four true reception signal points in FIG. 26 need to be known.

An example of a frame configuration transmitted by a transmission device designed to overcome this problem will be given with reference to FIG. 27.

Figure 27:
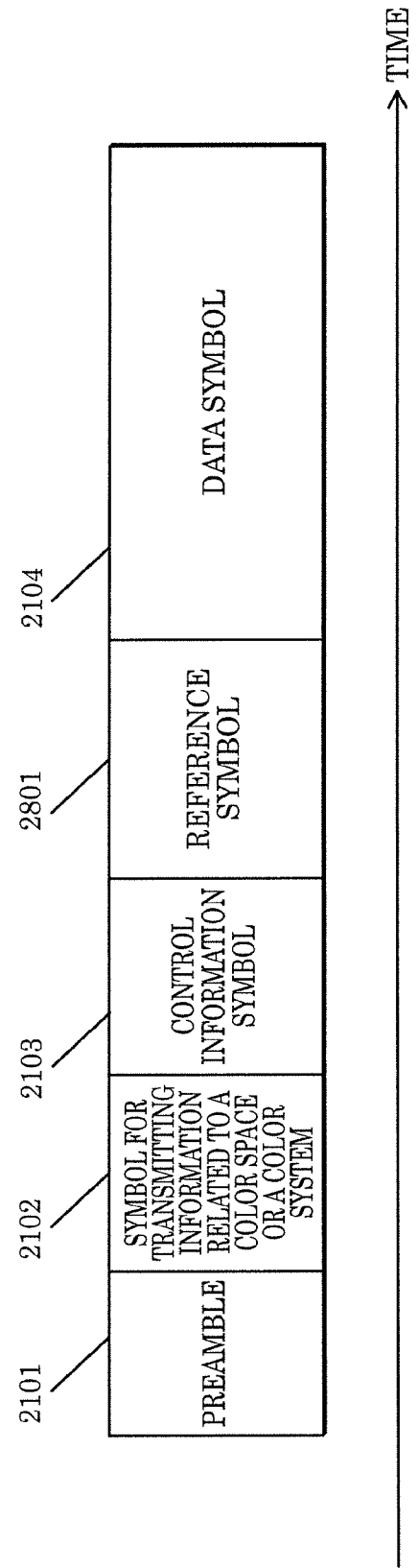
FIG. 27 illustrates a configuration example of a frame according to Embodiment 6.

FIG. 27 illustrates an example of a frame configuration of a light modulated signal that is transmitted by the transmission device, and objects that operate the same as in FIG. 21 share like reference marks. Accordingly, repeated description thereof will be omitted.

In the frame configuration illustrated in FIG. 27, reference symbol 2801 is arranged before the transmission of data symbol 2104. Note that here, this symbol is referred to as a reference symbol, but this symbol may be referred to by some other name. For example, this symbol may be referred to as a pilot symbol, a reference signal, etc.

Figure 28:
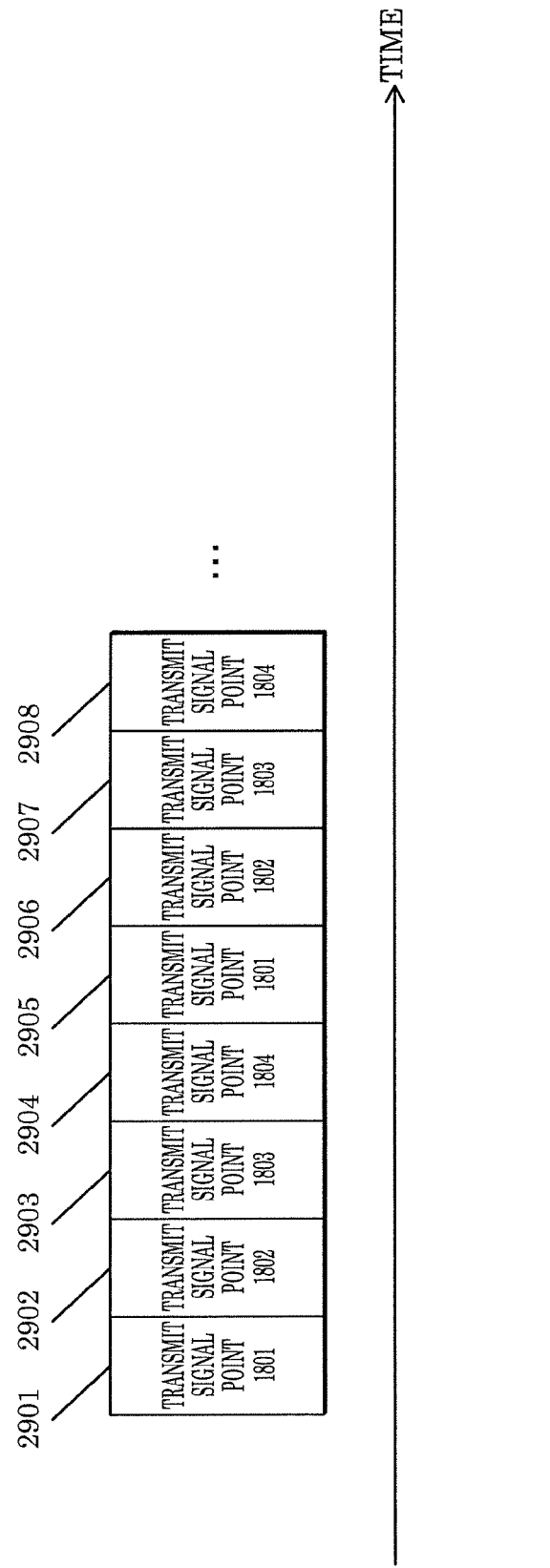
FIG. 28 illustrates one example of the transmission of a reference symbol according to Embodiment 6.

FIG. 28 illustrates one example of a configuration of reference symbol 2801 in FIG. 27. As illustrated in FIG. 28, the transmission device first transmits a light modulated signal corresponding to signal point 1801 in FIG. 18 (2901). Thereafter, the transmission device transmits a light modulated signal corresponding to signal point 1802 in FIG. 18 (2902), transmits a light modulated signal corresponding to signal point 1803 in FIG. 18 (2903), transmits a light modulated signal corresponding to signal point 1804 in FIG. 18 (2904), transmits a light modulated signal corresponding to signal point 1801 in FIG. 18 (2905), transmits a light modulated signal corresponding to signal point 1802 in FIG. 18 (2906), transmits a light modulated signal corresponding to signal point 1803 in FIG. 18 (2907), transmits a light modulated signal corresponding to signal point 1804 in FIG. 18 (2908), . . . , and so on, to configure reference symbol 2801. Note that the configuration method of reference symbol 2801 is not limited to the configuration illustrated in FIG. 28. For example, when there are four signal points like in FIG. 18, in reference symbol 2801, a symbol of each signal point is necessarily transmitted, that is to say, it is important that "a symbol of signal point 1801 is transmitted, a symbol of signal point 1802 is transmitted, a symbol of signal point 1803 is transmitted, and a symbol of signal point 1804 is transmitted" be included in reference symbol 2801.

Reception signal point estimator 2602 in FIG. 25 receives inputs of information 2205 related to a color space or a color system, signal-processed signal 2207, and control information 2209.

Reception signal point estimator 2602 knows the color space and/or color system of signal-processed signal 2207 from information 2205 related to a color space or a color system. Furthermore, reception signal point estimator 2602 knows the modulation scheme (or the number of signal points in the modulation scheme) of data symbol 2104 from control information 2209.

Based on this information, reception signal point estimator 2602, for example, begins estimating the position of a (true) reception signal point in the xy chromaticity diagram.

For example, reception signal point estimator 2602 obtains (true) reception signal point 2701 from a symbol of signal point 1801 transmitted by the transmission device, for example, 2901, 2905, . . . , in FIG. 28.

Similarly, for example, reception signal point estimator 2602 obtains (true) reception signal point 2702 from a symbol of signal point 1802 transmitted by the transmission device, for example, 2902, 2906, . . . , in FIG. 28.

For example, reception signal point estimator 2602 obtains (true) reception signal point 2703 from a symbol of signal point 1803 transmitted by the transmission device, for example, 2903, 2907, . . . , in FIG. 28.

For example, reception signal point estimator 2602 obtains (true) reception signal point 2704 from a symbol of signal point 1804 transmitted by the transmission device, for example, 2904, 2908, . . . , in FIG. 28.

Then, reception signal point estimator 2602 outputs information pertaining to reception signal points 2701, 2702, 2703, and 2704 as reception signal point signal 2603.

Demodulator 2210 receives inputs of information 2205 related to a color space or a color system, signal-processed signal 2207, control information 2209, and reception signal point signal 2603.

Then, demodulator 2210 configures the color space and/or color system settings based on information 2205 related to a color space or a color system and control information 2209, extracts data symbol 2104 in FIG. 27, and begins demodulating data symbol 2104.

Figure 29:
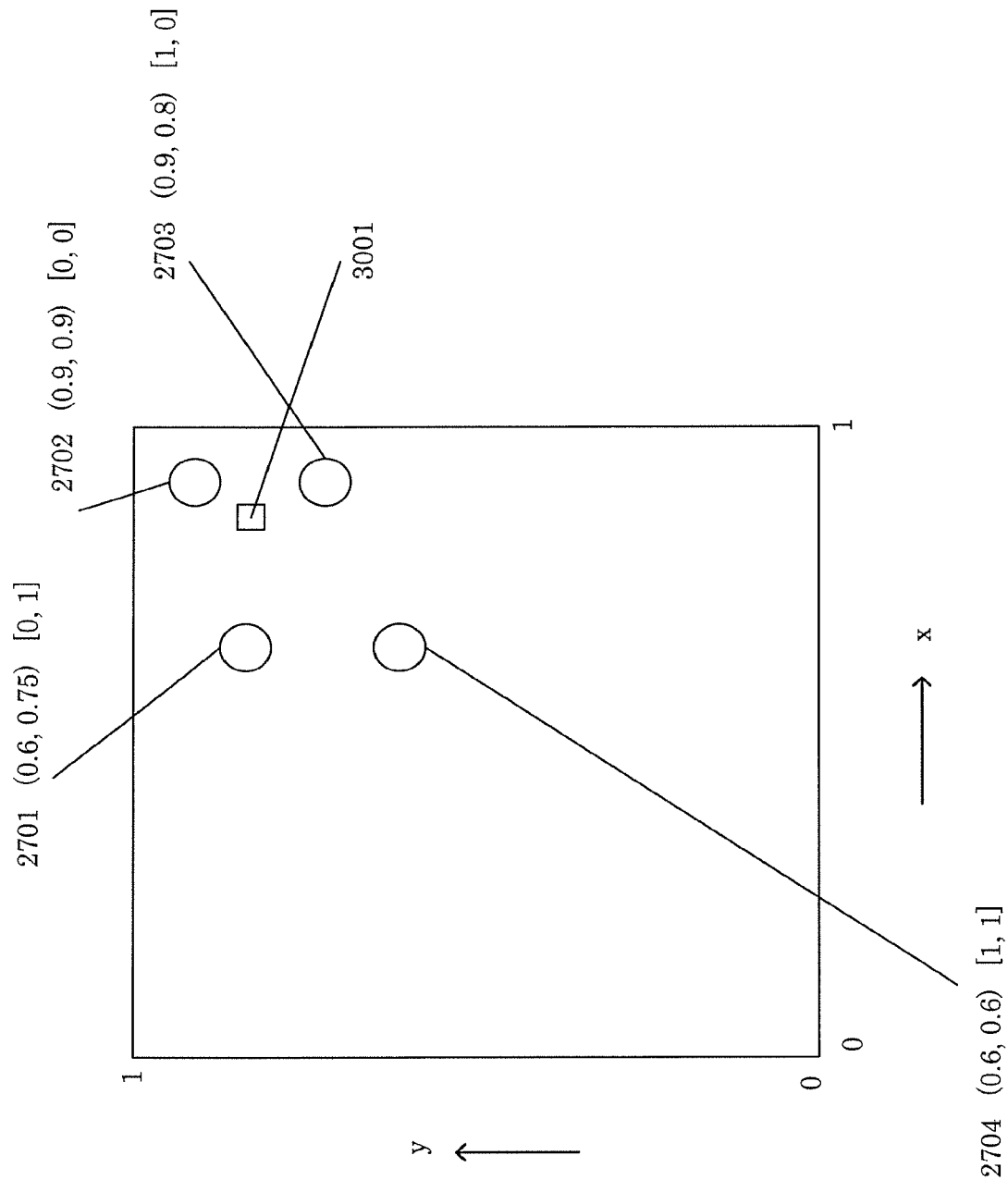
FIG. 29 illustrates one example of an arrangement of signal points and the position of a reception signal in a modulation scheme according to Embodiment 6.

An operational example of demodulator 2210 will be described with reference to FIG. 29. FIG. 29 illustrates an xy chromaticity diagram. The horizontal axis is x and the vertical axis is y. In FIG. 29, 3001 is the reception signal point of a data symbol, the position of which is obtained from signal-processed signal 2207 in FIG. 25.

In demodulator 2210, demodulation is performed using (true) reception signal points 2701, 2702, 2703, and 2704, as well as reception signal point 3001 of the data symbol. For example, when performing a hard decision, the Euclidean distance between signal point 2701 and reception signal point 3001 of the data symbol, the Euclidean distance between signal point 2702 and reception signal point 3001 of the data symbol, the Euclidean distance between signal point 2703 and reception signal point 3001 of the data symbol, and the Euclidean distance between signal point 2704 and reception signal point 3001 of the data symbol are calculated, and when the Euclidean distance between signal point 2702 and reception signal point 3001 of the data symbol is determined to be the shortest, it is determined that b0=0 and b1=0 has been transmitted in the data symbol, and b0=0 and b1=0 are obtained.

When performing a soft decision, for example, the log-likelihood ratio of b0 and the log-likelihood ratio of b1 are obtained using (true) reception signal points 2701, 2702, 2703, and 2704, as well as reception signal point 3001 of the data symbol.

Thereafter, for example, error correction decoding is performed to receive reception data.

As described above, it is possible to achieve the advantageous effect that it is possible for the reception device achieve high data reception quality.

In signal processor 2601 in the reception device in FIG. 25, a communication mode may be present in the white balance adjustment. Moreover, a communication mode may be present in the exposure adjustment.

For example, when an auto white balance mode for capturing an image and/or a video is present as a white balance adjustment, the white balance adjustment is set to this mode, and when the transmission device transmits a light modulated signal via mapping like that illustrated in FIG. 18, for example, in the reception device, the reception state is as shown in FIG. 26, whereby bad data reception quality may occur. In this case, signal processor 2601 includes a white balance adjustment mode for transmission, and when the white balance adjustment is set to this mode, the reception signal point state is improved, whereby data reception quality can be improved (with the white balance adjustment mode for transmission, white balance is adjusted to improve data reception quality by improving the reception signal point state).

Similarly, signal processor 2601 includes an exposure adjustment mode for transmission as exposure adjustment, and when the exposure adjustment is set to this mode, the reception signal point state is improved, whereby data reception quality can be improved (with the exposure adjustment mode for transmission, exposure is adjusted to improve data reception quality by improving the reception signal point state).

Specifically, for example, when signal processor 2601 included in the reception device in FIG. 25 is set to a mode other than a white balance adjustment mode for communication, and/or a mode other than an exposure adjustment mode for communication, the reception state is as shown in FIG. 26. However, when signal processor 2601 included in the reception device in FIG. 25 is set to the white balance adjustment mode for communication and the exposure adjustment mode for communication, for example, white balance and exposure are adjusted so as to achieve the communication state in FIG. 19, that is to say, white balance and exposure are adjusted so as to achieve a favorable reception state. Note that in such cases, the image/video is not necessarily an image/video that is unpleasantly perceived by a human.

In order to achieve this, signal processor 2601 may receive an input signal for the mode settings from an external source. Here, the user sets the mode to a mode for communication purposes, and information on this setting is input into signal processor 2601 as an input signal for the mode settings, and signal processor 2601 performs white balance adjustment and exposure adjustment for communication. Note that regarding this point, when the transmission device performs two-dimensional mapping and transmits a light modulated signal or when the transmission device performs three-dimensional mapping and transmits a light modulated signal as described in other embodiments, in either case, the above can be implemented in the same manner.

Note that in this embodiment, description is given based on when mapping such as that illustrated in FIG. 18 is performed using an xy chromaticity diagram, but mapping may be performed using another color space or color system other than the xy chromaticity diagram. Even in such a case, the embodiment may be implemented in the same manner. Moreover, in this embodiment, an implementation example in which four signal points are present in the xy chromaticity diagram is given, but the number of signal points present is not limited to four. When eight signal points are present, that is to say, when 3 bit transmission is performed, when 16 signal points are present, that is to say, when 4 bit transmission is performed, and when 64 signal points are present, that is to say, when 6 bit transmission is performed, in any case, the above can be implemented in the same manner.

For example, when there are eight signal points present (assume the eight signal points are named first signal point, second signal point, third signal point, fourth signal point, fifth signal point, sixth signal point, seventh signal point, and eighth signal point), that is to say, when 3 bit transmission is performed, in reference symbol 2801, the symbol of each signal point is necessarily transmitted, that is to say, it is important that "a symbol of the first signal point is transmitted, a symbol of the second signal point is transmitted, a symbol of the third signal point is transmitted, a symbol of the fourth signal point is transmitted, a symbol of the fifth signal point is transmitted, a symbol of the sixth signal point is transmitted, a symbol of the seventh signal point is transmitted, and a symbol of the eighth signal point is transmitted".

Note that a transmission method such as the one illustrated in FIG. 28 was described as an example of a transmission method of reference symbol 2801 in FIG. 27. Here, a method is conceivable in which the order in which the signal points in FIG. 28 are transmitted and the number of symbols to be transmitted are the same in the transmission device and the reception device.

Moreover, a method in which the order in which the signal points in FIG. 28 are transmitted and the number of symbols to be transmitted are different in the transmission device and the reception device, and the reception device estimates the order and number is acceptable.

Moreover, in this embodiment, two-dimensional mapping was used as an example, but even when three-dimensional mapping is used, the embodiment can be implemented in the same manner.

Embodiment 7

In this embodiment, a variation of Embodiment 6 for improving the data reception quality of the reception device will be described.

Figure 30:
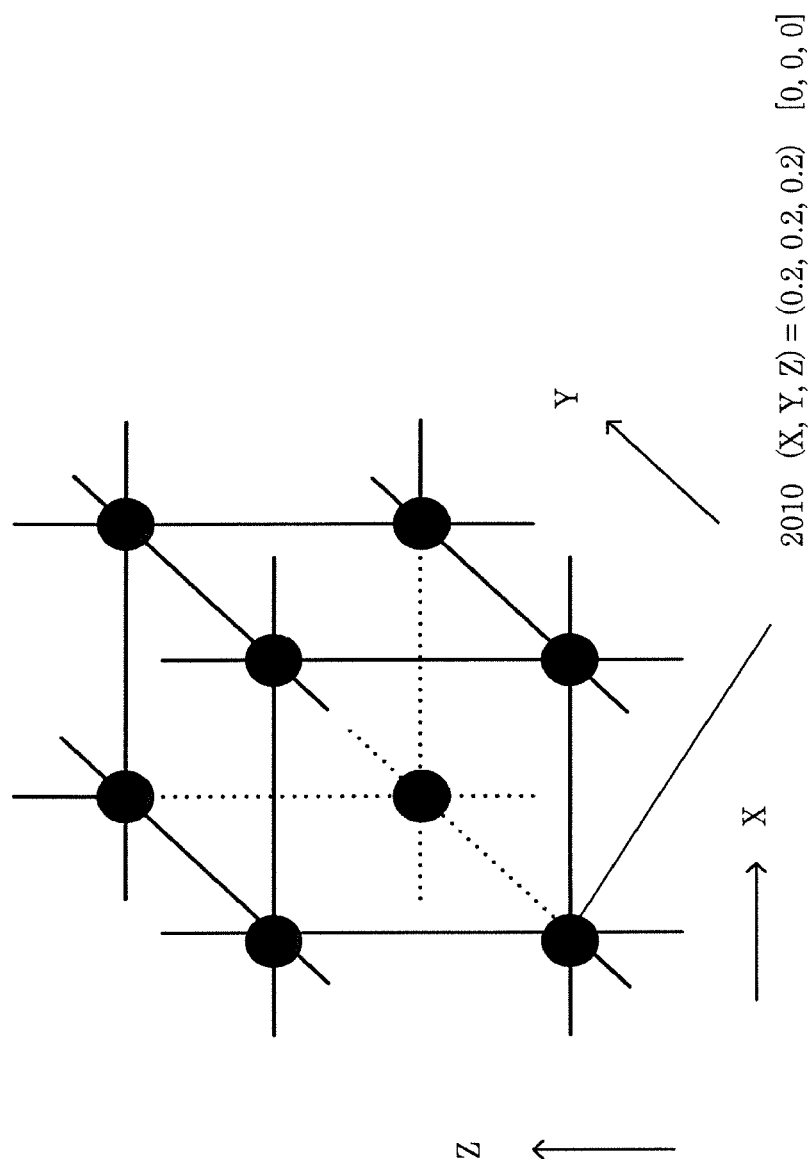
FIG. 30 illustrates one example of an arrangement of signal points in a three-dimensional space in a modulation scheme according to Embodiment 7.

As described in Embodiment 1 and Embodiment 2, for example, the transmission device in FIG. 6 transmits a light modulated signal based on eight signal points when the signal points are arranged in three dimensions defined by the stimulus values X, Y, and Z, as illustrated in FIG. 30. As illustrated in FIG. 30, the stimulus value X, stimulus value Y, and stimulus value Z axes are set, and since the relationship between (i) the stimulus value X, stimulus value Y, and stimulus value Z coordinates of the eight signal points and (ii) the 3 bits transmitted via the signal points of bit b0, bit b1, and bit b2 have already been described in Embodiment 2, repeated description will be omitted.

FIG. 25 illustrates one example of a configuration of the reception device that receives the light modulated signal transmitted by the transmission device in FIG. 6. Note that in FIG. 25, objects that operate the same as in FIG. 22 share like reference marks. Accordingly, repeated description thereof will be omitted.

In FIG. 25, signal processor 2601 includes a function for converting the color space or color system, which is the function of color space or color system converter 2206 in FIG. 22, and also includes an exposure adjustment function and a white balance adjustment function. Note that in the configuration of the reception device in FIG. 25, signal processor 2601 is configured so as to include an exposure adjustment function and a white balance adjustment function, but a configuration in which the image sensor includes the exposure adjustment function and the white balance adjustment function is acceptable. Moreover, exposure adjustment may be performed automatically by signal processor 2601 or image sensor, and the user of the reception device may configure the settings. Moreover, white balance adjustment may be performed automatically by signal processor 2601 or image sensor as well, and the user of the reception device may configure the settings as well.

Figure 31:
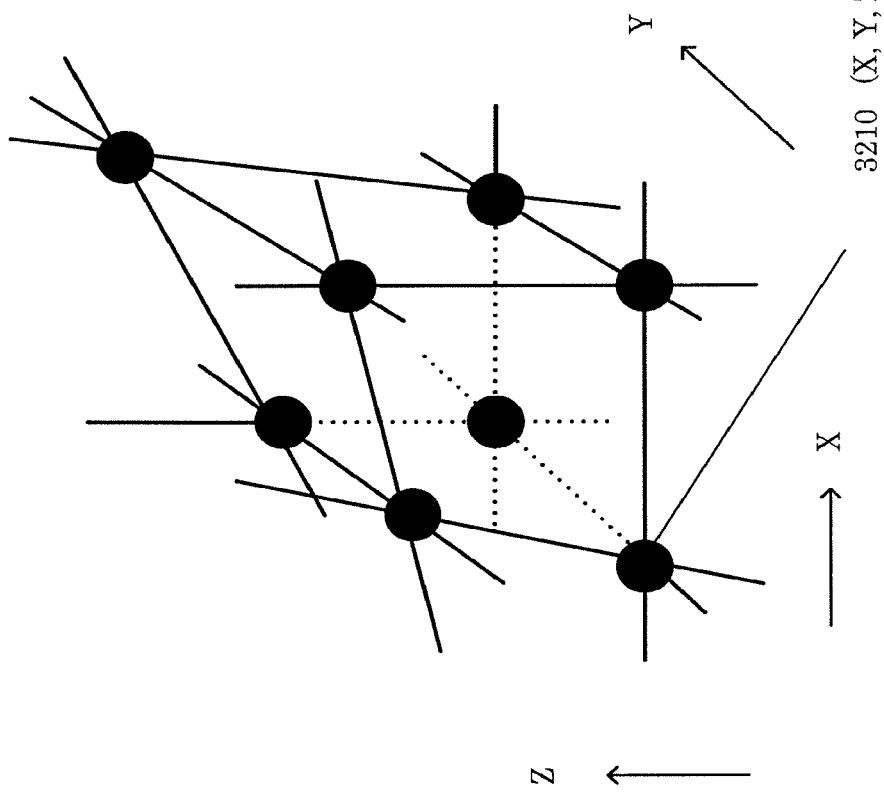
FIG. 31 illustrates one example of an arrangement of reception signal points in a three-dimensional space in a modulation scheme according to Embodiment 7.

For example, in signal processor 2601 in FIG. 25, an example of the locations of reception signal points in the space defined by the stimulus values X, Y, and Z in the demodulator after exposure adjustment and white balance adjustment is shown in FIG. 31. Note that in FIG. 31, the eight black dots indicate reception signal points.

For example, as described in Embodiment 2, assuming the transmission device transmits the signal corresponding to signal point 2010, and in signal processor 2601, the signal point that is obtained after exposure adjustment and white balance adjustment are performed, under the assumption that there are no noise components (here, this will be referred to as the "true signal point") is 3210, and, for example, the X value is 0.3, the Y value is 0.3, and the Z value is 0.2, that is to say, the coordinates in the X, Y, and Z coordinate system are expressed as (X, Y, Z)=(0.3, 0.3, 0.2).

Similarly, as described in Embodiment 2, assuming the transmission device transmits the signal corresponding to signal point 2011, and in signal processor 2601, the signal point that is obtained after exposure adjustment and white balance adjustment are performed, under the assumption that there are no noise components (here, this will be referred to as the "true signal point") is 3211, and, for example, the X value is 0.1, the Y value is 0.8, and the Z value is 0.3, that is to say, the coordinates in the X, Y, and Z coordinate system are expressed as (X, Y, Z)=(0.1, 0.8, 0.3).

As described in Embodiment 2, assuming the transmission device transmits the signal corresponding to signal point 2012, and in signal processor 2601, the signal point that is obtained after exposure adjustment and white balance adjustment are performed, under the assumption that there are no noise components (here, this will be referred to as the "true signal point") is 3212, and, for example, is the signal point whose X value is 0.7, Y value is 0.5, and Z value is 0.3, that is to say, the coordinates in the X, Y, and Z coordinate system are expressed as (X, Y, Z)=(0.7, 0.5, 0.3).

As described in Embodiment 2, assuming the transmission device transmits the signal corresponding to signal point 2013, and in signal processor 2601, the signal point that is obtained after exposure adjustment and white balance adjustment are performed, under the assumption that there are no noise components (here, this will be referred to as the "true signal point") is 3213, and, for example, is the signal point whose X value is 0.75, Y value is 0.1, and Z value is 0.2, that is to say, the coordinates in the X, Y, and Z coordinate system are expressed as (X, Y, Z)=(0.75, 0.1, 0.2).

As described in Embodiment 2, assuming the transmission device transmits the signal corresponding to signal point 2020, and in signal processor 2601, the signal point that is obtained after exposure adjustment and white balance adjustment are performed, under the assumption that there are no noise components (here, this will be referred to as the "true signal point") is 3220, and, for example, is the signal point whose X value is 0.1, Y value is 0.1, and Z value is 0.9, that is to say, the coordinates in the X, Y, and Z coordinate system are expressed as (X, Y, Z)=(0.1, 0.1, 0.9).

As described in Embodiment 2, assuming the transmission device transmits the signal corresponding to signal point 2021, and in signal processor 2601, the signal point that is obtained after exposure adjustment and white balance adjustment are performed, under the assumption that there are no noise components (here, this will be referred to as the "true signal point") is 3221, and, for example, is the signal point whose X value is 0.2, Y value is 0.75, and Z value is 0.75, that is to say, the coordinates in the X, Y, and Z coordinate system are expressed as (X, Y, Z)=(0.2, 0.75, 0.75).

As described in Embodiment 2, assuming the transmission device transmits the signal corresponding to signal point 2022, and in signal processor 2601, the signal point that is obtained after exposure adjustment and white balance adjustment are performed, under the assumption that there are no noise components (here, this will be referred to as the "true signal point") is 3222, and, for example, is the signal point whose X value is 0.9, Y value is 0.9, and Z value is 0.9, that is to say, the coordinates in the X, Y, and Z coordinate system are expressed as (X, Y, Z)=(0.9, 0.9, 0.9).

As described in Embodiment 2, assuming the transmission device transmits the signal corresponding to signal point 2023, and in signal processor 2601, the signal point that is obtained after exposure adjustment and white balance adjustment are performed, under the assumption that there are no noise components (here, this will be referred to as the "true signal point") is 3223, and, for example, is the signal point whose X value is 0.75, Y value is 0.2, and Z value is 0.7, that is to say, the coordinates in the X, Y, and Z coordinate system are expressed as (X, Y, Z)=(0.75, 0.2, 0.7).

Note that the relationship between each signal point and bit (b0, b1, and b2) is as described in Embodiment 2.

In this way, in the reception device, it is possible to use a reception signal point arrangement different from the signal point arrangement used by the transmission device (as in FIG. 31, there is a change in the positions of the eight reception signal points). This arises due to the reception device receiving light from the surrounding environment.

In reception signal point estimator 2602 included in the reception device in FIG. 25, the positions of the eight true reception signal points in FIG. 31 need to be known.

An example of a frame configuration transmitted by a transmission device designed to overcome this problem will be given with reference to FIG. 27.

FIG. 27 illustrates an example of a frame configuration of a light modulated signal that is transmitted by the transmission device, and objects that operate the same as in FIG. 21 share like reference marks. Accordingly, repeated description thereof will be omitted.

In the frame configuration illustrated in FIG. 27, reference symbol 2801 is arranged before the transmission of data symbol 2104. Note that here, this symbol is referred to as a reference symbol, but this symbol may be referred to by some other name. For example, this symbol may be referred to as a pilot symbol, a reference signal, etc.

Figure 32:
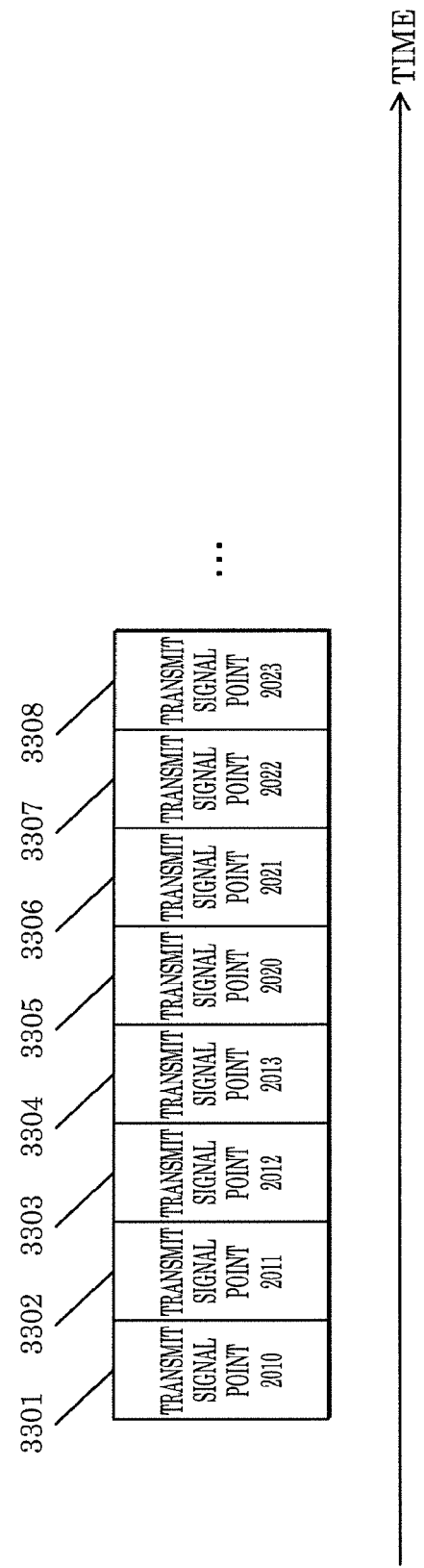
FIG. 32 illustrates one example of the transmission of a reference symbol according to Embodiment 7.

FIG. 32 illustrates one example of a configuration of reference symbol 2801 in FIG. 27. As illustrated in FIG. 32, the transmission device first transmits a light modulated signal corresponding to signal point 2010 in FIG. 30 (3301). Thereafter, the transmission device transmits a light modulated signal corresponding to signal point 2011 in FIG. 30 (3302), transmits a light modulated signal corresponding to signal point 2012 in FIG. 30 (3303), transmits a light modulated signal corresponding to signal point 2013 in FIG. 30 (3304), transmits a light modulated signal corresponding to signal point 2020 in FIG. 30 (3305), transmits a light modulated signal corresponding to signal point 2021 in FIG. 30 (3306), transmits a light modulated signal corresponding to signal point 2022 in FIG. 30 (3307), transmits a light modulated signal corresponding to signal point 2023 in FIG. 30 (3308), . . . , and so on, to configure reference symbol 2801. Note that the configuration method of reference symbol 2801 is not limited to the configuration illustrated in FIG. 32. For example, when there are eight signal points present as illustrated in FIG. 30, in reference symbol 2801, the symbol of each signal point is necessarily transmitted, that is to say, it is important that "a symbol of signal point 2010 is transmitted, a symbol of signal point 2011 is transmitted, a symbol of signal point 2012 is transmitted, a symbol of signal point 2013 is transmitted, a symbol of signal point 2020 is transmitted, a symbol of signal point 2021 is transmitted, a symbol of signal point 2022 is transmitted, and a symbol of signal point 2023 is transmitted".

Reception signal point estimator 2602 in FIG. 25 receives inputs of information 2205 related to a color space or a color system, signal-processed signal 2207, and control information 2209.

Reception signal point estimator 2602 knows the color space and/or color system of signal-processed signal 2207 from information 2205 related to a color space or a color system. Furthermore, reception signal point estimator 2602 knows the modulation scheme (or the number of signal points in the modulation scheme) of data symbol 2104 from control information 2209.

Based on this information, reception signal point estimator 2602, for example, begins estimating the position of a (true) reception signal point in the three-dimensions defined by the stimulus values X, Y, and Z.

For example, reception signal point estimator 2602 obtains (true) reception signal point 3210 from a symbol of signal point 2010 transmitted by the transmission device, for example, 3301, . . . , in FIG. 32.

Similarly, for example, reception signal point estimator 2602 obtains (true) reception signal point 3211 from a symbol of signal point 2011 transmitted by the transmission device, for example, 3302, . . . , in FIG. 32.

For example, reception signal point estimator 2602 obtains (true) reception signal point 3212 from a symbol of signal point 2012 transmitted by the transmission device, for example, 3303, . . . , in FIG. 32.

For example, reception signal point estimator 2602 obtains (true) reception signal point 3213 from a symbol of signal point 2013 transmitted by the transmission device, for example, 3304, . . . , in FIG. 32.

For example, reception signal point estimator 2602 obtains (true) reception signal point 3220 from a symbol of signal point 2020 transmitted by the transmission device, for example, 3305, . . . , in FIG. 32.

For example, reception signal point estimator 2602 obtains (true) reception signal point 3221 from a symbol of signal point 2021 transmitted by the transmission device, for example, 3306, . . . , in FIG. 32.

For example, reception signal point estimator 2602 obtains (true) reception signal point 3222 from a symbol of signal point 2022 transmitted by the transmission device, for example, 3307, . . . , in FIG. 32.

For example, reception signal point estimator 2602 obtains (true) reception signal point 3223 from a symbol of signal point 2023 transmitted by the transmission device, for example, 3308, . . . , in FIG. 32.

Then, reception signal point estimator 2602 outputs information pertaining to reception signal points 3210, 3211, 3212, 3213, 3220, 3221, 3222, and 3223 as reception signal point signal 2603.

Demodulator 2210 receives inputs of information 2205 related to a color space or a color system, signal-processed signal 2207, control information 2209, and reception signal point signal 2603.

Then, demodulator 2210 configures the color space and/or color system settings based on information 2205 related to a color space or a color system and control information 2209, extracts data symbol 2104 in FIG. 27, and begins demodulating data symbol 2104.

Figure 33:
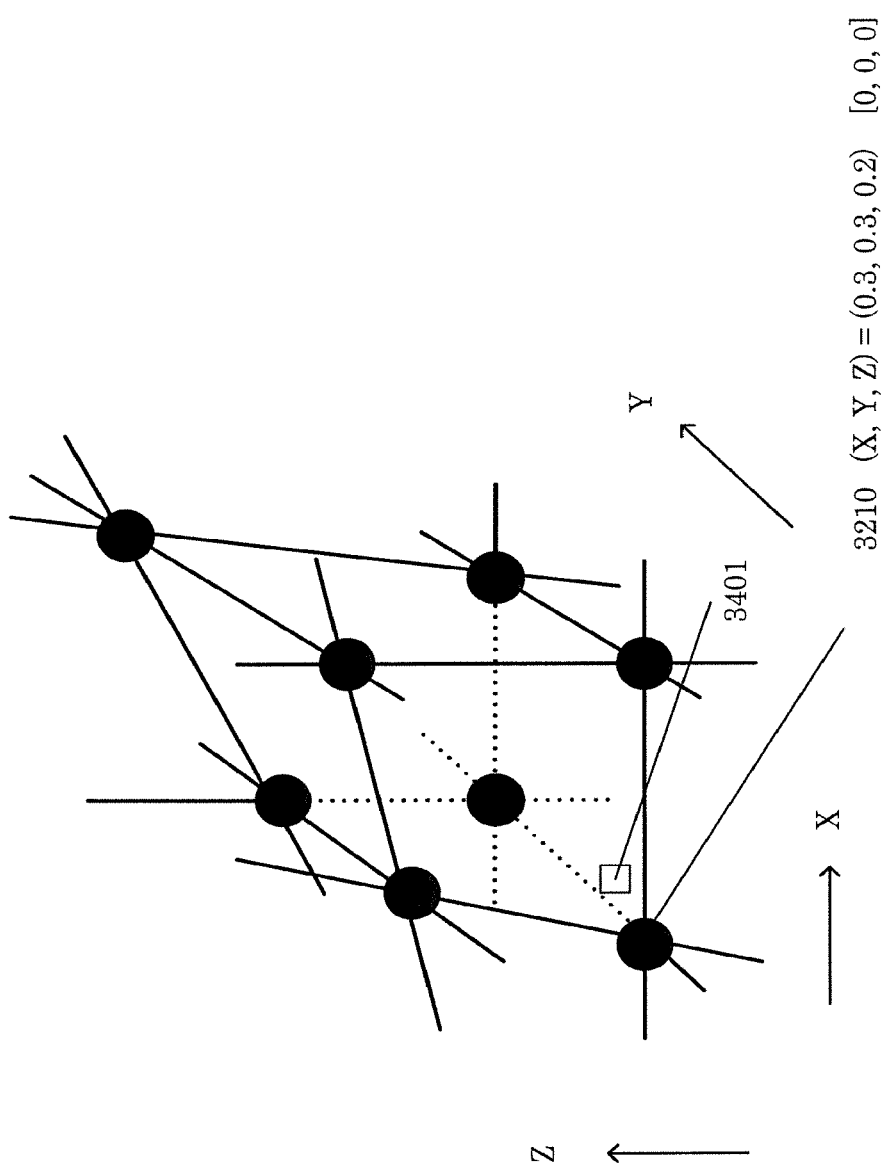
FIG. 33 illustrates one example of an arrangement of true reception signal points and the position of a reception signal in a modulation scheme according to Embodiment 7.

An operational example of demodulator 2210 will be described with reference to FIG. 33. FIG. 33 illustrates a three-dimensional space defined by the stimulus values X, Y, and Z. In FIG. 33, 3401 is the reception signal point of a data symbol, the position of which is obtained from signal-processed signal 2207 in FIG. 25.

In demodulator 2210, demodulation is performed using (true) reception signal points 3210, 3211, 3212, 3213, 3220, 3221, 3222, and 3223, as well as reception signal point 3401 of the data symbol.

For example, when performing a hard decision, the Euclidean distance between signal point 3210 and reception signal point 3401 of the data symbol, the Euclidean distance between signal point 3211 and reception signal point 3401 of the data symbol, the Euclidean distance between signal point 3212 and reception signal point 3401 of the data symbol, the Euclidean distance between signal point 3213 and reception signal point 3401 of the data symbol, the Euclidean distance between signal point 3220 and reception signal point 3401 of the data symbol, the Euclidean distance between signal point 3221 and reception signal point 3401 of the data symbol, the Euclidean distance between signal point 3222 and reception signal point 3401 of the data symbol, and the Euclidean distance between signal point 3223 and reception signal point 3401 of the data symbol are calculated, and when the Euclidean distance between signal point 3210 and reception signal point 3401 of the data symbol is determined to be the shortest, it is determined that b0=0, b1=0, and b2=0 has been transmitted in the data symbol, and b0=0, b1=0, and b2=0 are obtained.

When performing a soft decision, for example, the log-likelihood ratio of b0, the log-likelihood ratio of b1, and the log-likelihood ratio of b2 are obtained using (true) reception signal points 3210, 3211, 3212, 3213, 3220, 3221, 3222, and 3223, as well as reception signal point 3001 of the data symbol.

Thereafter, for example, error correction decoding is performed to receive reception data.

As described above, it is possible to achieve the advantageous effect that it is possible for the reception device achieve high data reception quality.

Note that in this embodiment, description is given based on when mapping such as that illustrated in FIG. 30 is performed using a three-dimensional space defined by stimulus values X, Y, and Z, but mapping may be performed using a color space or color system in a three-dimensional space using other parameters, rather than the three-dimensional space defined by stimulus values X, Y, and Z. Even in such a case, the embodiment may be implemented in the same manner. For example, the embodiment can be implemented even when mapping using a three-dimensional space defined by the three signals in the sRGB format described in Embodiment 3, namely the R[sRGB] signal, the G[sRGB] signal, and the B[sRGB] signal, or mapping using a three-dimensional space defined by the three signals in the AdobeRGB format described in Embodiment 4, namely the R[A-RGB] signal, the G[A-RGB] signal, and the B[A-RGB] signal is used. Of course, the mapping using a color space and/or color system in a three-dimensional space is not limited to these examples.

Moreover, in this embodiment, an implementation example in which eight signal points are present in a three-dimensional space defined by the stimulus values X, Y, and Z is given, but the number of signal points present is not limited to eight. When four signal points are present, that is to say, when 2 bit transmission is performed, when 16 signal points are present, that is to say, when 4 bit transmission is performed, and when 64 signal points are present, that is to say, when 6 bit transmission is performed, in any case, the above can be implemented in the same manner.

For example, when there are four signal points present (assume the four signal points are named first signal point, second signal point, third signal point, and fourth signal point), that is to say, when 2 bit transmission is performed, in reference symbol 2801, the symbol of each signal point is necessarily transmitted, that is to say, it is important that "a symbol of the first signal point is transmitted, a symbol of the second signal point is transmitted, a symbol of the third signal point is transmitted, and a symbol of the fourth signal point is transmitted".

Note that a transmission method such as the one illustrated in FIG. 32 was described as an example of a transmission method of reference symbol 2801 in FIG. 27. Here, a method is conceivable in which the order in which the signal points in FIG. 32 are transmitted and the number of symbols to be transmitted are the same in the transmission device and the reception device.

Moreover, a method in which the order in which the signal points in FIG. 32 are transmitted and the number of symbols to be transmitted are different in the transmission device and the reception device, and the reception device estimates the order and number is acceptable.

Embodiment 8

In this embodiment, the configuration of a communication system that can achieve high data reception quality will be described.

Figure 34:
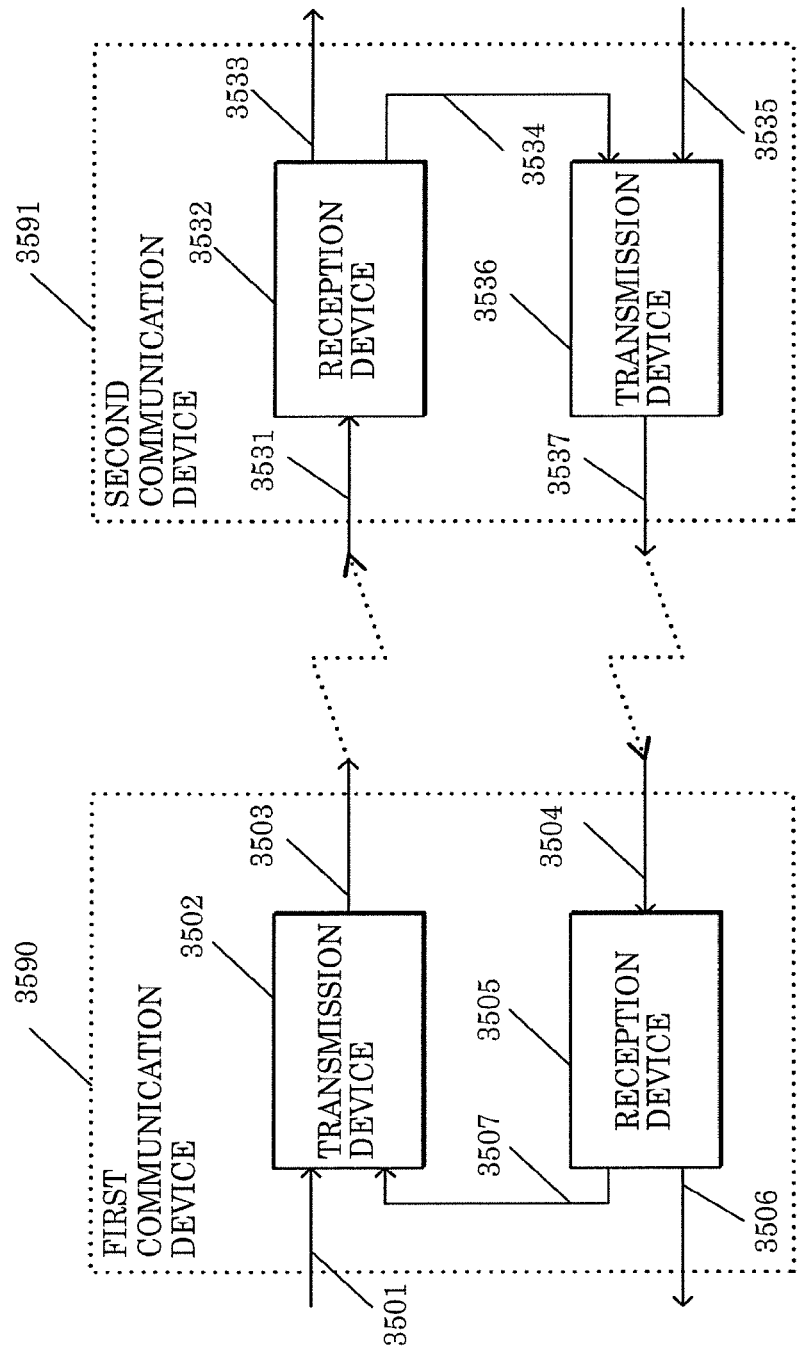
FIG. 34 illustrates a configuration example of a communication system according to Embodiment 8.

FIG. 34 illustrates an example of a communication system according to this embodiment. In FIG. 34, first communication device 3590 and second communication device 3591 are communicating.

In FIG. 34, transmission device 3502 included in first communication device 3590 is a device that transmits a light modulated signal, and reception device 3532 included in second communication device 3591 is a reception device that receives the light modulated signal.

Transmission device 3536 included in second communication device 3591 may be a transmission device that transmits a light modulated signal, may be a transmission device that transmits a modulated signal over radio waves, and may be a transmission device that transmits a modulated signal by wire. First communication device 3590 includes reception device 3505 that receives the modulated signal transmitted by transmission device 3536 included in second communication device 3591.

Transmission device 3502 in first communication device 3590 receives inputs of data 3501 and control signal 3507, performs signal processing such as mapping based on control signal 3507, and outputs light modulated signal 3503. Note that a detailed configuration of the transmission device and operations performed thereby have already been described in Embodiment 1 through Embodiment 7; operations particular to this embodiment will be described later.

Reception device 3532 in second communication device 3591 receives light modulated signal 3503 transmitted by transmission device 3502 in first communication device 3590, and receives this as an input of reception signal 3531.

Reception device 3532 demodulates reception signal 3531 to obtain and output reception data 3533, and moreover, for example outputs information 3534 for notifying first communication device 3590 of the reception state, etc.

Transmission device 3536 in second communication device 3591 receives inputs of transmission data 3535 and information 3534 for notification, and generates and outputs modulated signal 3537.

Reception device 3505 in first communication device 3590 receives light modulated signal 3537 transmitted by transmission device 3536 in second communication device 3591, and receives this as an input of reception signal 3504.

Reception device 3505 demodulates reception signal 3504 and outputs reception data 3506, and outputs information for notifying second communication device 3591 of the reception state as control signal 3507.

Hereinafter, an example of the operations described above and illustrated in FIG. 34 will be given.

For example, assume transmission device 3502 included in first communication device 3590 in FIG. 34 generates and outputs light modulated signal 3503 via mapping like that illustrated in FIG. 18. Note this operation has already been described in Embodiment 1 and Embodiment 6.

Here, assume the reception state of reception device 3532 included in second communication device 3591 in FIG. 34 is the reception state illustrated in FIG. 29, as described in Embodiment 6. Here, there are four (true) reception signal points, and since the minimum Euclidean distance defined by two of the four reception signal points is short, data reception quality is poor.

Figure 35:
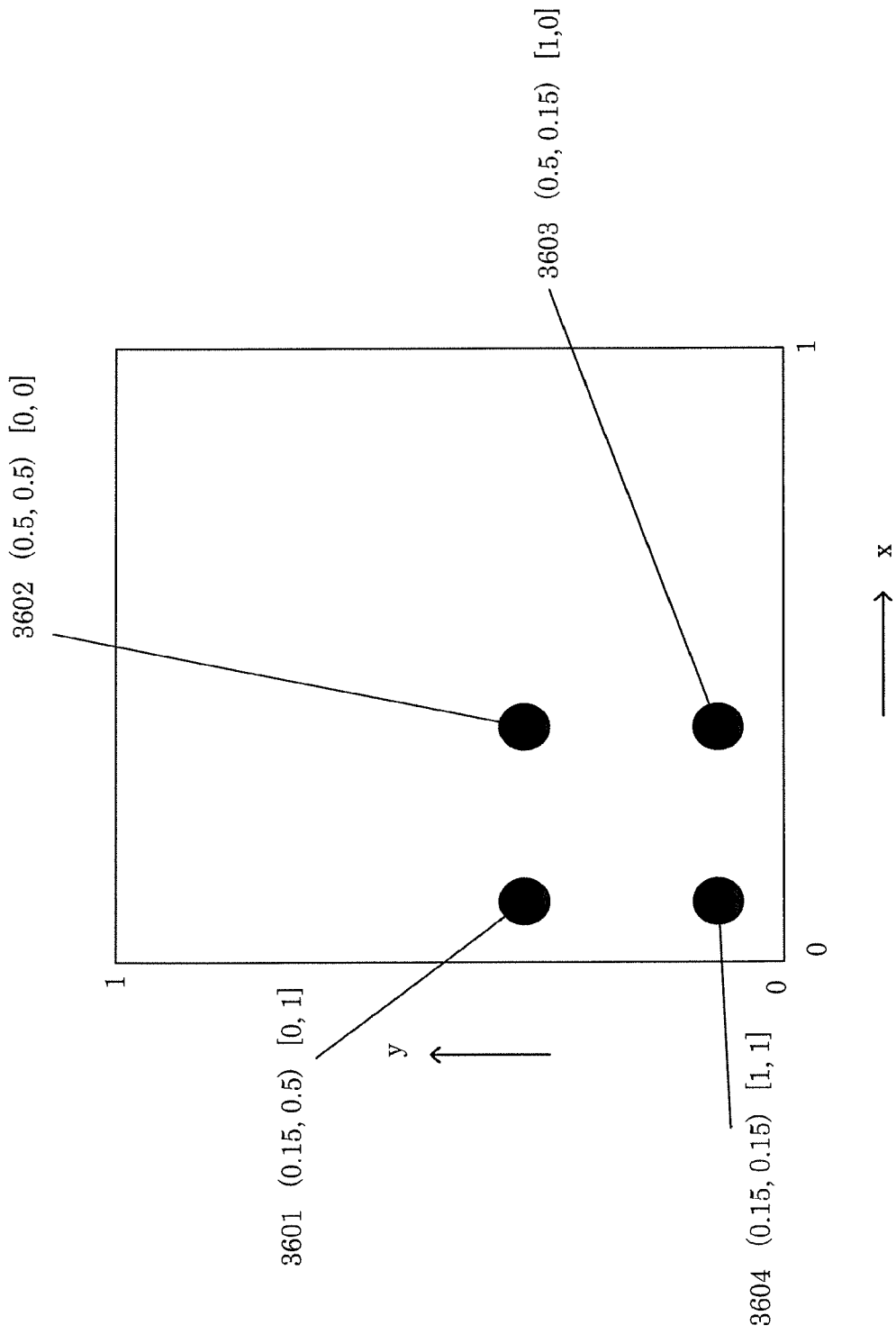
FIG. 35 illustrates one example of an arrangement of signal points in a modulation scheme upon transmission according to Embodiment 8.

In contrast, assume transmission device 3502 included in first communication device 3590 in FIG. 34 generates and outputs a light modulated signal via mapping like that illustrated in FIG. 35. Note that transmission device 3502 included in first communication device 3590 in FIG. 34 has the configuration illustrated in FIG. 9 and described in Embodiment 1.

FIG. 35 illustrates a modulation scheme having four signal points in an xy chromaticity diagram, similar to FIG. 18. In FIG. 35, the horizontal axis is x and the vertical axis is y. The four black dots in FIG. 35 represent the signal points.

Signal point 3601 has an x value of 0.15 and a y value of 0.15, which are expressed as (x, y)=(0.15, 0.15).

Signal point 3602 has an x value of 0.5 and a y value of 0.5, which are expressed as (x, y)=(0.5, 0.5).

Signal point 3603 has an x value of 0.5 and a y value of 0.15, which are expressed as (x, y)=(0.5, 0.15).

Signal point 3604 has an x value of 0.15 and a y value of 0.15, which are expressed as (x, y)=(0.15, 0.15).

When the input bits are expressed as bit b0 and bit b1, when b0=0 and b1=1, that is to say, [b0, b1]=[0, 1], this is mapped to signal point 1801, resulting in a mapping output of (x, y)=(0.15, 0.5).

Similarly, when the input bits are expressed as bit b0 and bit b1, when b0=0 and b1=0, that is to say, [b0, b1]=[0, 0], this is mapped to signal point 1802, resulting in a mapping output of (x, y)=(0.5, 0.5).

When the input bits are expressed as bit b0 and bit b1, when b0=1 and b1=0, that is to say, [b0, b1]=[1, 0], this is mapped to signal point 1803, resulting in a mapping output of (x, y)=(0.5, 0.15).

When the input bits are expressed as bit b0 and bit b1, when b0=1 and b1=1, that is to say, [b0, b1]=[1, 1], this is mapped to signal point 1804, resulting in a mapping output of (x, y)=(0.15, 0.15).

The above operations are performed by mapper 904 in FIG. 9, but since details regarding the operations are the same as described in Embodiment 1, repeated description is omitted.

For example, assume transmission device 3502 included in first communication device 3590 in FIG. 34 generates and outputs light modulated signal 3503 via mapping like that illustrated in FIG. 35.

Figure 36:
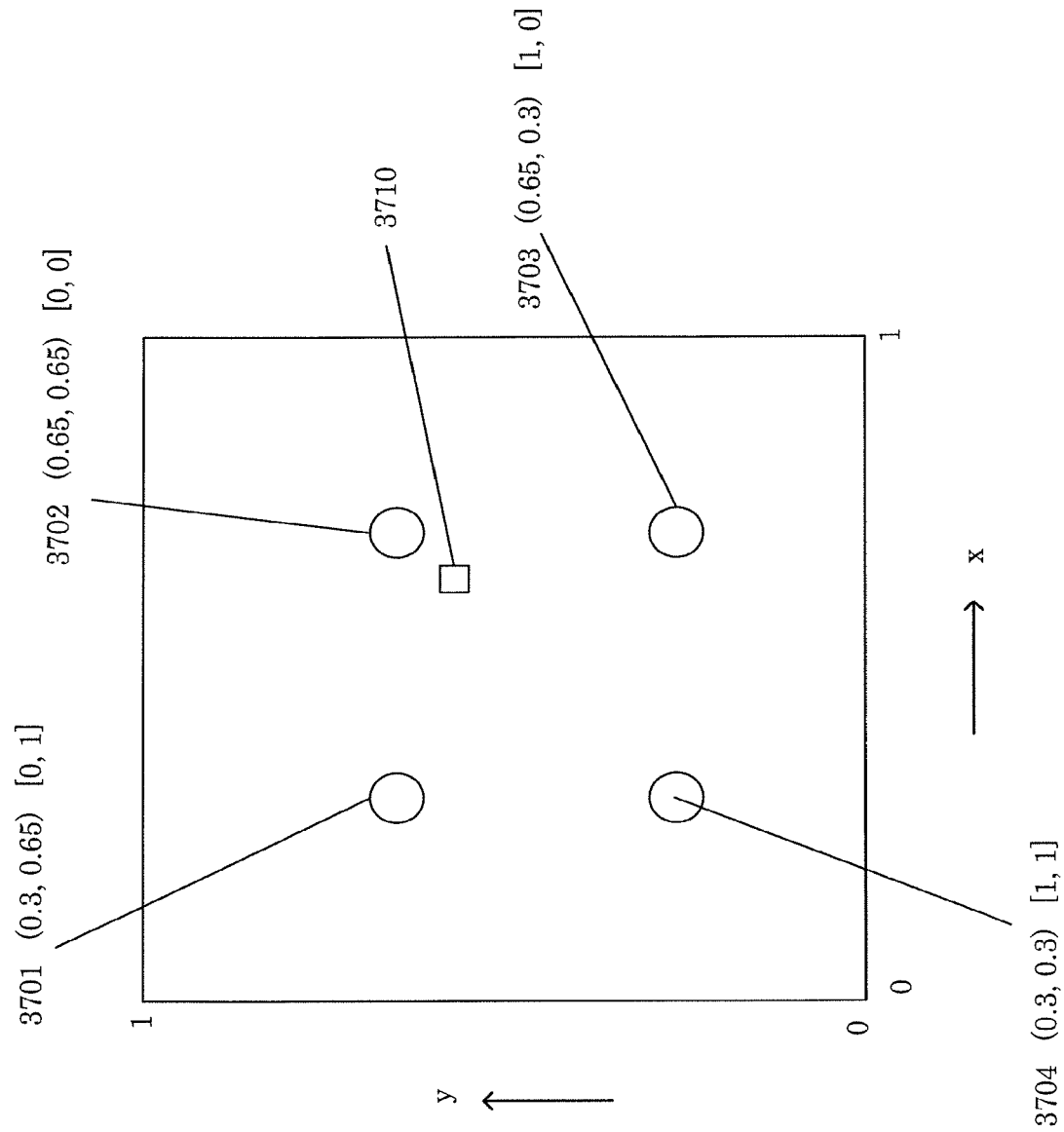
FIG. 36 illustrates one example of an arrangement of signal points and the position of a reception signal in a modulation scheme upon reception according to Embodiment 8.

Here, assume the reception state of reception device 3532 included in second communication device 3591 in FIG. 34 is the reception state illustrated in FIG. 36. Assume reception device 3532 included in second communication device 3591 in FIG. 34 has the configuration illustrated in, for example, FIG. 22.

FIG. 36 illustrates an xy chromaticity diagram. The horizontal axis is x and the vertical axis is y. In FIG. 36, 3710 is the reception signal point of the data symbol, and 3701, 3702, 3703, and 3704 are the (true) reception signal points described in Embodiment 6.

(True) reception signal point 3701 has an x value of 0.3 and a y value of 0.65, which are expressed as (x, y)=(0.3, 0.65). Here, b0=0 and b1=1.

(True) reception signal point 3702 has an x value of 0.65 and a y value of 0.65, which are expressed as (x, y)=(0.65, 0.65). Here, b0=0 and b1=0.

(True) reception signal point 3703 has an x value of 0.65 and a y value of 0.3, which are expressed as (x, y)=(0.65, 0.3). Here, b0=1 and b1=1.

(True) reception signal point 3704 has an x value of 0.3 and a y value of 0.3, which are expressed as (x, y)=(0.3, 0.3). Here, b0=0 and b1=0.

In the reception state illustrated in FIG. 36, reception device 3532 included in second communication device 3591 in FIG. 34 exhibits favorable data reception quality since the minimum Euclidean distance defined by two of the four (true) reception signal points is long.

Accordingly, transmission device 3502 in first communication device 3590 preferably transmits a light modulated signal using mapping like that illustrated in FIG. 35.

Hereinafter, an example of a method that allows transmission device 3502 of first communication device 3590 to select a mapping method will be described.

Figure 37:
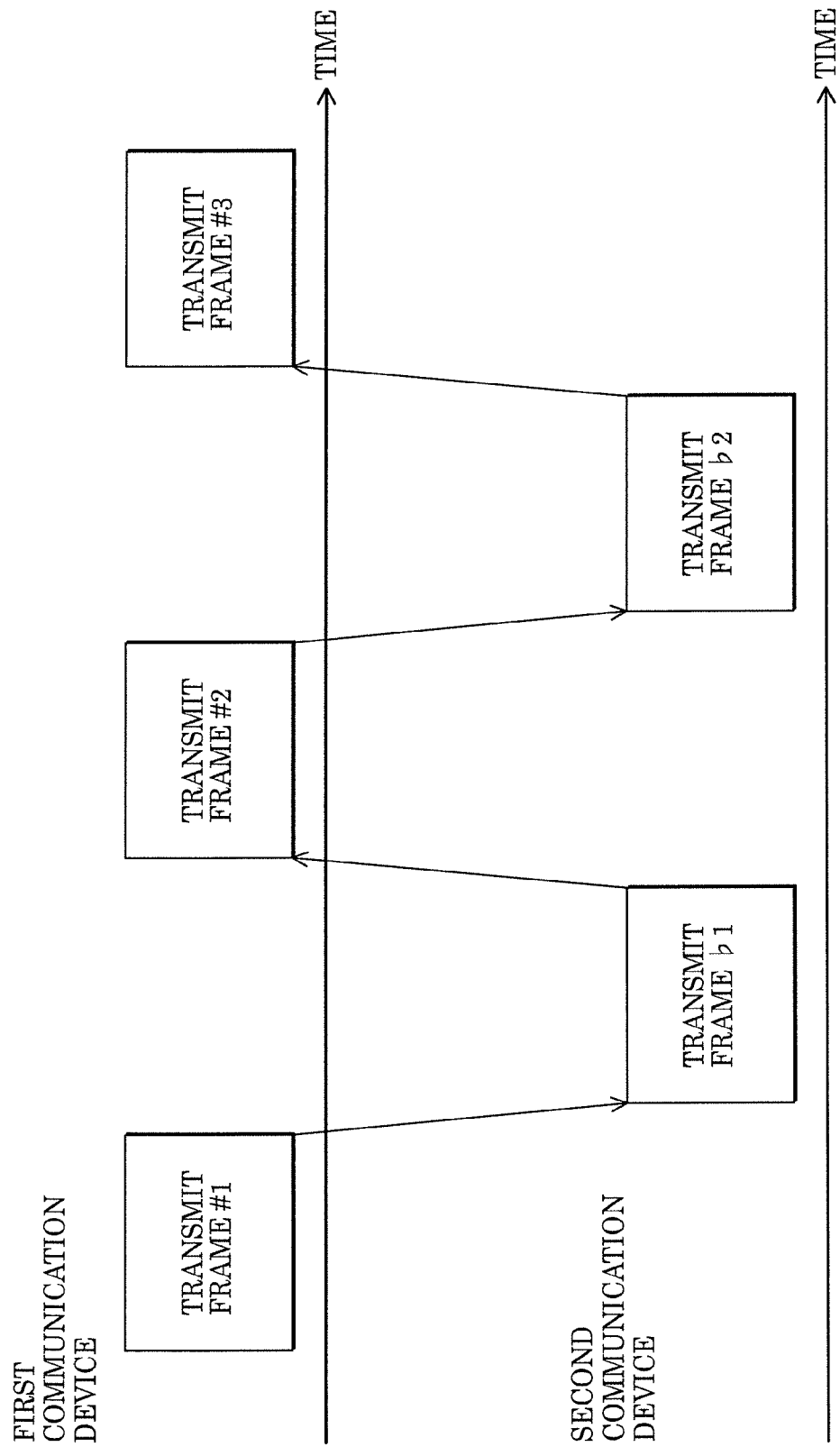
FIG. 37 illustrates one example of frame transmission according to Embodiment 8.

In FIG. 37 illustrates an example of communication between first communication device 3590 and second communication device 3591 illustrated in FIG. 34 on the time axis. In FIG. 37, time is represented on the horizontal axis.

As illustrated in FIG. 37, first communication device 3590 in FIG. 34 transmits frame #1.

In response, second communication device 3591 in FIG. 34 receives frame #1, and then transmits frame ♭ 1.

First communication device 3590 in FIG. 34 receives frame ♭ 1, and then transmits frame #2.

Second communication device 3591 in FIG. 34 receives frame #2, and then transmits frame ♭ 2.

First communication device 3590 in FIG. 34 receives frame ♭ 2, and then transmits frame #3.

Next, a detailed example of the transmission occurring in FIG. 37 will be described.

Figure 38:
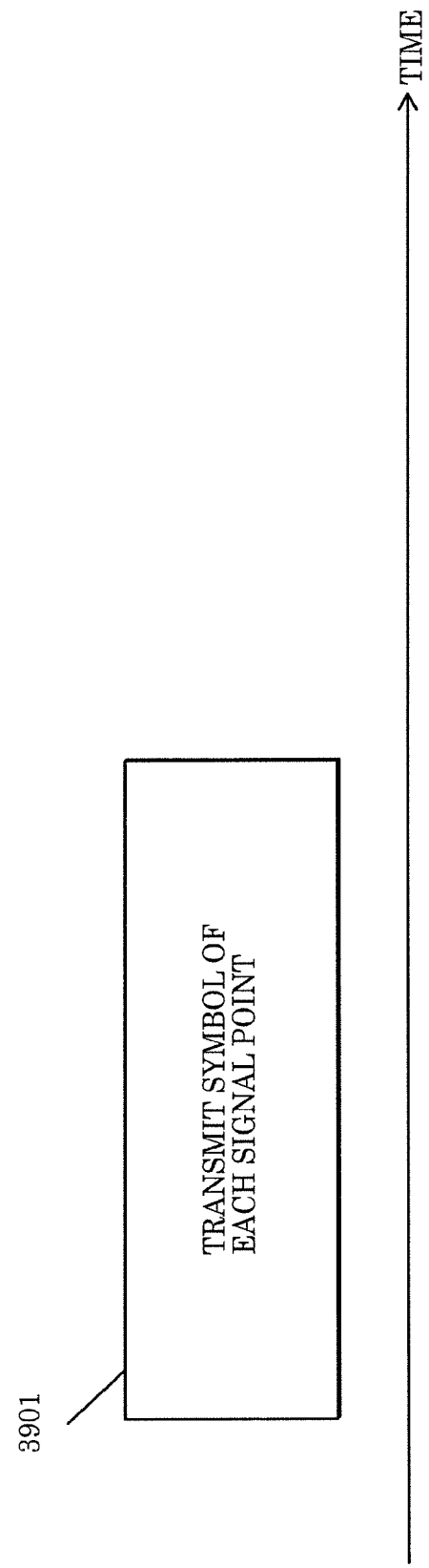
FIG. 38 illustrates one example of the transmission of a symbol of a signal point according to Embodiment 8.

Frame #1, frame #2, and frame #3 in FIG. 37 include the symbol illustrated in FIG. 38. In FIG. 38, time is represented on the horizontal axis. 3901 represents the symbol of each signal point. For example, when first communication device 3590 in FIG. 34 transmits symbols using the mapping illustrated in FIG. 18, the symbol of signal point 1801, the symbol of signal point 1802, the symbol of signal point 1803, and the symbol of signal point 1804 are transmitted. Moreover, when first communication device 3590 in FIG. 34 transmits symbols using the mapping illustrated in FIG. 35, the symbol of signal point 3601, the symbol of signal point 3602, the symbol of signal point 3603, and the symbol of signal point 3604 are transmitted as symbol 3901 of each signal point.

Figure 39:
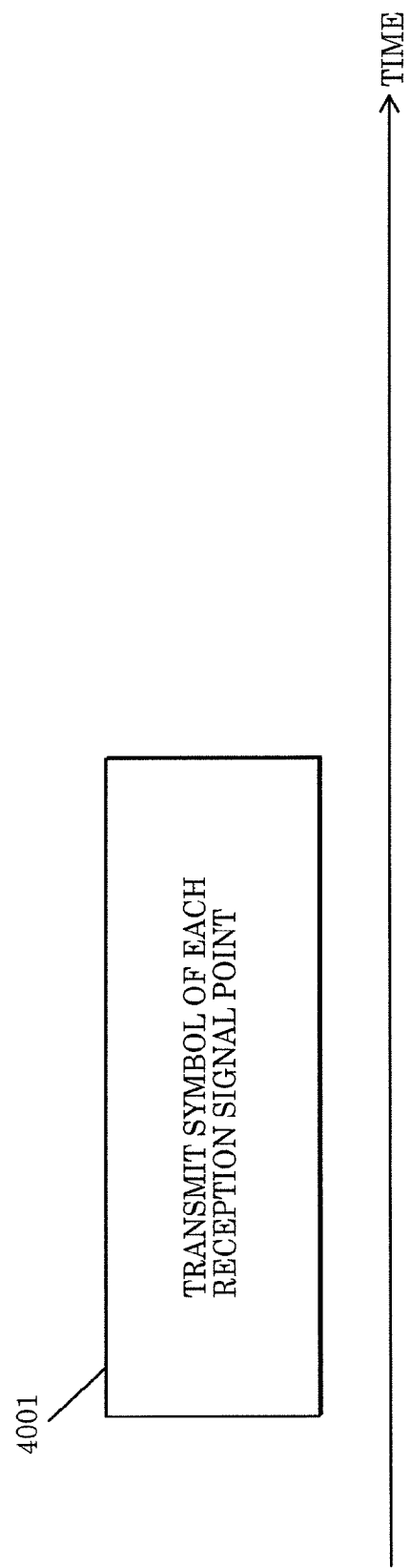
FIG. 39 illustrates one example of the transmission of a symbol of a reception signal point according to Embodiment 8.

Frame ♭ 1 and frame ♭ 2 in FIG. 37 include the symbol illustrated in FIG. 39. In FIG. 39, time is represented on the horizontal axis, and 4001 represents the symbol of each reception signal point.

For example, in frame #1 in FIG. 37, transmission device 3502 included in first communication device 3590 in FIG. 34 transmits symbols using the mapping in FIG. 18.

With this, reception device 3532 included in second communication device 3591 in FIG. 34 estimates reception signal points using symbol 3901 of each signal point included in frame #1, and as a result, confirms that the reception state is like the state illustrated in FIG. 29.

Here, assume transmission device 3536 included in second communication device 3591 in FIG. 34 transmits frame b 1 including information indicating that the communication state is like the state illustrated in FIG. 29.

Information indicating that the communication state is like the state illustrated in FIG. 29 may indicate coordinates of the four reception signal points in the xy chromaticity diagram, may indicate the minimum Euclidean distance defined by two of the four reception signal points, may indicate the reception state, may indicate whether a packet (or frame or information) was successfully received or not (however, the information is not limited to these examples).

Reception device 3505 in first communication device 3590 receives frame ♭ 1, and thereby knows the reception state of second communication device 3591. Here, assume first communication device 3590 determines that the reception state of second communication device 3591 is poor.

First communication device 3590 switches the mapping method from the method illustrated in FIG. 18 to the method illustrated in FIG. 35, and transmits frame #2 using the mapping method illustrated in FIG. 35.

Reception device 3532 in second communication device 3591 receives frame #2, and since the mapping method has been switched, data reception quality is improved.

Note that in this embodiment, an example of a mapping method using four signal points that switches between the methods illustrated in FIG. 18 and FIG. 35 is given, but the mapping method is not limited to this example. For example, the following two methods are conceivable as methods for switching between mapping methods.

Method 1:

First communication device 3590 is capable of using a plurality of mapping methods using four signal points. First communication device 3590 selects a mapping method from among the plurality of mapping methods, generates a symbol using the selected mapping method, and transmits a light modulated signal. Note that second communication device 3591 knows the plurality of mapping methods that use the four signal points.

For example, assume four mapping methods are provided as the plurality of mapping methods using four signal points. For example, assume these are mapping method 1, mapping method 2, mapping method 3, and mapping method 4. First communication device 3590 selects any one of mapping method 1, mapping method 2, mapping method 3, and mapping method 4, and transmits a symbol.

Here, first communication device 3590 may transmit, to second communication device 3591, control information indicating which of the mapping methods was used.

For example, v0 and v1 may be prepared as this control information, and first communication device 3590 may transmit control information including v0 and v1.

When v0=0 and v1=0, this indicates that mapping method #1 was used, when v0=0 and v1=1, this indicates that mapping method #2 was used, when v0=1 and v1=0, this indicates that mapping method #3 was used, and when v0=1 and v1=1, this indicates that mapping method #4 was used.

As a result of second communication device 3591 knowing the values of v0 and v1, second communication device 3591 can know the mapping method used by first communication device 3590.

However, first communication device 3590 need not transmit information pertaining to the mapping method. For example, when reference symbol 2801 is transmitted, like in FIG. 28, second communication device 3591 can estimate the position of the reception signal point based on reference symbol 2801.

Method 2:

First communication device 3590 determines the positions of the four signal points based on the information related to the reception state (communication state) transmitted by second communication device 3591, generates symbols using a mapping method in accordance with the four signal point positions, and transmits a light modulated signal. Here, for example, when reference symbol 2801 is transmitted, like in FIG. 28, second communication device 3591 can estimate the position of the reception signal point based on reference symbol 2801.

Note that in the above description, an example of a mapping method using four signal points is given, but the number of signal points is not limited to four. A mapping method that uses two signal points, a mapping method that uses eight signal points, a mapping method that uses 16 signal points, a mapping method that uses 64 signal points may be implemented in the same manner.

Moreover, in this embodiment, an example is given in which signal points are arranged in an xy chromaticity diagram, but this example is not limiting. For example, a method of arranging signal points in a color space and a method of arranging signal points in a color system may be implemented in the same manner. Accordingly, three-dimensional mapping like described in other embodiments can be implemented in the same manner as when the two-dimensional mapping is performed like in this embodiment.

Embodiment 9

In Embodiment 8, as one example, a method in which the transmission device switches the mapping arrangement based on information from the communication partner was given. In this embodiment, an example of a mapping method that uses four signal points will be given.

When signal points are arranged as illustrated in FIG. 18, signal points 1801, 1802, 1803, and 1804 form a square shape.

Similarly, when signal points are arranged as illustrated in FIG. 35, signal points 3601, 3602, 3603, and 3604 form a square shape.

In this way, as described in Embodiment 8, when the transmission device can select a mapping method for four signal points from among a plurality of mapping methods, such as from among the mapping method in FIG. 18 and the mapping method in FIG. 35, the signal points may be arranged in a square shape for any of the plural mapping methods.

However, the intersection of the diagonal lines of the square formed by signal points 1801, 1802, 1803, and 1804 and the intersection of the diagonal lines of the square formed by signal points 3601, 3602, 3603, and 3604 may be in different positions in the xy chromaticity diagram. This is a feature point.

Assume the transmission device selects a mapping method from among the plurality of mapping methods that use four signal points, and generates a modulated signal.

Here, the following points are feature points: the signal point arrangement in any of the plurality of mapping methods that use four signal points has the shape of a square (the signal points are at the corners) as illustrated in FIG. 18 and FIG. 35; and the plurality of mapping methods that use four signal points include a first mapping method and a second mapping method. Note that the intersection of the diagonal lines of the square formed by the signal points in the first mapping method and the intersection of the diagonal lines of the square formed by the signal points in the second mapping method are in different positions in the xy chromaticity diagram.

This mitigates the effect of external light in the environment in which the transmission device and the reception device are placed, and makes it possible to achieve high data reception quality.

In this embodiment, an example is given in which signal points are arranged in an xy chromaticity diagram, but this example is not limiting. For example, a method of arranging signal points in a color space and a method of arranging signal points in a color system may be implemented in the same manner.

Embodiment 10

In this embodiment, an example of a transmission method of a data symbol when the transmission device in FIG. 6 and/or FIG. 9, for example, transmits a light modulated signal using the frame configuration illustrated in FIG. 21 and/or FIG. 27.

A transmission method of a data symbol in the frame configuration illustrated in FIG. 21 and/or FIG. 27 will be described.

When the transmission device illustrated in FIG. 6 and/or FIG. 9 performs mapping on a small number of signal points, such as the mapping in which two signal points are present in a xy chromaticity diagram, mapping in which four signal points are present in a xy chromaticity diagram, mapping in which two, four, or eight signal points are present in three-dimensions, etc., the light that the transmission device emits may be a color that has a bias, and depending on the application, may be unpleasantly perceived by a person, which means that there is a possibility that it is unsuitable for usage along with a light in, for example, an advertisement. Hereinafter, a transmission method for overcoming this problem will be given.

When the transmission device has a configuration like that in FIG. 9, a data randomizer or a scrambler may be inserted after encoder 902, and data may be randomized. It goes without saying that in the reception device, demodulation may be performed taking the data randomizing into consideration.

Moreover, a symbol randomizer or a scrambler may be inserted after mapper 904, and the symbols may be randomized. It goes without saying that in the reception device, demodulation may be performed taking the symbol randomizing into consideration.

However, as described above, when mapping of a few number of signal points is performed, even if these are randomized, the light emitted by the transmission device may possibly be a color having a bias.

A method, for overcoming this problem, of switching mapping methods in at least the data symbol in FIG. 10, FIG. 11, FIG. 21, and FIG. 27 will be described.

The following three methods for switching the mapping are conceivable.

Switching method 1: switching the mapping method on a per-symbol basis.

Switching method 2: switching the mapping method on a per-frame basis.

Switching method 3: switching the mapping method on the basis of a plurality of symbols.

Hereinafter, first, switching method 1 will be described. A simple example will be given in which switching between two mapping methods is performed. However, this is merely one example. Switching may be performed between three or more mapping methods.

An example in which the transmission device in FIG. 6, for example, transmits a symbol in a frame configuration like that in FIG. 27 will be given. Note that the transmission device in FIG. 6 is assumed to perform mapping using four signal points.

Figure 40:
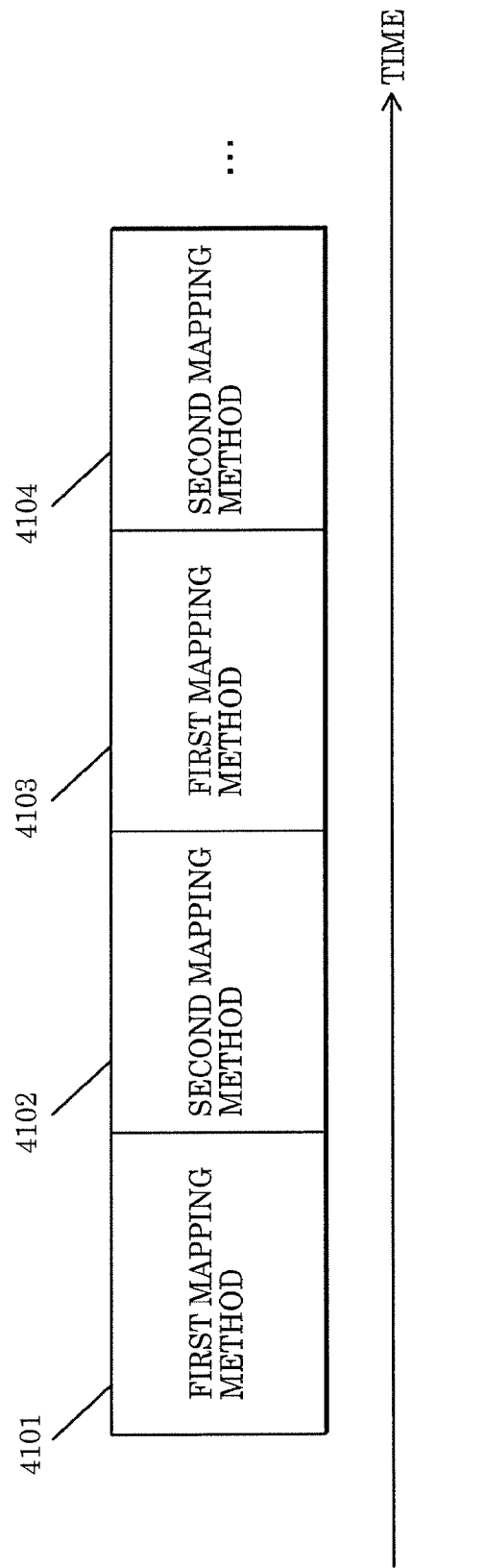
FIG. 40 illustrates one example of transmission in a mapping method according to Embodiment 10.

One example of the configuration of data symbol 2104 in the frame configuration in FIG. 27 is shown in FIG. 40. In FIG. 40, time is represented on the horizontal axis, a symbol according to first mapping method 4101 is transmitted, and thereafter, a symbol according to second mapping method 4102 is transmitted, a symbol according to first mapping method 4103 is transmitted, a symbol according to second mapping method 4104 is transmitted, . . . , and so on, in the listed order.

Next, an example of the first mapping method and the second mapping method will be given.

As one example, assume both the first mapping method and the second mapping method pertain to mapping in which four signal points are arranged in an xy chromaticity diagram.

Assume the first mapping method is a mapping method like that illustrated in FIG. 18, and the second mapping method is a mapping method like that illustrated in FIG. 35.

Here, as described in Embodiment 8, one feature point is that the intersection of the diagonal lines of the square formed by the signal points in the first mapping method and the intersection of the diagonal lines of the square formed by the signal points in the second mapping method are in different positions in the xy chromaticity diagram. This makes it possible to achieve the advantageous effect that it is possible to reduce the possibility that the light emitted by the transmission device is of a color having bias.

Moreover, when switching between three or more mapping methods, assume these three or more mapping methods include a third mapping method and a fourth mapping method. Note that the intersection of the diagonal lines of the square formed by the signal points in the third mapping method and the intersection of the diagonal lines of the square formed by the signal points in the fourth mapping method are in different positions in the xy chromaticity diagram.

Other methods include a fifth mapping method including four signal points in an xy chromaticity diagram and a sixth mapping method including four signal points in a color system or a color space that is not an xy chromaticity diagram.

For example, when the two mapping methods of the fifth mapping method and the sixth mapping method are switched between, just like in FIG. 40, a symbol according to the fifth mapping method is transmitted, and thereafter, a symbol according to the sixth mapping method is transmitted, a symbol according to the fifth mapping method is transmitted, a symbol according to the sixth mapping method is transmitted, . . . , and so on, in the listed order. This makes it possible to achieve the advantageous effect that it is possible to reduce the possibility that the light emitted by the transmission device is of a color having bias.

Moreover, when switching between three or more mapping methods, assume these three or more mapping methods include a seventh mapping method and an eighth mapping method. Note that the color system or the color space in which signal points are arranged in the seventh mapping method and the color system or the color space in which signal points are arranged in the eighth mapping method are different. This makes it possible to achieve the advantageous effect that it is possible to reduce the possibility that the light emitted by the transmission device is of a color having bias.

Note that when switching is performed between three or more mapping methods, the switching of the mapping methods need not necessarily be performed regularly.

For example, when switching regularly, a symbol according to a ninth mapping method is transmitted, and thereafter, a symbol according to a tenth mapping method is transmitted, a symbol according to an eleventh mapping method is transmitted, a symbol according to the ninth mapping method is transmitted, a symbol according to the tenth mapping method is transmitted, a symbol according to the eleventh mapping method is transmitted, a symbol according to the ninth mapping method is transmitted, a symbol according to the tenth mapping method is transmitted, a symbol according to the eleventh mapping method is transmitted, . . . , and so on.

When regular switching is not performed, the symbol according to the ninth mapping, the symbol according to the tenth mapping, and the symbol according to the eleventh mapping may be transmitted in any kind of arrangement.

Note that this also to applies to when switching between two or more mapping methods is performed; switching may be performed regularly and may be not performed regularly.

Next, switching method 2 will be described. A simple example will be given in which switching between two mapping methods is performed. However, this is merely one example. Switching may be performed between three or more mapping methods.

An example in which the transmission device in FIG. 6, for example, transmits a symbol according to a frame configuration like that in FIG. 27 will be given. Note that the transmission device in FIG. 6 is assumed to perform mapping using four signal points.

Figure 41:
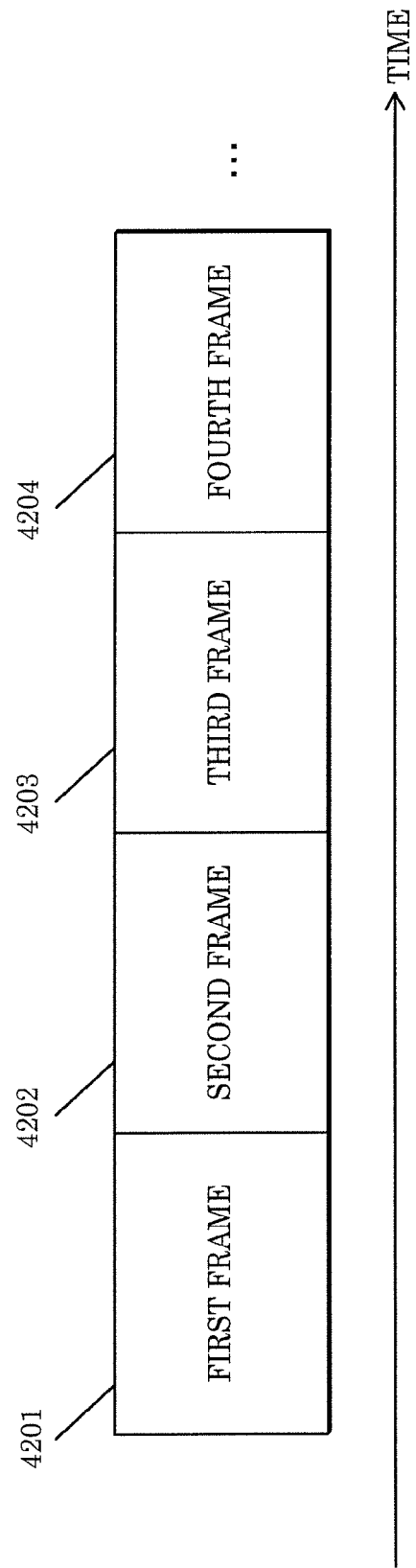
FIG. 41 illustrates one example of frame transmission according to Embodiment 10.

In FIG. 41, time is represented on the horizontal axis, first frame 4201 is transmitted, and thereafter, second frame 4202, third frame 4203, fourth frame 4204, . . . , are transmitted in the listed order. Here, first frame 4201 is transmitted, and thereafter, second frame 4202, third frame 4203, fourth frame 4204, . . . , indicate a frame of the configuration illustrated in FIG. 27, for example.

Here, as one example, assume first frame 4201 uses the first mapping method, second frame 4202 uses the second mapping method, third frame 4203 uses the first mapping method, fourth frame 4204 uses the second mapping method, . . . , and so on.

Note that the characterizing features of the first mapping method and the second mapping method are as described above. This makes it possible to achieve the advantageous effect that it is possible to reduce the possibility that the light emitted by the transmission device is of a color having bias.

Moreover, three or more mapping methods may be switched between on a per-frame basis. In such a case, assume that these three or more mapping methods include a third mapping method and a fourth mapping method. Note that the intersection of the diagonal lines of the square formed by the signal points in the third mapping method and the intersection of the diagonal lines of the square formed by the signal points in the fourth mapping method are in different positions in the xy chromaticity diagram.

Moreover, as another example, the two mapping methods of the fifth mapping method and the sixth mapping method may be switched between on a per-frame basis, for example. This makes it possible to achieve the advantageous effect that it is possible to reduce the possibility that the light emitted by the transmission device is of a color having bias. Here, the characterizing features of the fifth mapping method and the sixth mapping method are as described above. This makes it possible to achieve the advantageous effect that it is possible to reduce the possibility that the light emitted by the transmission device is of a color having bias.

Furthermore, when switching between three or more mapping methods on a per-frame basis, assume these three or more mapping methods include the seventh mapping method and the eighth mapping method. Note that the color system or the color space in which signal points are arranged in the seventh mapping method and the color system or the color space in which signal points are arranged in the eighth mapping method are different. This makes it possible to achieve the advantageous effect that it is possible to reduce the possibility that the light emitted by the transmission device is of a color having bias.

Note that when switching is performed between three or more mapping methods, the switching of the mapping methods need not necessarily be performed regularly.

For example, when switching regularly, a symbol group according to the ninth mapping method is transmitted, and thereafter, a symbol group according to the tenth mapping method is transmitted, a symbol group according to the eleventh mapping method is transmitted, a symbol group according to the ninth mapping method is transmitted, a symbol group according to the tenth mapping method is transmitted, a symbol group according to the eleventh mapping method is transmitted, a symbol group according to the ninth mapping method is transmitted, a symbol group according to the tenth mapping method is transmitted, a symbol group according to the eleventh mapping method is transmitted, . . . , and so on.

When regular switching is not performed, the symbol group according to the ninth mapping, the symbol group according to the tenth mapping, and the symbol group according to the eleventh mapping may be transmitted in any kind of arrangement.

Note that this also to applies to when switching between two or more mapping methods is performed; switching may be performed regularly and may be not performed regularly.

Next, switching method 3 will be described. A simple example will be given in which switching between two mapping methods is performed. However, this is merely one example. Switching may be performed between three or more mapping methods.

An example in which the transmission device in FIG. 6, for example, transmits a symbol in a frame configuration like that in FIG. 27 will be given. Note that the transmission device in FIG. 6 is assumed to perform mapping using four signal points.

In switching method 2, the mapping method is switched on a per-frame basis, but in switching method 3, the mapping method may be switched on the basis of a plurality of data symbols. Accordingly, this can be achieved by switching the mapping on the basis of a plurality of symbols rather than switching the mapping method on a per-frame basis as in switching method 2. Accordingly, detailed description thereof will be omitted. Note that the characterizing features of the first through eleventh mapping methods are as described above. This makes it possible to achieve the advantageous effect that it is possible to reduce the possibility that the light emitted by the transmission device is of a color having bias.

Note that in the above description, an example of a mapping method in which four signal points are present is given, but the mapping method is not limited to this example; even with a mapping method using two signal points, a mapping method using eight signal points, a mapping method using 16 signal points, or a mapping method using 64 signal points, the embodiment can be implemented in the same manner and achieve the same advantageous effects.

Moreover, in the above description, an example of a two-dimensional mapping method is given, but the embodiment can be implemented in the same manner even with a three-dimensional mapping method. In other words, even when a plurality of three-dimensional mapping methods are prepared and the mapping methods are switched on a per-data symbol basis, a per-frame basis, or on the basis of a plurality of data symbols, the embodiment can be implemented in the same manner. Furthermore, even when two-dimensional mapping methods and three-dimensional mapping methods are to be switched on a per-data symbol basis, a per-frame basis, or on the basis of a plurality of data symbols, the embodiment can be implemented in the same manner. This makes it possible to achieve the advantageous effect that it is possible to reduce the possibility that the light emitted by the transmission device is of a color having bias.

Furthermore, even when the example of the application of a mapping method in which four signal points are arranged in an xy chromaticity diagram is applied to a mapping method in a different color system or color space, the embodiment can be implemented in the same manner and achieve the same advantageous effects.

Note that when the transmission device transmits a light modulated signal using a frame configuration like illustrated in FIG. 27, when all signal points that can be data symbol 2104 are given a transmission configuration in reference symbol 2801, it is possible to achieve the advantageous effect that high data reception quality can be achieved.

(Supplemental Information 1)

As a matter of course, the present disclosure may be carried out by combining a plurality of the exemplary embodiments and other contents described herein.

Moreover, each exemplary embodiment and the other contents are only examples. For example, while a "modulation scheme, an error correction encoding scheme (an error correction code, a code length, an encode rate and the like to be used), control information and the like" are exemplified, it is possible to carry out the present disclosure with the same configuration even when other types of a "modulation scheme, an error correction encoding scheme (an error correction code, a code length, an encode rate and the like to be used), control information and the like" are applied.

Regarding the modulation scheme, even when a modulation scheme other than the modulation schemes described herein is used, it is possible to carry out the embodiments and the other subject matter described herein. For example, APSK (Amplitude Phase Shift Keying) (such as 16APSK, 64APSK, 128APSK, 256APSK, 1024APSK and 4096APSK), PAM (Pulse Amplitude Modulation) (such as 4PAM, 8PAM, 16PAM, 64PAM, 128PAM, 256PAM, 1024PAM and 4096PAM), PSK (Phase Shift Keying) (such as BPSK, QPSK, 8PSK, 16PSK, 64PSK, 128PSK, 256PSK, 1024PSK and 4096PSK), and QAM (Quadrature Amplitude Modulation) (such as 4QAM, 8QAM, 16QAM, 64QAM, 128QAM, 256QAM, 1024QAM and 4096QAM) may be applied, or in each modulation scheme, uniform mapping or non-uniform mapping may be performed. Moreover, the mapping may be mapping in which the signal points are arranged three-dimensionally.

Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described in the present specification. Hence, a function of outputting an in-phase component and a quadrature component based on a plurality of bits is a function in the mapper.

In the present specification, when "∀" and/or "∃" is present, "∀" represents a universal quantifier, and "∃" represents an existential quantifier.

Moreover, data/information obtained by the reception device is subsequently converted into a video or audio, and a display (monitor) displays the video or a speaker outputs the audio. Furthermore, the data/information obtained by the reception device may be subjected to signal processing related to a video or a sound (signal processing may not be performed), and may be output from an RCA terminal (a video terminal or an audio terminal), a USB (Universal Serial Bus), or an HDMI (High-Definition Multimedia Interface) (registered trademark), or digital terminal, etc., of the reception device.

In the present specification, it can be considered that the apparatus which includes the transmission device is a communications and broadcast apparatus, such as a broadcast station, a base station, an access point, a terminal or a mobile phone. In such cases, it can be considered that the apparatus that includes the reception device is a communication apparatus such as a television, a radio, a terminal, a personal computer, a mobile phone, an access point, or a base station. Moreover, it can also be considered that the transmission device and reception device according to the present disclosure are each a device having communication functions that is formed so as to be connectable via some interface to an apparatus for executing an application in, for example, a television, a radio, a personal computer or a mobile phone.

Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being synchronized), and the receiver detects, for example, frequency synchronization, time synchronization, and a channel estimation (CSI (Channel State Information)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the encode rate of the modulation scheme, error correction encoding scheme, and/or error correction encoding scheme, or settings information in an upper layer).

Note that the present disclosure is not limited to each exemplary embodiment, and can be carried out with various modifications. For example, in each embodiment, the present disclosure is described as being performed as a communication device. However, the present disclosure is not limited to this case, and this communication method can also be realized as software, hardware, or software in conjunction with hardware.

Note that, for example, a program for executing the above-described communication method may be stored in ROM (Read Only Memory) in advance to cause a CPU (Central Processor Unit) to operate this program.

Moreover, the program for executing the communication method may be stored in a computer-readable storage medium, the program stored in the recording medium may be recorded in RAM (Random Access Memory) in a computer, and the computer may be caused to operate according to this program.

Each functional block of each of the above-described embodiments, etc., may be partially or entirely realized as an LSI (Large Scale Integration) circuit, which is an integrated circuit. Each process described in each of the above embodiments may be controlled partially or entirely by one LSI circuit or a combination of LSI circuits. These LSI circuits may be formed as separate chips, or may be formed as one chip so as to include the entire configuration or part of the functional block. The LSI circuit may include a data input and a data output. The term "LSI circuit" is used here, but the integrated circuit may also be referred to as an IC (integrated circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable FPGA (Field Programmable Gate Array) or a reconfigurable processor which is reconfigurable in connection or settings of circuit cells inside the LSI circuit may be used. The present disclosure may be implemented as digital processing or analog processing. Furthermore, if an integrated circuit technology that replaces LSI emerges as semiconductor technology advances or when a derivative technology is established, it goes without saying that the functional blocks may be integrated by using such technology. Implementation of biotechnology, for example, is a possibility.

INDUSTRIAL APPLICABILITY

One aspect of the present disclosure is applicable in, for example, visible light communication systems.

What is claimed is:

1. A transmission device, comprising:
   circuitry: and a light emitter, wherein the circuitry, in operation, performs:
   generating
      a control symbol including information indicating a color space selected from color spaces,
      a data symbol by mapping transmission data to a signal point arranged in the color space; and
   transmitting the control symbol and the data symbol via the light emitter, wherein
   the control symbol is a symbol used by a reception device for determining whether the data symbol can be demodulated or not.

2. A transmission method performed by a transmission device including a light emitter, the transmission method comprising:
   generating
      a control symbol including information indicating a color space selected from color spaces,
      a data symbol by mapping transmission data to a signal point arranged in the color space; and
   transmitting the control symbol and the data symbol via the light emitter, wherein
   the control symbol is a symbol used by a reception device for determining whether the data symbol can be demodulated or not.

3. A reception device, comprising:
   circuitry; and a light receiver, wherein the circuitry, in operation, performs:
   obtaining a received optical signal, via the light receiver, including a control symbol and a data symbol;
   demodulating the control symbol to obtain information indicating a color space selected from color spaces; and
   demodulating the data symbol based on the information indicating the color space, the data symbol being generated by mapping transmission data to a signal point arranged in the color space, wherein
   the control symbol is a symbol used by the reception device for determining whether the data symbol can be demodulated or not.

4. A reception method performed by a reception device including a light receiver, the reception method comprising:
   obtaining a received optical signal, via the light receiver, including a control symbol and a data symbol;
   demodulating the control symbol to obtain information indicating a color space selected from color spaces; and
   demodulating the data symbol based on the information indicating the color space, the data symbol being generated by mapping transmission data to a signal point arranged in the color space, wherein
   the control symbol is a symbol used by the reception device for determining whether the data symbol can be demodulated or not.

* * * * *